US009374369B2

(12) United States Patent
Mahaffey et al.

(10) Patent No.: US 9,374,369 B2
(45) Date of Patent: Jun. 21, 2016

(54) MULTI-FACTOR AUTHENTICATION AND COMPREHENSIVE LOGIN SYSTEM FOR CLIENT-SERVER NETWORKS

(71) Applicant: LOOKOUT, INC., San Francisco, CA (US)

(72) Inventors: Kevin Patrick Mahaffey, San Francisco, CA (US); David Luke Richardson, San Francisco, CA (US); Ariel Salomon, San Francisco, CA (US); R. Tyler Croy, Berkeley, CA (US); Samuel Alexander Walker, Littleton, CO (US); Brian James Buck, Livermore, CA (US); Sergio Ivan Marcin Gorrino, Palo Alto, CA (US); David Golombek, San Francisco, CA (US)

(73) Assignee: LOOKOUT, INC., San Francisco, CA (US)

( * ) Notice: Subject to any disclaimer, the term of this patent is extended or adjusted under 35 U.S.C. 154(b) by 159 days.

(21) Appl. No.: 13/837,321

(22) Filed: Mar. 15, 2013

(65) Prior Publication Data
US 2014/0189808 A1 Jul. 3, 2014

Related U.S. Application Data

(60) Provisional application No. 61/747,065, filed on Dec. 28, 2012.

(51) Int. Cl.
H04L 29/06 (2006.01)
G06F 7/04 (2006.01)
(Continued)

(52) U.S. Cl.
CPC .......... *H04L 63/0853* (2013.01); *H04L 63/083* (2013.01)

(58) Field of Classification Search
CPC ... H04L 9/3226; H04L 9/0872; H04L 9/3271; H04L 9/3228; H04W 12/06; G06F 2221/2103; G06F 21/31; G06F 21/35
See application file for complete search history.

(56) References Cited

U.S. PATENT DOCUMENTS 3,416,032 A 12/1968 Jahns et al.
4,553,257 A 11/1985 Mori et al.
(Continued)

FOREIGN PATENT DOCUMENTS

GB 2430588 3/2007
WO WO2005101789 10/2005
(Continued)

OTHER PUBLICATIONS

PCT International Search Report and Written Opinion of the International Search Authority for PCT/US2013/67109, mailed Apr. 16, 2014; pp. 1-16.
(Continued)

*Primary Examiner* — Dede Zecher
*Assistant Examiner* — Trang Doan
(74) *Attorney, Agent, or Firm* — Dergosits & Noah LLP

(57) ABSTRACT

Embodiments are directed to a system and method for authenticating a user of a client computer making a request to a server computer providing access to a network resource through an authentication platform that issues a challenge in response to the request requiring authentication of the user identity through a reply from the client computer, determining one or more items of context information related to at least one of the user, the request, and the client computer, and determining a disposition of the request based on the reply and the one or more items of context information. The reply includes a user password and may be provided by an authorizing client device.

22 Claims, 28 Drawing Sheets

(51) Int. Cl.
G06F 15/16 (2006.01)
G06F 17/30 (2006.01)

(56) References Cited

U.S. PATENT DOCUMENTS

| | | | |
|---|---|---|---|
| 5,319,776 A | 6/1994 | Hile et al. | |
| 5,574,775 A | 11/1996 | Miller, II et al. | |
| 5,715,518 A | 2/1998 | Barrere et al. | |
| 6,185,689 B1 | 2/2001 | Todd et al. | |
| 6,269,456 B1 | 7/2001 | Hodges et al. | |
| 6,272,353 B1 | 8/2001 | Dicker et al. | |
| 6,301,668 B1 | 10/2001 | Gleichauf et al. | |
| 6,453,345 B2 | 9/2002 | Trcka et al. | |
| 6,529,143 B2 | 3/2003 | Mikkola et al. | |
| 6,696,941 B2 | 2/2004 | Baker | |
| 6,792,543 B2 | 9/2004 | Pak et al. | |
| 6,892,225 B1 | 5/2005 | Tu et al. | |
| 6,907,530 B2 | 6/2005 | Wang | |
| 6,959,184 B1 | 10/2005 | Byers et al. | |
| 7,020,895 B2 | 3/2006 | Albrecht | |
| 7,023,383 B2 | 4/2006 | Stilp et al. | |
| 7,069,589 B2 | 6/2006 | Schmall et al. | |
| 7,096,368 B2 | 8/2006 | Kouznetsov et al. | |
| 7,123,933 B2 | 10/2006 | Poor et al. | |
| 7,127,455 B2 | 10/2006 | Carson et al. | |
| 7,159,036 B2 | 1/2007 | Hinchliffe et al. | |
| 7,159,237 B2 | 1/2007 | Schneier et al. | |
| 7,171,690 B2 | 1/2007 | Kouznetsov et al. | |
| 7,178,166 B1 | 2/2007 | Taylor et al. | |
| 7,181,225 B1 * | 2/2007 | Moton, Jr. | H04W 16/00 455/414.2 |
| 7,181,252 B2 | 2/2007 | Komsi | |
| 7,210,168 B2 | 4/2007 | Hursey et al. | |
| 7,228,566 B2 | 6/2007 | Caceres et al. | |
| 7,231,427 B1 | 6/2007 | Du | |
| 7,236,598 B2 | 6/2007 | Sheymov et al. | |
| 7,237,264 B1 | 6/2007 | Graham et al. | |
| 7,266,810 B2 | 9/2007 | Karkare et al. | |
| 7,290,276 B2 | 10/2007 | Ogata | |
| 7,304,570 B2 | 12/2007 | Thomas et al. | |
| 7,305,245 B2 | 12/2007 | Alizadeh-Shabdiz | |
| 7,308,256 B2 | 12/2007 | Morota et al. | |
| 7,308,712 B2 | 12/2007 | Banzhof | |
| 7,325,249 B2 | 1/2008 | Sutton et al. | |
| 7,346,605 B1 | 3/2008 | Hepworth | |
| 7,356,835 B2 | 4/2008 | Gancarcik et al. | |
| 7,376,969 B1 | 5/2008 | Njemanze et al. | |
| 7,386,297 B2 | 6/2008 | An | |
| 7,392,043 B2 | 6/2008 | Kouznetsov et al. | |
| 7,392,543 B2 | 6/2008 | Szor | |
| 7,397,424 B2 | 7/2008 | Houri | |
| 7,397,434 B2 | 7/2008 | Mun et al. | |
| 7,401,359 B2 | 7/2008 | Gartside et al. | |
| 7,403,762 B2 | 7/2008 | Morgan et al. | |
| 7,414,988 B2 | 8/2008 | Jones et al. | |
| 7,415,270 B2 | 8/2008 | Wilhelmsson et al. | |
| 7,415,536 B2 | 8/2008 | Nakazawa | |
| 7,433,694 B2 | 10/2008 | Morgan et al. | |
| 7,467,206 B2 | 12/2008 | Moore et al. | |
| 7,471,954 B2 | 12/2008 | Brachet et al. | |
| 7,472,422 B1 | 12/2008 | Agbabian | |
| 7,474,897 B2 | 1/2009 | Morgan et al. | |
| 7,493,127 B2 | 2/2009 | Morgan et al. | |
| 7,493,403 B2 | 2/2009 | Shull | |
| 7,502,620 B2 | 3/2009 | Morgan et al. | |
| 7,515,578 B2 | 4/2009 | Alizadeh-Shabdiz | |
| 7,525,541 B2 | 4/2009 | Chun et al. | |
| 7,526,297 B1 | 4/2009 | Holur et al. | |
| 7,539,882 B2 | 5/2009 | Jessup et al. | |
| 7,551,579 B2 | 6/2009 | Alizadeh-Shabdiz | |
| 7,551,929 B2 | 6/2009 | Alizadeh-Shabdiz | |
| 7,634,800 B2 | 12/2009 | Ide et al. | |
| 7,685,132 B2 | 3/2010 | Hyman | |
| 7,696,923 B2 | 4/2010 | Houri | |
| 7,761,583 B2 | 7/2010 | Shull | |
| 7,768,963 B2 | 8/2010 | Alizadeh-Shabdiz | |
| 7,769,396 B2 | 8/2010 | Alizadeh-Shabdiz et al. | |
| 7,774,637 B1 | 8/2010 | Beddoe et al. | |
| 7,783,281 B1 | 8/2010 | Cook et al. | |
| 7,809,353 B2 | 10/2010 | Brown et al. | |
| 7,809,366 B2 | 10/2010 | Rao et al. | |
| 7,809,936 B2 | 10/2010 | Einloth et al. | |
| 7,813,745 B2 | 10/2010 | Li | |
| 7,818,017 B2 | 10/2010 | Alizadeh-Shabdiz et al. | |
| 7,835,754 B2 | 11/2010 | Alizadeh-Shabdiz et al. | |
| 7,856,234 B2 | 12/2010 | Alizadeh-Shabdiz et al. | |
| 7,856,373 B2 | 12/2010 | Ullah | |
| 7,861,303 B2 | 12/2010 | Kouznetsov et al. | |
| 7,877,784 B2 | 1/2011 | Chow | |
| 7,907,966 B1 | 3/2011 | Mammen | |
| 7,916,661 B2 | 3/2011 | Alizadeh-Shabdiz et al. | |
| 7,991,854 B2 | 8/2011 | Bahl | |
| 7,999,742 B2 | 8/2011 | Alizadeh-Shabdiz et al. | |
| 8,014,788 B2 | 9/2011 | Alizadeh-Shabdiz et al. | |
| 8,019,357 B2 | 9/2011 | Alizadeh-Shabdiz et al. | |
| 8,031,657 B2 | 10/2011 | Jones et al. | |
| 8,037,203 B2 | 10/2011 | Accapadi et al. | |
| 8,054,219 B2 | 11/2011 | Alizadeh-Shabdiz | |
| 8,087,082 B2 | 12/2011 | Bloch et al. | |
| 8,089,398 B2 | 1/2012 | Alizadeh-Shabdiz | |
| 8,089,399 B2 | 1/2012 | Alizadeh-Shabdiz | |
| 8,090,386 B2 | 1/2012 | Alizadeh-Shabdiz | |
| 8,099,764 B2 | 1/2012 | Herzog et al. | |
| 8,108,555 B2 | 1/2012 | Awadallah et al. | |
| 8,121,617 B1 | 2/2012 | LaGrotta et al. | |
| 8,126,456 B2 | 2/2012 | Lotter et al. | |
| 8,127,158 B2 | 2/2012 | Jessup et al. | |
| 8,127,358 B1 | 2/2012 | Lee | |
| 8,135,395 B2 | 3/2012 | Cassett et al. | |
| 8,195,196 B2 | 6/2012 | Haran et al. | |
| 8,225,103 B2 * | 7/2012 | Chiou | G06F 21/31 704/273 |
| 8,228,234 B2 | 7/2012 | Paulson et al. | |
| 8,229,392 B2 | 7/2012 | Bumiller et al. | |
| 8,259,568 B2 | 9/2012 | Laudermilch et al. | |
| 8,261,351 B1 | 9/2012 | Thornewell et al. | |
| 8,266,288 B2 | 9/2012 | Banerjee et al. | |
| 8,266,324 B2 | 9/2012 | Baratakke et al. | |
| 8,271,056 B2 | 9/2012 | Keohane et al. | |
| 8,275,345 B2 | 9/2012 | Bumiller et al. | |
| 8,346,860 B2 | 1/2013 | Berg et al. | |
| 8,356,080 B2 | 1/2013 | Luna et al. | |
| 8,364,785 B2 | 1/2013 | Plamondon | |
| 8,370,580 B2 | 2/2013 | Mobarak et al. | |
| 8,370,933 B1 | 2/2013 | Buckler | |
| 8,401,521 B2 | 3/2013 | Bennett et al. | |
| 8,447,856 B2 | 5/2013 | Drako | |
| 8,463,915 B1 | 6/2013 | Kim | |
| 8,484,332 B2 | 7/2013 | Bush et al. | |
| 8,504,775 B2 | 8/2013 | Plamondon | |
| 8,588,870 B1 | 11/2013 | Vargantwar | |
| 8,655,307 B1 | 2/2014 | Walker et al. | |
| 8,739,260 B1 * | 5/2014 | Damm-Goossens | H04W 12/06 726/4 |
| 8,806,647 B1 | 8/2014 | Daswani et al. | |
| 2001/0044339 A1 | 11/2001 | Cordero et al. | |
| 2002/0042886 A1 | 4/2002 | Lahti et al. | |
| 2002/0087483 A1 | 7/2002 | Harif | |
| 2002/0108058 A1 | 8/2002 | Iwamura | |
| 2002/0183060 A1 | 12/2002 | Ko et al. | |
| 2002/0191018 A1 | 12/2002 | Broussard | |
| 2003/0028803 A1 | 2/2003 | Bunker et al. | |
| 2003/0046134 A1 | 3/2003 | Frolick et al. | |
| 2003/0079145 A1 | 4/2003 | Kouznetsov et al. | |
| 2003/0115485 A1 | 6/2003 | Milliken et al. | |
| 2003/0120951 A1 | 6/2003 | Gartside et al. | |
| 2003/0131148 A1 | 7/2003 | Kelley et al. | |
| 2004/0022258 A1 | 2/2004 | Tsukada et al. | |
| 2004/0024706 A1 | 2/2004 | Leduc | |
| 2004/0025042 A1 | 2/2004 | Kouznetsov et al. | |
| 2004/0058644 A1 | 3/2004 | Saigo et al. | |
| 2004/0133624 A1 | 7/2004 | Park | |
| 2004/0158741 A1 | 8/2004 | Schneider | |
| 2004/0185900 A1 | 9/2004 | McElveen | |

(56) References Cited

U.S. PATENT DOCUMENTS

| | | |
|---|---|---|
| 2004/0199665 A1 | 10/2004 | Omar et al. |
| 2004/0203622 A1 | 10/2004 | Esque et al. |
| 2004/0209608 A1 | 10/2004 | Kouznetsov et al. |
| 2004/0225887 A1 | 11/2004 | O'Neil et al. |
| 2004/0259532 A1 | 12/2004 | Isomaki et al. |
| 2005/0010821 A1 | 1/2005 | Cooper et al. |
| 2005/0015443 A1 | 1/2005 | Levine et al. |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0124323 A1* | 6/2005 | Ichihara .......... H04M 1/274516 455/412.1 |
| 2005/0125779 A1 | 6/2005 | Kelley et al. |
| 2005/0130627 A1 | 6/2005 | Calmels et al. |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0186954 A1 | 8/2005 | Kenney |
| 2005/0197099 A1 | 9/2005 | Nehushtan |
| 2005/0221800 A1 | 10/2005 | Jackson et al. |
| 2005/0227669 A1 | 10/2005 | Haparnas |
| 2005/0237970 A1 | 10/2005 | Inoue |
| 2005/0240999 A1 | 10/2005 | Rubin et al. |
| 2005/0254654 A1 | 11/2005 | Rockwell et al. |
| 2005/0278777 A1 | 12/2005 | Loza |
| 2005/0282533 A1 | 12/2005 | Draluk et al. |
| 2006/0026283 A1 | 2/2006 | Trueba |
| 2006/0073820 A1 | 4/2006 | Craswell et al. |
| 2006/0075388 A1 | 4/2006 | Kelley et al. |
| 2006/0080680 A1 | 4/2006 | Anwar et al. |
| 2006/0095454 A1 | 5/2006 | Shankar et al. |
| 2006/0101518 A1 | 5/2006 | Schumaker et al. |
| 2006/0130145 A1 | 6/2006 | Choi et al. |
| 2006/0150238 A1 | 7/2006 | D'Agostino |
| 2006/0150256 A1 | 7/2006 | Fanton et al. |
| 2006/0179485 A1 | 8/2006 | Longsine et al. |
| 2006/0217115 A1 | 9/2006 | Cassett et al. |
| 2006/0218482 A1 | 9/2006 | Ralston et al. |
| 2006/0224742 A1* | 10/2006 | Shahbazi ............. H04L 63/20 709/226 |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0005967 A1 | 1/2007 | Mister et al. |
| 2007/0011319 A1 | 1/2007 | McClure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Byrne et al. |
| 2007/0028095 A1 | 2/2007 | Allen et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0050471 A1 | 3/2007 | Patel et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0186282 A1 | 8/2007 | Jenkins |
| 2007/0190995 A1 | 8/2007 | Wang et al. |
| 2007/0214245 A1 | 9/2007 | Hamalainen et al. |
| 2007/0214504 A1 | 9/2007 | Milani Comparetti et al. |
| 2007/0220608 A1 | 9/2007 | Lahti et al. |
| 2007/0240217 A1 | 10/2007 | Tuvell et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0253377 A1 | 11/2007 | Janneteau et al. |
| 2007/0293263 A1 | 12/2007 | Eslambolchi et al. |
| 2007/0297610 A1 | 12/2007 | Chen et al. |
| 2008/0016347 A1* | 1/2008 | Maj .................... G06F 21/34 713/168 |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Herschaft et al. |
| 2008/0086638 A1 | 4/2008 | Mather |
| 2008/0086773 A1 | 4/2008 | Tuvell et al. |
| 2008/0086776 A1 | 4/2008 | Tuvell et al. |
| 2008/0098464 A1 | 4/2008 | Mizrah |
| 2008/0109871 A1 | 5/2008 | Jacobs |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0235801 A1 | 9/2008 | Soderberg et al. |
| 2008/0276111 A1 | 11/2008 | Jacoby et al. |
| 2008/0293396 A1 | 11/2008 | Barnes et al. |
| 2008/0307243 A1 | 12/2008 | Lee |
| 2008/0318562 A1 | 12/2008 | Featherstone et al. |
| 2009/0013399 A1 | 1/2009 | Cottrell |
| 2009/0064330 A1 | 3/2009 | Shraim |
| 2009/0070283 A1 | 3/2009 | Kang et al. |
| 2009/0119143 A1 | 5/2009 | Silver |
| 2009/0158390 A1* | 6/2009 | Guan .................... H04L 63/08 726/2 |
| 2009/0172227 A1 | 7/2009 | Taylor et al. |
| 2009/0182517 A1 | 7/2009 | Gandhi et al. |
| 2009/0199298 A1 | 8/2009 | Miliefsky |
| 2009/0205016 A1 | 8/2009 | Milas |
| 2009/0205041 A1 | 8/2009 | Michalske |
| 2009/0205047 A1 | 8/2009 | Podjarny |
| 2009/0240774 A1 | 9/2009 | Sachtjen et al. |
| 2009/0248623 A1 | 10/2009 | Adelman et al. |
| 2009/0292487 A1 | 11/2009 | Duncan et al. |
| 2009/0293125 A1 | 11/2009 | Szor |
| 2009/0300763 A1 | 12/2009 | Harvey et al. |
| 2010/0019731 A1 | 1/2010 | Connolly et al. |
| 2010/0058064 A1* | 3/2010 | Kirovski ............. H04L 9/3073 713/176 |
| 2010/0064341 A1 | 3/2010 | Aldera |
| 2010/0088398 A1 | 4/2010 | Plamondon |
| 2010/0095359 A1 | 4/2010 | Gordon |
| 2010/0097494 A1 | 4/2010 | Gum et al. |
| 2010/0100591 A1 | 4/2010 | Burgess et al. |
| 2010/0100939 A1 | 4/2010 | Burgess et al. |
| 2010/0100959 A1 | 4/2010 | Mahaffey |
| 2010/0100963 A1 | 4/2010 | Mahaffey et al. |
| 2010/0100964 A1 | 4/2010 | Burgess et al. |
| 2010/0115092 A1 | 5/2010 | Westin |
| 2010/0138501 A1 | 6/2010 | Clinton et al. |
| 2010/0154032 A1 | 6/2010 | Ollmann |
| 2010/0173658 A1 | 7/2010 | Fan et al. |
| 2010/0210240 A1 | 8/2010 | Mahaffey et al. |
| 2010/0240419 A1 | 9/2010 | Horino |
| 2010/0313270 A1 | 12/2010 | Kim et al. |
| 2010/0317324 A1 | 12/2010 | Brown et al. |
| 2010/0332593 A1 | 12/2010 | Barash et al. |
| 2010/0332680 A1 | 12/2010 | Anderson et al. |

(56) References Cited

U.S. PATENT DOCUMENTS

| | | |
|---|---|---|
| 2011/0047033 A1 | 2/2011 | Mahaffey et al. |
| 2011/0047594 A1 | 2/2011 | Mahaffey et al. |
| 2011/0047597 A1 | 2/2011 | Barton et al. |
| 2011/0047620 A1 | 2/2011 | Mahaffey et al. |
| 2011/0050503 A1 | 3/2011 | Fong et al. |
| 2011/0087690 A1* | 4/2011 | Cairns ............... G06F 17/30097 707/769 |
| 2011/0111799 A1 | 5/2011 | Kothari et al. |
| 2011/0119765 A1 | 5/2011 | Burgess et al. |
| 2011/0145920 A1 | 6/2011 | Burgess et al. |
| 2011/0171923 A1 | 7/2011 | Daly et al. |
| 2011/0241872 A1 | 10/2011 | Mahaffey |
| 2011/0296510 A1 | 12/2011 | Hatlelid et al. |
| 2011/0301890 A1 | 12/2011 | Shirriff et al. |
| 2012/0023153 A1* | 1/2012 | Karasaridis ......... H04L 61/1511 709/203 |
| 2012/0042382 A1 | 2/2012 | Mahaffey |
| 2012/0060222 A1 | 3/2012 | Mahaffey et al. |
| 2012/0072569 A1 | 3/2012 | Xu |
| 2012/0084836 A1 | 4/2012 | Mahaffey et al. |
| 2012/0084864 A1 | 4/2012 | Burgess et al. |
| 2012/0096555 A1 | 4/2012 | Mahaffey |
| 2012/0108208 A1* | 5/2012 | Willis ................. H04L 63/0853 455/411 |
| 2012/0110174 A1 | 5/2012 | Mahaffey et al. |
| 2012/0124239 A1 | 5/2012 | Shribman et al. |
| 2012/0159598 A1* | 6/2012 | Kim ........................ G06F 21/31 726/7 |
| 2012/0159636 A1 | 6/2012 | Pandya et al. |
| 2012/0179801 A1 | 7/2012 | Luna et al. |
| 2012/0179814 A1 | 7/2012 | Swildens et al. |
| 2012/0188064 A1 | 7/2012 | Mahaffey et al. |
| 2012/0196571 A1 | 8/2012 | Grkov et al. |
| 2012/0215938 A1 | 8/2012 | Fletcher et al. |
| 2012/0233695 A1 | 9/2012 | Mahaffey et al. |
| 2012/0246499 A1 | 9/2012 | Jessup et al. |
| 2012/0254634 A1 | 10/2012 | Chakra et al. |
| 2012/0259954 A1 | 10/2012 | McCarthy et al. |
| 2012/0278467 A1 | 11/2012 | Schneider |
| 2012/0303735 A1 | 11/2012 | Raciborski et al. |
| 2012/0317153 A1 | 12/2012 | Parthasarathy et al. |
| 2012/0317233 A1 | 12/2012 | Redpath |
| 2012/0317370 A1 | 12/2012 | Luna |
| 2012/0324076 A1 | 12/2012 | Zerr et al. |
| 2012/0324094 A1 | 12/2012 | Wyatt et al. |
| 2012/0324259 A1 | 12/2012 | Aasheim et al. |
| 2012/0324568 A1 | 12/2012 | Wyatt et al. |
| 2013/0013775 A1 | 1/2013 | Baumback et al. |
| 2013/0019311 A1 | 1/2013 | Swildens et al. |
| 2013/0023209 A1 | 1/2013 | Fisher et al. |
| 2013/0041946 A1 | 2/2013 | Joel et al. |
| 2013/0041974 A1 | 2/2013 | Luna et al. |
| 2013/0047034 A1 | 2/2013 | Salomon et al. |
| 2013/0054796 A1 | 2/2013 | Baumback et al. |
| 2013/0055372 A1* | 2/2013 | Chao ....................... G06F 21/31 726/7 |
| 2013/0067054 A1 | 3/2013 | Pulleyn et al. |
| 2013/0086682 A1 | 4/2013 | Mahaffey et al. |
| 2013/0104197 A1* | 4/2013 | Nandakumar .......... G06F 21/36 726/4 |
| 2013/0191662 A1 | 7/2013 | Ingrassia, Jr. et al. |
| 2014/0157381 A1* | 6/2014 | Disraeli ................... G06F 21/31 726/7 |
| 2014/0181925 A1* | 6/2014 | Smith ...................... G06F 21/45 726/6 |
| 2014/0199966 A1 | 7/2014 | Schushan |

FOREIGN PATENT DOCUMENTS

| | | |
|---|---|---|
| WO | WO2006110181 | 10/2006 |
| WO | WO2007081356 | 7/2007 |
| WO | WO2008007111 | 1/2008 |
| WO | WO2008057737 | 5/2008 |
| WO | WO2010048218 | 4/2010 |
| WO | WO2010048220 | 4/2010 |
| WO | WO2012027588 | 1/2012 |

OTHER PUBLICATIONS

Richardson, Alexis, "Introduction to RabbitMQ", Google UK, available at http://www.rabbitmq.com/resources/google-tech-talk-final/alexis-google-rabbitmq-talk.pdf, retrieved on Mar. 30, 2012, 33 pages, published on Sep. 25, 2008.

Fisher, Oliver, "Malware? We Don't Need No Stinking Malware!", Google, available at http://googlewebmastercentral.blogspot.com/2008/10/malware-we-dont-need-no-stinking.html, retrieved on Mar. 30, 2012, published on Oct. 24, 2008, 11 pages.

Reardon, Marguerite, "Mobile Phones That Track Your Buddies," Cnet, available at <http://news.cnet.com/Mobile-phones-that-track-your-buddies/2100-1039_3-6135209.html, retrieved Mar. 30, 2012, published on Nov. 14, 2006, 6 pages.

Fette, Ian "Understanding Phishing and Malware Protection in Google Chrome," The Chromium Blog, available at http://blog.chromium.org/2008_11_01_archive.html, retrieved on May 17, 2011, published on Nov. 14, 2008, 6 pages.

Kincaid, Jason "Urban Airship Brings Easy Push Notifications to Android," TechCrunch, available at http://techcrunch.com/2010/08/10/urban-airship-brings-easy-push-notifications-to-android/, retrieved on Jun. 16, 2011, published on Aug. 10, 2010, 5 pages.

Keane, Justin K. "Using the Google Safe Browsing API from PHP," Mad Irish, Aug. 7, 2009, available at http://www.madirish.net/node/245, retrieved Mar. 30, 2012, published on Aug. 7, 2009, 5 pages.

Jefferies, Charles P. "Webroot AntiVirus 2010 With Spy Sweeper Review," Notebook Review, available at http://www.notebookreview.com/default.asp?newsID=5700&review=Webroot+AntiVirus+2010+With+Spy+Sweeper+Review, retrieved on May 18, 2011, published on Jun. 22, 2010, 3 pages.

"Berry Locator", available at http://www.mobireport.com/apps/bl/, retrieved on Aug. 10, 2011, published Feb. 8, 2008.

Wikipedia, "Firefox Browser", available at http://en.wikipedia.org/wiki/Firefox_browser, retrieved on Aug. 10, 2011, published on Dec. 15, 2005.

F-Secure, "F-Secure Mobile Security for S60 Users Guide", pp. 1-34, retrieved on Aug. 10, 2011, published on Jan. 26, 2009.

Wikipedia, "Java Virtual Machine", available at http://en.wikipedia.org/wiki/Java_virtual_machine, retrieved on Aug. 10, 2011, published on Dec. 9, 2003.

Kaspersky "Kaspersky Mobile Security", available at http://usa.kaspersky.com/products-services/home-computer-security, published on Jan. 1, 2007, retrieved on Oct. 21, 2008.

"Kaspersky Mobile Security", Kaspersky Lab 2008, available at http://www.kaspersky.com/kaspersky_mobile_security, retrieved on Sep. 11, 2008, published on Jun. 22, 2010, 3 Pages.

Symantec, "Symantec Norton Smartphone Security", available at http://www.symantec.com/norton/smartphone_security, retrieved on Oct. 21, 2008, published on Jan. 1, 2007.

"PhoneBak PDA Phone Anti-theft software for your PDA phone", 2007, Bak2u Pte Ltd (Singapore) pp. 1-4.

"PhoneBak: Mobile Phone Theft Recovery Software", 2007, Westin Tech.

Symantec, "Symantec Endpoint Security, Data Sheet and Product Screen Shot", retrieved on Oct. 21, 2008, published on Jun. 15, 2008.

Symantec, "Symantec Mobile Security Suite for Windows Mobile, Data Sheet and Product Screen Shot", available at http://www.symantec.com/norton/smartphone_security, retrieved on Oct. 21, 2008, published on Mar. 1, 2008.

TippingPoint "TippingPoint Security Management System (SMS)", available at http://www.tippingpoint.com/products_sms.html, retrieved on Oct. 21, 2008, published on Mar. 31, 2005, 2 pages.

Summerson, Cameron "5 Android Antivirus Apps Compared, Find Out Which Ones Are Worth Having!," Android Headlines, available at http://androidheadlines.com/2011/03/5-android-antivirus-apps-comapred-find-out-which-ones-are-worth-having.html, retrieved on Mar. 30, 2012, published on Mar. 8, 2011, 9 pages.

(56) References Cited

OTHER PUBLICATIONS

"Android Cloud to Device Messaging Framework," Google Code Labs, available at http://code.google.com/android/c2dm/, retrieved on Sep. 14, 2011, published on Apr. 11, 2011, 9 pages.
"BlackBerry Push Service Overview," available at http://us.blackberry.com/developers/platform/pushapi. jsp#tab_tab_resources, retrieved on Sep. 14, 2011, published on Nov. 6, 2010, 21 pages.
"eSoft unveils SiteFilter 3.0 for OEMs," Infosecurity, Mar. 23, 2010, available at http://www.infosecurity-magazine.com/view/8273/esoft-unveils-sitefilter-30-for-oems/, retrieved on Mar. 30, 2012, published on Mar. 23, 2010, 2 pages.
"Get the Physical Location of Wireless Router From its MAC Address (BSSID)," Coderrr, available at http://coderrr.wordpress.com/2008/09/10/get-the-physical-location-of-wireless-router-from-its-mac-address-bssid/, retrieved on Mar. 30, 2012, published on Sep. 12, 2008, 13 pages.
"Hooking—Wikipedia, the Free Encyclopedia," Wikipedia, available at http://web.archive.org/web/201004151547521 http://en.wikipedia.org/wiki/Hooking, retrieved Mar. 30, 2012, published on Apr. 15, 2010, 6 pages.
Mytton, David "How to Build an Apple Push Notification Provider Server (Tutorial)," Server Density, available at http://blog.serverdensity.com/2009/07/10/how-to-build-an-apple-push-notification-provider-server-tutorial/, retrieved on Apr. 2, 2012, published on Jul. 10, 2009, 33 pages.
"Pidgin the Universal Chat Client," Pidign, available at http://www.pidgin.im/, retrieved Sep. 14, 2011, published on May 1, 2007, 14 pages.
Pogue, David "Simplifying the Lives of Web Users," The New York Times, available at http://www.nytimes.com/2010/08/19/technology/personaltech/19pogue.html, retrieved May 17, 2011, Published on Aug. 18, 2010, 5 pages.
"Twilio Cloud Communications Web Service API for Building Voice and SMS Applications," Twilio, available at http://www.twilio.com, retrieved Sep. 14, 2011, published on Jun. 5, 2008, 12 pages.
"Understanding Direct Push," Microsoft, Feb. 18, 2009, available at http://technet.microsoft.com/en-us/library/aa997252(v=exchg.80).aspx, retrieved on Mar. 30, 2012, published on Feb. 18, 2009, 3 pages.
"Urban Airship: Powering Modern Mobile," available at http://urbanairship.com/products/, retrieved on Sep. 16, 2011, published on Feb. 19, 2010, 14 pages.
"zVeloDB URL Database," zVelo, available at https://zvelo.com/technology/zvelodb-url-database, retrieved Mar. 30, 2012, published on Jan. 21, 2012, 2 pages.
Amazon.com: Mining the Web Discovering Knowledge from Hypertext Data (9781558607545): Soumen Chakrabarti: Books, Amazon available at http://www.amazon.com/exec/obidos/ASIN/1558607544/, retrieved on Jun. 7, 2012, published on Dec. 13, 2001, pp. 1-7.
Clickatell, available at http://www.clickatell.com, retrieved Sep. 14, 2011, published on Jan. 18, 2011, 11 pages.
Dashwire: Manage Your Cell Phone on the Web, News Blog, with Jessica Dolocourt, Oct. 29, 2007, 5:00am PDT <http://news.cnet.com18301-10784_3-9805657-7.html> retrieved Jun. 15, 2009; pp. 1-3.
Diligenti, M., et al. Focused Crawling Using Context Graphs:, Proceedings of the 26th VLDB Conference, Cairo, Egypt, pp. 1-8, available at www.vldb.org/conf/2000/P257.pdf, retrieved on Oct. 21, 2008, published on Sep. 10, 2000.
Grafio "Stay Secure", available at http://widgets.opera.com/widget/4405/, retrieved Oct. 21, 2008, published on Sep. 29, 2008.
McAfee, Internet Archive, Way Back Machine, available at <http://web.archive.org/web/20080611095201/www.qualys.com/solutions/vulnerability_management>retrieved Feb. 24, 2011, 1 page.
HTC "Mobile Wipe Smart Phone Management", pp. 1-4, published on Dec. 5, 2007, retrieved on Dec. 5, 2007.
PagerDuty, available at http://www.pagerduty.com, retrieved on Sep. 14, 2011, published on Jun. 6, 2009, 23 pages.

PCT "International Search Report and Written Opinion of the International Searching Authority for PCT/US2009/061370", mailed on Dec. 14, 2009.
PCT "International Search Report and Written Opinion of the International Searching Authority for PCT/US2009/061372", mailed on Mar. 24, 2010; received on Mar. 29, 2010.
PCT, "International Search Report and Written Opinion of the International Searching Authority for PCT/US2011/049182", mailed on Dec. 23, 2011.
Prey, available at http://preyproject.com/, retrieved Jan. 10, 2012, published on May 16, 2009, 4 pages.
Qualys, "Executive Dashboard," Internet Archive, Way back Machine, availble at <http://web.archive.org/web/20080507161417/www.qualys.com/products/screens/?screen=Executive + Dashboard>, retrieved Feb. 23, 2011, 1 page.
Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.
Real world Computing, Jun. 16, 2008 (PC Pro), pp. 1-2.
Simone, "Playing with ActiveMQ," Mostly Useless, available at http://www.mostly-useless.com/blog/2007/12/27/playing-with-activemq/, retrieved Mar. 30, 2012, published on Dec. 27, 2007, 6 pages.
Teh, Joe, "Norton 360 Version 3.0 Review, "Mar. 9, 2009, Available at <http://techielobang-com/blog/2009/03/09/norton-360-version-30-reviewl> Retrieved Feb. 23, 2011, 12 pages.
Trillian, available at http://www.trillian.im/, retrieved on Sep. 14, 2011, published on Oct. 11, 2007, 24 pages.
Non-Final Office Action dated Apr. 14, 2011 for U.S. Appl. No. 12/255,614 filed Oct. 21, 2008; pp. 1-6.
Non-Final Office Action dated Apr. 13, 2011 for U.S. Appl. No. 12/255,621 filed Oct. 21, 2008; pp. 1-7.
Final Office Action dated Feb. 1, 2011 for U.S. Appl. No. 12/255,626 filed Oct. 21, 2008; pp. 1-18.
Non-Final Office Action dated Mar. 24, 2011 for U.S. Appl. No. 12/255,635 filed Oct. 21, 2008; pp. 1-17.
Notice of Allowance dated Nov. 3, 2011 for U.S. Appl. No. 12/255,632 filed Oct. 21, 2008; pp. 1-5.
Non-Final Office Action dated Apr. 13, 2011 for U.S. Appl. No. 12/255,632 filed Oct. 21, 2008; pp. 1-7.
Non-Final Office Action dated Dec. 26, 2012 for U.S. Appl. No. 13/160,382 filed Jun. 14, 2011; pp. 1-23.
Virus Total, VT Community, www.virustotal.com/index.html; Dated Dec. 16, 2011; 44 Pages.
Windows Update, Internet Archive, Way Back Machine, available at <http://web.archive.org/web/20071022193017/http://en.wikipedia.org/wiki/Windows_Update> Retrieved Feb. 23, 2011, 3 pages.
Sprite Mobile, Sprite Backup, Internet Archive, Way Back Machine, available at http://web.archive.org/web/20080901220103/http://www.spritesoftware.com/?page_id=280, 4 pages, Retrieved Jan. 16, 2011.
Sprint Nextel, Mobile Locator, Internet Archive, Way Back Machine, available at http://http://web.archive.org/web/20070516134304/http://nextel.com/en/solutions/gps/mobile_locator.shtml, published May 16, 2007.
PCT International Preliminary Report on Patentability for PCT/US2011/049182; Mailed on Mar. 7, 2013; pp. 1-9.
"Virgin Media—Phone Lost or Stolen?", web page downloaded Apr. 11, 2013 from http://www.virginmobile.com/vm/ukCoverage.do?contentId=insurance.howdoi.sm283.
Jung, Jaeyeon et al. "DNS Performance and the Effectiveness of Caching," IEEE/ACM Transactions on Networking, vol. 10, Issue 5, Oct. 2002, pp. 589-603.
Wu, Yi et al. "Performance Analysis of DNS with TTL Value 0 as Location Repository in Mobile Internet," IEEE Wireless Communications and Networking Conference (WCNC), Mar. 11-15, 2007, pp. 3250-3255.
Liljeberg, M. et al. "Optimizing World-Wide Web for Weakly Connected Mobile Workstations: An Indirect Approach," Second Internatioinal Workshop on Services Distributed and Networked Environments, Jun. 5-6, 1995, pp. 132-139.

(56) References Cited

OTHER PUBLICATIONS

Song, Hui and Cao, Guohong. "Cache-Miss-Initiated Prefetch in Mobile Environments," Dept. of Computer Science and Engineering, The Pennsylvania State University, Computer Communications, vol. 28, Issue 7, May 2, 2005, pp. 741-753.

"Sprint—Report that your device is lost or stolen", web page downloaded Apr. 11, 2013 from http://support.sprint.com/support/article/Report_that_your_device_is_lost_or_stolen/case-ba416758-20090629-143222.

Tedeschi, Bob, "In Choosing a New Phone, Online Research Goes Only So Far", The New York Times, Oct. 7, 2009; downloaded Jul. 13, 2013 from http://www.nytimes.com/2009/10/08/technology/personaltech/08smat.html?_r=0.

PCT "International Search Report and Written Opinion of the International Searching Authority for PCT/US2013/027166", mailed on Jun. 19, 2013; received on Jun. 21, 2013.

Banerjee et al., "Users and Batteries: Interactions and Adaptive Energy Management in Mobile Systems", LNCS 4717, (2007), pp. 217-234.

Wen et al., "Online Prediction of Battery Lifetime for Embedded and Mobile Devices", LNCS (2005), Computer Science Department, University of California, Santa Barbara (15 pages).

Zhang et al., "Accurate Online Power Estimation and Automatic Battery Behavior Based Power Model Generation for Smartphones," CODES/ISSS (2010). ACM, New York, NY, USA, pp. 105-114.

Ferreira et al., "Understanding Human-Smartphone Concerns_A Study of Battery Life," In Proceedings of the 9th international conference on Pervasive computing (Pervasive 2011), Kent Lyons, Jeffrey Hightower, and Elaine M. Huang (Eds.). Springer-Verlag, Berlin, Heidelberg, pp. 19-33.

Ravi et al., "Context-aware Battery Management for Mobile Phones," In Proceedings of the 2008 Sixth Annual IEEE International Conference on Pervasive Computing and Communications (Percom 2008), IEEE Computer Society, Washington, DC, USA, pp. 224-233.

Zhang et al., "PowerVisor: a battery virtualization scheme for smartphones," In Proceedings of the third ACM workshop on Mobile cloud computing and services (MCS 2012). ACM, New York, NY, USA, pp. 37-44.

PCT "International Search Report and Written Opinion of the International Searching Authority for PCT/US13/66676," mailed Jan. 16, 2014; received Jan. 21, 2014.

* cited by examiner

210

| DATA OBJECT | CREDENTIALS |
| --- | --- |
| | ENCRYPTION KEY |
| STORAGE LOCATION | REQUESTING CLIENT |
| | AUTHENTICATING SERVER |
| | AUTHORIZING CLIENT |
| STORAGE METHOD | ENCRYPTED |
| | DECRYPTED |
| SIGNALS | REQUEST |
| | CONFIRMATION |
| | CREDENTIALS |
| | ENCRYPTION KEY |

MULTI-FACTOR AUTHENTICATION AND COMPREHENSIVE LOGIN SYSTEM FOR CLIENT-SERVER NETWORKS

TECHNICAL FIELD

One or more embodiments relate generally to wide area networks and more specifically to systems and methods for a consolidated multi-factor user authentication and log-in system for applications using an authenticating client device.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The client-server model is the dominant computer network model for most large-scale computer networks including the World Wide Web and forms the basis for most electronic commerce systems presently in use. Computers in the network are either clients or servers, where a server is selectively shares its resources and a client initiates contact with a server in order to use the resource. Such resources typically include application programs, data, printers, storage devices, input/output devices, and the like. In the Internet environment, clients and servers exchange messages according to a request-response messaging exchange in which the client sends a request, and the server returns a response in accordance with a defined communications protocol that operates in the application layer of the TCP/IP (Transmission Control Protocol/Internet Protocol) model.

Servers can represent a wide class of devices that provide access to a diverse array of resources, such as web portals, hosted applications, data repositories, application servers, electronic commerce sites, search engines, and so on. Servers provide access to these resources in response to requests initiated by clients, and often require some sort of authentication before allowing a client to access or use the requested resource in order to prevent unauthorized or unlimited use of a resource and to protect the security of the resource and the network. Such authorization is typically based on a login or sign-in process that requires the client user to provide credentials or otherwise verify their right to obtain access to the resource or restricted area. The login process thus allows the server to control access to the resource by identifying and authenticating the user through the credentials presented by the user. In general, a credential is an object that is verified when presented to the verifier in an authentication transaction. Credentials may be bound in some way to the individual to whom they were issued, such as for identification, or they may be bearer credentials, which may be acceptable for general authorization.

A common form of credential authentication is the familiar use of passwords to authenticate a user logging in under an established login name. Passwords, however, are vulnerable to several security breaching techniques. Passwords can be hacked, guessed, or obtained through fraudulent means, such as phishing techniques, and the like. Another disadvantage of passwords is that they can be easily forgotten by the user. This is especially the case with the proliferation of web sites, applications, and other network resources that all require password login. The sheer number of different passwords that might be needed by a user during the course of daily transactions can be overwhelming. This often leads to users employing the same or only a couple of different passwords for all of the different applications and sites, or recording the passwords in a way that may expose them to discovery by others, both of which can be dangerous practices.

The vulnerability of password-based protection schemes has led to the rise of multi-factor authentication methods that incorporate or combine alternative proofs of identity, such as biometric methods (e.g., fingerprints) or possession based methods (e.g., security tokens). While effective, such methods can add considerable cost and complexity to applications and are not generally available or utilized for typical consumer-oriented software applications.

What is needed, therefore, is a comprehensive password and identity management system that provides a simple and centralized method of user authentication and login for a wide variety of applications and networks and that utilizes an authentication device that is readily available for most users.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 2B is a table that illustrates the various possible instantiations of various data objects and signals processed by the authentication management platform 101 under an embodiment.

DETAILED DESCRIPTION

Figure 1:
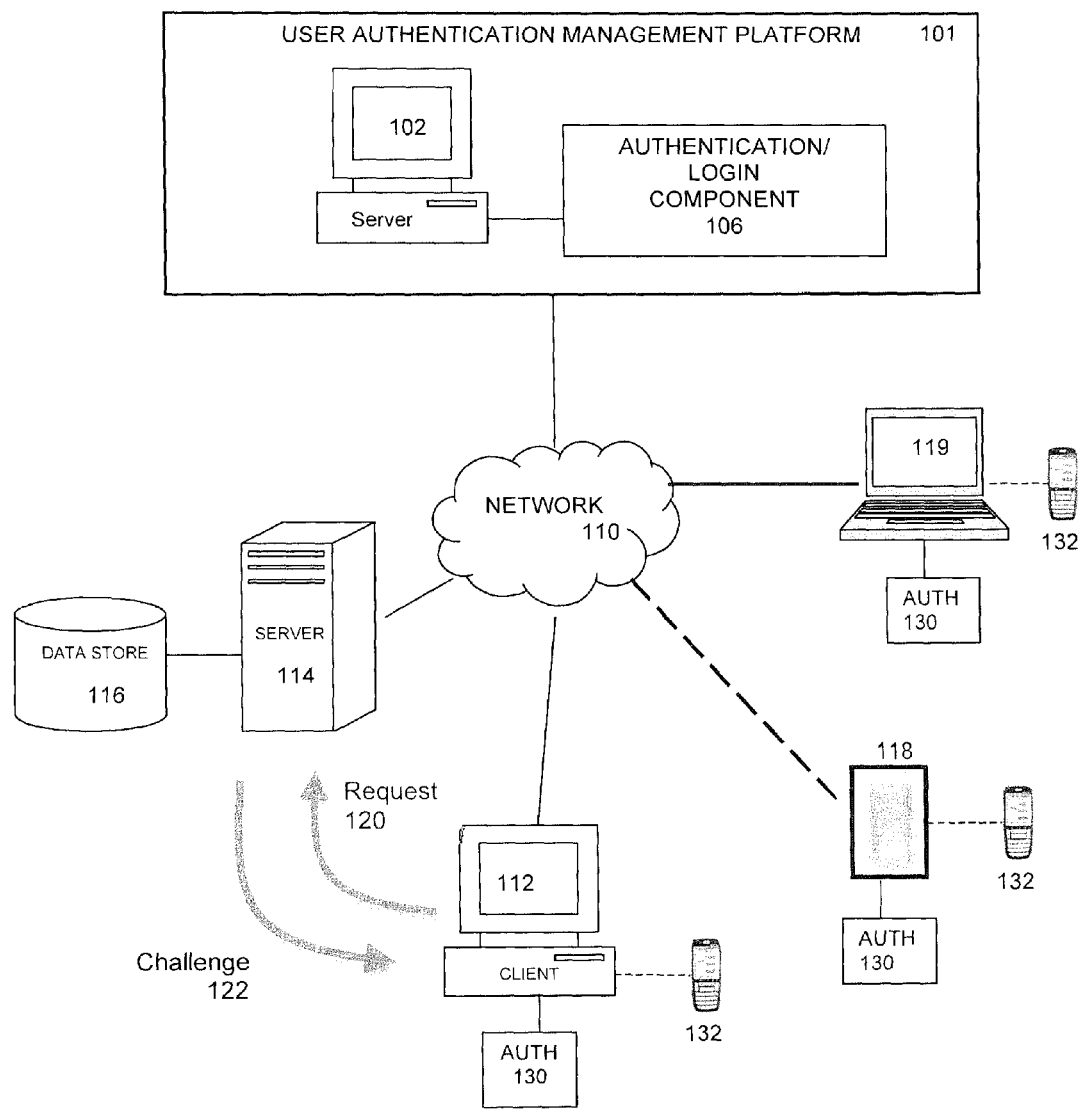
FIG. 1 illustrates a network system that implements a user authentication and login management process, under an embodiment.

It should be appreciated that the embodiments of the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present invention. In this specification, these implementations, or any other form that the invention may take, may be referred to as techniques. In general, the order of the steps of disclosed processes may be altered within the scope of the invention.

Systems and methods are described for managing the identity, passwords and authentication credentials for users accessing network resources through server computers from client computers in a computer network environment. Some embodiments are directed to a system and method for authenticating a user of a client computer making a request to a server computer providing access to a network resource through an authentication platform that issues a challenge in response to the request requiring authentication of the user identity through a reply from the client computer, determining one or more items of context information related to at least one of the user, the request, and the client computer, and determining a disposition of the request based on the reply and the one or more items of context information. The reply includes a user password and may be provided by an authenticating client device coupled to the client computer over a wireless communications link. Some embodiments are further directed to a system and method for processing a request from a client computer to access a target server over a network by issuing a challenge requiring validation of a user identity in response to the request, receiving user credentials from an authenticating client coupled to the client computer, and comparing the received user credentials with stored user credentials to determine a disposition of the request. Systems and methods are yet further described for providing a comprehensive login process that provides a single login interface for many different applications, web sites, and network resources through a web browser interface.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

As used herein, the term "server" means a server computer or group of computers that act to provide a service for a certain function or access to a network resource. The servers may be physical servers, hosted servers in a virtual environment, or software code running on a platform. The term "client" generally means software that communicates with a server, and "client computer" refers to any computer, embedded device, mobile device, or other system that can be used to perform the functionality described as being performed by the client computer. Specifically, client computers include devices, which can be used to display a user interface by which the functionality provided by a server can be utilized by a user. A "requesting client" or "accessing client" is a client that requests data, services, or some kind of action from a target server, and an "authorizing client" or "authenticating client" is a client that the target server or some other server uses to authorize a request from requesting client or other source. Clients may be embodied in desktop, laptop, notebook, or netbook computers, or in mobile devices, such as mobile phones, tablet computers, PDAs, smartphones, and the like. The term "application" means software used on a computer by a user, and can be applications that are targeted or supported by specific classes of machine, such as mobile application, desktop application, tablet application, enterprise application, and so on. A service is an online server or set of servers, and can refer to a web site, web application, and so on. The term "credential" or "credentials" means something that is provided as a correct response to a given authorization challenge, such as a username/password, token, or similar data element or object as described in more detail in the description that follows. The term "authorization" means an indication (e.g. yes/no, true/false) of whether the action is allowed, or a token that grants access or is proof of allowance of an access, and which can be provided to any system that needs proof that a given user is authorized for a particular action, or a callback to a system indicating that the user is authorized. The term "application identity information" means, for a website, mobile or desktop application, or other service needing authentication or authorization, a URL, package name of hosting application, signing certificate of hosting application, class name or other identifier of current UI dialog, UUID, a hash of the application or site code, a digital signature or HMAC provided by the application, or other information that can be used to fingerprint software (e.g. class name of running service or activity).

In some embodiments, a user authentication system may be server-based or peer communication-based. In a server-based system, a client makes request of server, and the client is authenticated with the server, which may occur during request or before/after request is made). The server may perform the authentication, or it may return the result of the authentication. In a peer communication-based system, an authorizing client communicates directly with a requesting client, which solves the problem of a mobile device acting as an authorizing client not being connected to a valid network connection to receive a push from a server. The client requesting authorization (e.g., to receive credentials or perform an action) may communicate with an authorizing client without using server to proxy the request.

In the peer-communication embodiment, the types of network connection between requesting client and authorizing client can include Wi-Fi, Bluetooth, NFC (near field communications), or a mobile wireless network. The authorization flow in this case comprises: the requesting client identifies authorizing client to communicate with, the server identifying the client based on network information provided by one or both clients (e.g. Wi-Fi AP, both connected from same public IP address), the requesting client broadcasting to local network, e.g. using mDNS or SMB, and receiving responses from other clients on network. Other peer discovery methods may also be used. The requesting client requests authorization from authorizing client, and the request may need to be generated by the server and digitally signed by the server's private key. The authorizing client only accepts requests that are validated against the server's public key. The request may be signed/validated against secret information associated with account (e.g. user's account password, or a symmetric or asymmetric key associated with the account). The request may contain all information about request that authorizing receives above (e.g. type of request). The authorizing client receives the request validates that request is legitimate. The authorizing client performs authorization and sends response to requesting client. The response may be encrypted so that the requesting client cannot access information. The authorizing client sends the response to the requesting client including response data such as a picture or other extended information. The requesting client either uses the response directly to complete its request (e.g. for login credentials) or provides the response to the server as proof of authorization.

The requesting client operated by the user to access a target server or other interface may be implemented in one of several forms. Generally it includes an authentication or authorization UI for use as a primary authentication/authorization mechanism or interacting with a service's existing mechanisms. For example, it may be implemented via Browser plug-in, Javascript SDK, in a mobile app, or it may enroll if authentication or authorization require enrollment (e.g. server needs knowledge of an account). Some services may require this, where in other cases, server provides open API where any service can request authentication or authorization without a user needing to enroll. The system determines if a user is enrolled in a given service with the server. It may do this by retrieving enrollment information from server (e.g. supply hostname or identifier of site as an HTTP referrer or explicitly) or service; looking for presence of a session or authentication cookie; examining the content of user interface for indication that user is logged in; storing a list of enrolled services locally, which may be synced with server periodically. In some configurations, all users may be automatically enrolled, so no determination is necessary. For example, for a bank, if a user's requesting client is authenticated with the server, the bank's site can request that the requesting client authorize an action, the server pushing to the user's authorizing client confirming the authorization with user input. In this case, there was no credential enrollment required.

If a user is not enrolled in service, the user can be enrolled. In this case, the service may have its own authentication mechanism, server is interacting with it. The user enters authentication information in a login or registration process, information is captured and the user is enrolled in that service on the server. For this the system can be configured to detect entry of authentication information in a login or registration process through form detection and analysis components or the like. Some of the information may be automatically generated (e.g. a password) by client and not entered by use, and the system can ask the user if they want to save the information in the future, e.g. via new user interface dialog displayed in parallel to main flow, or serially (e.g. interstitial). The user may enter additional information (e.g. address, name, payment information). The system can map entered information to categories of information (through form detection and analysis) on the client or server. The system then sends information to the server to store, and the client may encrypt data first. For future logins, the user is enrolled, and the authentication/authorization are provided to service automatically upon server authorizing it.

Authentication and other information are entered on behalf of user. The system collects information for the user (e.g. username, address, name, email address, etc.). The information may be provided directly via a web or mobile interface (e.g., an identity manager for multiple identities with consistent information), or based on past or previously entered information. The collected information is sent to the server and some fields may be censored to include info only necessary for login. Censoring criteria may be supplied by the server or pre-cached by the device. The system can determine categories of entered information, and store the collected information. It can also determine what categories of information this service wants (e.g. email, username plus email, username plus address). The server determines based on previous user entries of information that were collected. The client sends field information to server and server determines what types of information. The server then sends the information to the client. The server can send a single set of information, or multiple sets of information to client, corresponding to different identities (e.g. personal, work, public, private, shared team identity). The client displays a UI where user can choose an identity and all of its associated information, and the client enters details in form automatically (or sends data to server in categories). Details are populated from previous entries and their mapping into categories, or can be explicitly set for the user (e.g. UI where can specify home address, first name, last name, etc.). The client displays UI where user can choose which details they want in each category, e.g. choosing a name populates first name and last name fields, address can populate street, state, postal code, country, etc. fields. An address may have name associated with it (e.g. home, work, etc.). The client provides information to server and service, e.g. which identity the user chose, which name, etc. If the user modified information that was automatically entered, the system detects the modifications (e.g. if a user changes their address in a registration form, they may have moved. This process allows server to automatically update the address it stores for user for use in future account registrations). The system can ask the user if they want to update information on server based on modification. If the user confirms, the system updates the stored information on server.

A service may use the server as a primary method of authenticating. In this case, the client sends a request to the server asking to authenticate with the service. The client automatically sends request to server (e.g. if user's request to take an action is implied or the request originates as part of a background, non-user-initiated, process on the service, no user action is required). In a user-initiated request, a web browser or app displays a button indicating that the user can authenticate (e.g. create account or login) to the service by clicking the appropriate button. When the user clicks the button, the client sends a request (e.g. HTTP) to server with information provided by the service. In an example implementation, the system can follow the OAuth standard. The request may contain information provided by service: an address (e.g. URL) where the authorized request can return information to the server, parameters indicating what type of authorization to perform to verify user consent (e.g. need voice, picture, biometric, parental or administrator authorization), or parameters indicating what type of information service requests to know about user. The server may determine what information to provide to service. A UI is displayed asking the user to choose what information or access to information or other privilege level to provide service. The service may request access to certain information as part of request to server or the type of information requested may be pre-configured on server, or all services may receive the same set of information, based on user selection.

The system may be configured to provide opt-in/out of service requested information. In this case, the user can choose which identity to associate this service relationship with. The user is presented with default information and can modify it specifically for this service. The system can also provide automatic selection of information based on user profile. User preferences can be used to determine what information to provide to service. User preferences can be based on category of service. For example, a user chooses that shopping sites cannot get the user's email address but do receive a valid billing and shipping address and valid credit card information, whereas a social network may receive the user's email and music preferences but not their address. The server may have a database of service categorizations to allow the providing of information to a service to happen automatically. The server then authorizes the request For example, the server communicates with the authorizing client, or presents a UI on the requesting client for user to confirm that they wish to create an authenticated relationship with service. The server returns authentication or authorization information to client or service to the client, and the server returns information about the user/identity or an authorization for the client to retrieve authentication information to the client. The client then relays that information to the service server, and may create an account identifier for the client to pass to the service so that the service can communicate directly with the server about the account (e.g. to retrieve updated information, to access services associated with the user's account). The data returned by server may be digitally signed to prove its authenticity to the service.

The server may send user/identity/account information to service directly (or authorization to retrieve/access that information), e.g. via a pre-registered URL, via a URL provided in the request, or in response to a server's request for the information/authorization. This information may include any information server wishes to provide and may also include information provided to server in request, e.g. service's identifier for the request.

The client may request authorization from server to login or perform action. Example use cases of this embodiment include: login to service, or performing an action on the service (e.g. performing a bank transfer, changing password). The authorization request may be automatically triggered by visiting website, performing action on website, or opening an application, performed by application or service in the background, or it may occur after user intervention (e.g. display UI where user can choose authorization options then request authorization of login or action). The request may contain information, a service URL or other identifier (e.g. package name, signing key, signing certificate), or an action requested or type of authorization (e.g. login credentials, transfer $1234.33 from account 2912 to "Sally"). Several options may be associated with a request for authorization, and may be automatically set or set by user using user interface. These include which authorizing client to ask for authorization, what form of authorization to engage in (e.g. push, phone call, SMS, email), how long to authorize for (e.g. ask for 30 minutes of authorization for all sites). If the user has multiple accounts, allow them to choose which to login as. The request will then contain information regarding which account to authorize login to. The options may also specify a challenge token provided by the service that will be responded to by server if authorization is successful (e.g. digitally signed, HMAC, etc.).

Before sending request, client may have retrieved information from server or authentication/authorization request process include multiple requests and responses between client and server. For example, client requests from server available list of authorizing clients, or server pushes that information to client (e.g. based on whether the authorizing clients are currently connected to server. The client may wait for a response from the server, e.g., using push mechanism or periodically poll server, HTTP long poll, websockets, etc. It then receives a response from the server, and populates the form field with response (e.g. username, password) and submits if a form based authentication. It can also send information contained in the response to the service (e.g. digitally signed token provided by server, username/password provided by server), set a cookie based on response, and perform a Javascript callback based on the response.

In an embodiment, the authorization flow generally includes the steps of: the requesting client identifying the authorizing client to communicate with and requesting authorization from the identified authorizing client, the authorizing client receiving request, validating that the request is legitimate, performing authorization and then sending a response to requesting client. The requesting client then either uses response directly to complete its request (e.g., for login credentials) or provides response to server as proof of authorization.

Some embodiments may include an authentication or authorization UI (user interface) for use as a primary authentication/authorization mechanism or interacting with a service's existing mechanisms, a form detection and analysis component, web browser registration/login tools, mobile keyboard (e.g., a software keyboard module that can log in and register accounts) support, a mobile application authentication API (application program interface), mobile app authentication to a server, and credential transport security mechanisms.

With regard to credential transport security, if transporting usernames and passwords, its ideal for server to only store encrypted password information and not to be able to decrypt credential information. The problem of being able to decrypt credential information is solved by the requesting client or authorizing client having a decryption key (e.g. symmetric key, or private key), so that the credentials can be decrypted by the requesting client or by the authorizing client which sends them to the requesting client. If the requesting client has decryption keys, it may not store credentials locally, so that when server authorizes request to login or create account, the server sends encrypted information to the client, which is decrypted by its keys. In this case, only the client can decrypt them with a key it has (e.g. locally generated, derived from a user password (e.g. using PBKDF2), stored on the client or a hardware token associated with the client). Alternatively, the client may locally cache all credential information and request from server returns a decryption key for a given service's credentials. The problem of password resets (where the decryption key cannot be derived if the user forgets his or her password) is solved by a key escrow service first storing the client's decryption key or an encrypted version of the decryption key that can recreate the client's decryption key given some form of authorization, such as by verification via email address, or phone call.

Aspects of the one or more embodiments described herein may be implemented on one or more computers executing software instructions. The computers may be networked in a client-server arrangement or similar distributed computer network. FIG. 1 illustrates a computer network system 100 that supports client computers, mobile communications devices and other network elements to implement one or more embodiments. Those of ordinary skill in the art will appreciate that the elements illustrated in FIG. 1 may vary depending on the system implementation. In system 100, a network server computer 114 is coupled, directly or indirectly, to one or more network client computers (e.g., clients 112, 118, 119) through a network 110. The network interface between server computer and the client computers may include one or more routers that serve to buffer and route the data transmitted between the server and client computers. Network 110 may be the Internet, a Wide Area Network (WAN), a Local Area Network (LAN), or any combination thereof.

In one embodiment, one or more of the server computers 114 may be a World-Wide Web (WWW) server that stores data in the form of web pages and transmits these pages as Hypertext Markup Language (HTML) files over the Internet 110 to one or more client computers. For this embodiment, the client computer typically runs a web browser program to access the web pages served by a server computer (e.g., server 114) and any available content provider or supplemental server. For the embodiment in which network 110 is the Internet, network server 114 executes a web server process to provide HTML documents, typically in the form of web pages, to client computers coupled to the network. The client computers may access the Internet 110 through an Internet Service Provider (ISP). Data for any of the resources, services, web sites, and the like may be provided by a data store 116 closely or loosely coupled to any of the server 114 and/or clients.

As shown in FIG. 1, the client computers may be embodied in a workstation computer 112 or it may be a computing device such as a notebook computer 119, personal digital assistant, or the like. The client computer may also be embodied within a mobile communications device (e.g., smartphone, mobile phone, tablet device, etc.) 118, game console, media playback unit, or similar computing device that provides access to the Internet network 110 and a sufficient degree of user input and processing capability to execute or access the applications or resources provided by server 114. The client computers may be coupled to the server computers and other network resources over a wired connection, a wireless connection or any combination thereof.

In one embodiment, system 100 includes a user authentication management platform 101, which includes a server 102, also referred to as an "authorizing" or "authentication" server that executes a server-side authentication/login process or functional component 106. Client versions 130 of this process 106 may also be executed on the client computers in a distributed application environment. The process 106 may represent one or more executable programs modules that are stored within server 102 and executed locally within the server. Alternatively, however, it may be stored on a remote storage or processing device coupled to server 102 or network 110 and accessed by server 102 to be locally executed. In a further alternative embodiment, the authentication/login process 106 may be implemented in a plurality of different program modules, each of which may be executed by two or more distributed server computers coupled to each other, or to network 110 separately.

During a typical network exchange, a user through client computer 112 may make a request 120 to a target server 114 to access an application provided by the server or to access some other network resource through server 114. Many such applications or resources may be protected so that only authorized users may gain access. In this case, the accessed (or "target") server 114 will in turn respond with a challenge 122 requesting that the user provide appropriate authenticating credentials, such as a valid username and password. Although the example of FIG. 1 illustrates the request-challenge routine being executed between desktop client 112 and target server 114, it should be noted that a similar request-challenge routine is performed by any other client 118 or 119 accessing a server in system 100. In certain cases, there may be no challenge presented, but the user must still provide valid credentials. If not, the request is simply rejected.

In an embodiment, the authentication/login component 106 enables a challenge-response interaction between client and server when the client makes a request to the server. The request specifies the resource or application to be accessed. The request 120 includes the application identity information—for a website, mobile or desktop application, or other service needing authentication or authorization URL, package name of hosting application, signing certificate of hosting application, class name or other identifier of a current user interface dialog, UUID (Universally Unique ID), a hash of the application or site code, a digital signature or HMAC provided by the application, or other information that can be used to fingerprint software (e.g. class name of running service or activity). To gain access, the client must provide the proper credentials in response to the challenge 116 from the server.

For the server-based authentication method, a requesting client makes a request of the authentication server. The request may contain information that proves the identity of the client, such as a username/password or token. Authentication may be performed before or after the request. The request can be one of a request for data, access to a service or to perform an action. Data may be e-mail or other stored information associated with a user account. This may be especially useful if the server is used to provide information for creating an account on a third-party service. Data may also comprise access to sensitive data, such as early access to quarterly reports, in which case a decryption key is provided for sensitive data. e.g., a user opens a PDF document, but the document is encrypted. The client sends a request to the owner of the document, and the owner approves or disapproves the request based on the identity information provided by the client. Access to a service may comprise a case where the server may proxy access to a service, controlling the client's access to that service. For example, a client may not have login credentials for a website due to security purposes, but the server can proxy requests to the website and responses from that website if the proxy session is appropriately authorized. Performing an action may be illustrated by a bank using the authentication server to authorize a transfer funds from a user's account.

Credentials generally comprise any information that is presented to an authentication or authorization system for the purposes of authentication or authorization. For example credentials may comprise a username/password combination and/or a token and/or a cryptographic signature. Other forms of credential or authenticating elements may include authorization through a third-party service, such as OAuth, which is an open protocol to allow secure authorization in a standardized way from web, mobile and desktop applications. Using this method, the server authenticates the user, then displays a confirmation of the request (e.g., to confirm whether or not user wants to allow the requestor to gain access). For example, a server may use a user's Facebook account as its source of authentication. For that reason, the client must prove that it can connect with a user's Facebook account in order to claim to have access to that user's account information. The server may require that the client use Facebook's OAuth API in order to supply server with a guarantee that the user is allowing access. Credentials may also be produced or linked to other accounts the client has access to. For example, if a first client has access to a given email or social network account, the server may create an account that is associated with that client. If a second client that wishes to access the first client's account on server, the server may validate that the second client has access to the email or social network account, and if so, provide the second client access to the account on the server.

Other common types of credentials include: (1) a username plus password supplied from client to server in which the system checks whether or not the password entered on the client matches the password associated with the user identity (or encrypted/hashed version of the password); (2) a public key or certificate with a public key in which the client may supply a public cryptographic key or certificate containing such a key that corresponds to a public key the server already knows about and in order to prove that the client has a corresponding private key, the server may issue a challenge that is to be signed by the client's private key, which is authorized if the client can supply the correct response; (3) a secret known to server and client, which is similar to a public key in that if the client and server each know of a secret, the server can issue a challenge that is encrypted with the shared secret (either as a key or content, such as in an HMAC scheme) and returned to the server as a response; a phone number that allows the server to call and ask the user to confirm (e.g., by pressing a touch tone key), by entering a PIN code over the phone previously associated with the user's account, or by providing the user a code they need to input into the client) so that it may be, in turn, supplied to the server to prove that the user of the client and the owner of the phone number are the same; (4) an e-mail or text message sent to an address associated with the identity to confirm the enrollment of the new client; (5) a hardware identifier that may be used to determine identity of the client (e.g. IMEI, IMSI, UDID, MAC address, serial number, or other unique identifier provided by device's hardware), and which, because hardware identifiers are not always secret, may be used alongside other mechanisms to strengthen authentication or provide additional context to server when evaluating client-supplied information (e.g., a hardware ID associated with hardware that has previously authenticated successfully may be treated differently than a hardware ID that has not previously authenticated; (7) a cookie that was previously set from past contact with the server and which the client may later provide to associate the client with whatever the server knows about the previous client that connected with the corresponding cookie identifier; (8) a stored token/cookie, which may be a random identifier that the server looks up in a dataset of known identifiers associated with accounts, and which may be digitally signed (e.g., JWT) so that the server can verify that the token was created by a trusted entity, by which when a client was previously authenticated with a server, the server may provide a token or other information that the client stores and provides to server in subsequent interactions, proving that the client is associated with the previously authorized client.

To minimize authentication requirements for new enrollment associated with a contact address (e.g., phone number, email, IM service, social network account, etc), the client may provide a messaging address. If no account associated with messaging address, the client is given access to a newly created account. If there is a previously associated account, then require the client to authenticate with that account (e.g. one of the above methods). If the client is on the same network as existing client, then certain network information can be used in the authorization context. Alerting on new client added to account can be handled by determining if the client is new (as determined by hardware ID, no cookie or auth token, etc.), sending an email or other alert to the user, or requiring confirmation from another client authenticated on the user's account to allow access, or requiring an additional authentication step.

Once proper credentials are provided, an authorization is issued. An authorization from the server is an indication (e.g. yes/no, true/false) of whether the action is allowed. The authorization can also take the form of a token that grants access or is proof of allowance of an access, token can be provided to any system that needs proof that a given user is authorized for a particular action. Alternatively, callback to a system indicating that the user is authorized can serve as authorization.

In some embodiments, the authentication server performs authorization of the requesting client to determine what account on the server the client is associated with, and this may happen before performing authorization, or as a result of the authorization process (e.g. that specifies how to authenticate the requesting client). Certain examples of authentication are given below. In one case, the server requests user-confirmation for authorization using an authorizing client to perform authorization. The server contacts an authorizing client, which is responsible for determining whether or not the request is authorized. The server may use a push mechanism to be able to send a message to client with low latency. Example methods include Google Cloud Messaging, Apple Push Notification Service, HTTP Long-Poll, SMS, outstanding TCP connection between client and server or push service (e.g., Lookout cloudpush). The message pushed to authorizing client may contain information about the request, or it may be an indication that the client needs to create a secure connection to server to retrieve the information. The authorizing client displays information about the request such as through a user interface dialog or notification mechanism on a mobile device. The information can include the site or service being logged in to, the operation being performed (e.g., a bank operation like transfer $1203.11 from account—2912 to "Sally"), an IP address, location, username, device nickname of the requesting client, a picture of user, taken by camera of requesting client. The user then confirms or denies request on authorizing client UI. Confirmation by be action required to confirm, such as: press a button, enter a PIN code, facial recognition using device camera, voice (e.g. authorizing client asks user to speak a phrase, client processes voice locally and/or send audio to server for matching against known user voice information), hand geometry, retinal analysis, blood vessel pattern on eye, blood/DNA analysis/sequencing, fingerprint reading on device, teeth geometry identification (e.g. using device camera), secure token input required, RSA secure ID generates rotating number, user required to enter token's output into authorizing client, NFC device required to be read by device's NFC reader. the NFC device may simply have an identifier that is confirmed by client or server, or may perform cryptographic operations (e.g. signing a challenge sent by server) to guarantee its presence, or biometric data.

The client may provide trusted information as part of user confirmation in order to prove the legitimacy of the server. For example, a user may be asked to enter a pin code or password on a confirmation interface; however, if malware impersonates the interface, it may fool a user into entering his or her pin or password. In an embodiment, this problem solved by displaying trusted information that only the server would know on the interface so that the user is aware of this (e.g., Bank of America SiteKey shows a picture on its website when asking for a user to enter his or her password). The trusted data may be intended to be consumed by the user or a client, or both (e.g., a picture may be consumed by a user, but a cryptographic signature may be only consumed by a client and both may be present in a given authorization request). The trusted data can be set by one or more several processes, such as: pre-set by the user, generated by the server when a user first enrolls, retrieved from an account associated with the user (e.g., Facebook, email), using authorization context information discussed elsewhere (e.g. you're currently on this network, or at this location), or retrieved from a service with knowledge of the user (e.g., credit reporting service that knows the user's previous address, financial institutions, etc.). Examples of such data includes: an audio or video recording, photo, sound, text (e.g. word, phrase, sentence), cryptographic signature, or a message coming from a known source populated with caller ID or as a sender or reply-to address of a message.

In an embodiment, the authorizing client sends the results to the authentication server. This may be done in one of several methods, such as the client authenticates using any of methods described herein (e.g., relay of known credential, hardware ID digitally signing response using client's private key, where public key known to server) and provides result data over SSL/TLS to the server. A network provider may add header enrichment to request sent from authorizing client to server, thereby providing additional context to server of device's identity. e.g. device phone number, IMEI, IMSI, or other information added to HTTP header. A digital signature of result data may be used, where the server knows the public key of device, and the device signs data with its private key, or using symmetric keys, device uses HMAC or simply encrypts data with key known to both server and client. This exchange may take place in a TPM or secure system (e.g. TrustZone).

In an embodiment, the authentication server stores the result of authorization for non-repudiation purposes so that a user is not able to deny or repudiate an action. Examples of this method include a bank having a user's voice confirming the transfer; face images; speech, physical signatures; and location information.

The authorizing client may embodied in one or more forms, such as: a dedicated application, an application built into a platform (e.g., Facebook), an application integrated into another application (e.g. security application), a mechanism built into operating system or into a SIM card or other hardware module.

In a case where the authentication server contacts a known address associated with the user to perform authorization, several different address types may be used, such as: e-mail, phone, SMS, IM, among others. The authorization options include: the message may be directly intercepted by the client (e.g., if text message, an app can intercept the message; if email, it may be a browser or email client plug-in) and contain an identifier that the client can relay to server to prove its association with the address (e.g. server provides credentials to requesting client only or associates requesting client with a particular account if it can prove it can receive messages at a given address); the message may contain an identifier that should be entered into a client by the user, the client sending the identifier to the server; the message may ask the user to visit a web portal or simply a request to visit a web portal to confirm the authorization; the message may request that the user reply to it, the server receiving the reply and interpreting it to determine if the user has confirmed or not; the message may contain a link for a user to confirm by clicking, and this link would have a token that identifies the user's web browser as the same user as the recipient of the message. In this case, the server may interpret visiting this link as authorizing the request or may require an additional confirmation by the user (e.g., the server displays additional information and requires that the user click a button to complete the authorization). The client, if able to intercept the email or the link being visited may intercept the token and provide that as proof to server that the client is associated with the identity.

In an embodiment, the authentication server uses context information to perform authorization of the requesting client and/or the user. The authorization may take into consideration information provided by the client, e.g., provided as part of requesting client's request content, requested by server from requesting client or another client determined by server as a result of processing information from a client (e.g. geo-ip, mobile network operator location lookup), retrieved from another server or service, associated with the account and stored at server. Location is also another item of context, and such location can be determined via: geo-ip, provided by clients (e.g., by GPS or other on-device location systems), nearby wireless infrastructure, e.g., Wi-Fi access points (APs) which may supply Wi-Fi SSIDs, BSSIDs, type of authentication information, any other information gatherable about the APs, and signal strength information, Bluetooth: nearby discoverable device addresses and names, celltowers: single or multiple neighbor cells, cell identifiers, signal strength, etc. Location may be used as sole factor or contributing factor to authorization decision. Requesting client in known location that has previously been authorized from the same exact location, same city, etc. For the location of multiple clients, the server receives location of both requesting client and authorizing clients (e.g. when receiving request from requesting client, contact authorizing client and receive its location), and if the authorizing client is in the same location as the requesting client, the request may be authorized or treated differently (e.g. lower security method of authorization) than if they were in different locations; or the authentication may be completely denied. Other forms of location can be integrated to determine if requesting client and/or authorizing client is in an appropriate location for the user, such as: credit card transactions, social network check-ins, building access control systems, facial recognition cameras, network-based location systems (e.g. mobile phone or laptop connected to Wi-Fi in a particular location).

The network may be determined by one of: client provided network configuration information, or the server determining source information from the client. Types of network information include client provides configuration information (e.g. ip, default gateway, netmask, DNS server, domain); client provided neighbor device information such as: other device MAC addresses, e.g. gateway MAC, other device IPs, other device names (e.g. using SMB or MDNS); client provided Wi-Fi information (e.g., currently connected access point). Authorization may be based on same IP address or network/Wi-Fi AP. If a requesting client and authorizing client are on the same network (e.g. same public IP, same Wi-Fi access point, as supplied to server by both client, or otherwise have network information that they supply to server that corresponds), server can determine that the clients are in the same place, and reduce or eliminate the need to perform further authorization.

Application data may be determined by pre-associated info with account, retrieved from another server (e.g., MDM or MAM provider) or provided by client. Authorization may be based on the risk posed by applications on a device, or a fingerprint of apps installed on device (e.g. used as a characteristic to determine whether authorizing client or requesting client is legitimate).

Information regarding common accounts can also be used. If a requesting client and an authorizing client are both logged into the same service, the server can use either as authentication (e.g. if two devices each have access to the same e-mail or Facebook account, they both represent the given user), or authorization (e.g. if a device has access to multiple common accounts, it may be considered less risky than a device that has access to no common accounts). Services can include: e-mail account, Facebook, Google, or same network provider account (e.g., two mobile phones on a common account, two computers on the same ISP account). The process entails multiple clients providing account information to server (e.g. phone number, email address, user id), and the server validating that one or more accounts are in common. account information may be stored at the server so that a new client may be compared without having to communicate with previous clients. Methods of validating commonality include: each client authenticates with the service's authentication mechanism (e.g., Facebook connect), and can prove to server that it has done so (e.g., with OAuth, server receives callback that client has successfully authenticated), the client retrieves credentials associated with account and encrypts them, sending to server. If both clients have the same encrypted credentials, proves that they share the same level of access relative to that account. This may be full access, partial access, or no access, and credentials may be a stored token (e.g. a cookie), username/password, certificate, or other information, such as those described above.

The authorizing client may exhibit certain device usage anomalies, depending on what kind of device is used, and its sensitivity to certain usage or environmental conditions, and which may need to be accounted for by the authentication system. Types of anomalies include sensor input (e.g. accelerometer to track gait), location pattern vs. historical locations (e.g. may take into account time of day, day of week, etc.), device usage patterns (e.g. calling, app usage). This information may be gathered on the device or the server and analyzed on the device or server. If analyzed on the device, the device may report the current data and the historical, for the server to determine anomalies, or it may report to the server whether or not the device is in an anomalous usage state. The authentication server may use this information to allow authorization as follows: if device usage patterns are anomalous, do not authorize, or require stronger authorization.

In certain cases, the server may require strong authorization at the authorizing client. This requires that a user present an NFC credential which contains a secret code or that performs cryptographic operations (e.g., digital signature, HMAC) to verify its presence, and the authorizing client sends data to the server. Strong authorization may also require that the authorizing client be within range of a proximity security device (e.g. Bluetooth-enabled token) associated with user. The authorizing client may request information from the proximity security device or request that the proximity security device perform a digital signature or other cryptographic operation. The proximity security device may be a dedicated token or a user's PC, laptop, or a fixed proximity security device provided at a user's workplace. In an embodiment, if there is strong authorization present, no user intervention is required to authorize the request.

Authorization requirements may change based on information available to server. The determination of what authorization steps to take (if any), and how to determine whether or not the request is authorized may be based on a number of factors. Such data can include the context information described above. Examples of input to determine what level of authorization is required include: all authorizations are treated the same (i.e. no step of determining what form of authorization to do); server configuration/policy; requesting client configuration/policy or user input; based on type of authorization, e.g., if requesting client wants a one-time authorization vs. an authorization to access a number of services for the next 30 minutes creates different levels of authorization, access to view a bank account balance may be different than access to transfer money from the account. The fact that another client provides info (e.g. authorizing client configuration/policy) may also be a factor. The request may specify what type of authorization is needed, and the time since last authorization (e.g. if there has been a successful authorization in the last hour, use a lower form of authorization) may also be a factor. Likewise, the number of authorizations (e.g. first for this client has higher level of security than the hundredth) overall or for a particular service, or the risk level determined about requesting client, authorizing client, account, or service may also have an impact. If a device has malware, a client installed on that device may be treated with lower trust than a device without malware. Likewise, a service that has a high rate of fraud may be treated differently than a less-targeted service. The rate of fraud for a service may be based on recent activity. For example, lots of fraud today increases the overall authorization requirements for that service, whereas tomorrow if there is less fraud, there is a lower authorization requirement. The level of fraud can be automatically determined based on unsuccessful authorizations or specified by service, e.g. high/med/low. The location of the requesting client, authorizing client, or both, as determined by GPS, cell ID, presence on a given network (described below), Wi-Fi access points nearby, etc., may also be a factor, such that if a location is a high risk area, then the system performs a different level of authorization than a low risk area, e.g., some countries have higher fraud rates. For those countries the same action may trigger higher authorization requirements than countries with lower fraud rates. A location difference between requesting client and authorizing client may trigger a change, such that if they are in the same place, then may have lower authorization requirements than in different places. Also a factor is any policy that the service being authorized may have toward the specific account or requesting client, or global policy/configuration (e.g., for a bank transfer, the bank may specify what the level of authorization required is). Any combination of the above mentioned factors may also be considered. For example, if requesting client has a successful login to a particular service, record its location at server side. If the requesting client wants to log in to that service again, there may be a lesser authorization requirement than the first time if that client is in the same location than if that requesting client is in a different location. If the requesting client is in a different location, the level of authorization may be less than the first time, but more than if it were in the same location as the first login.

As stated in the Background section above, the most common security factor in use today is simple password protection, in which the credentials provided by the user comprise a username/password combination that is validated by the target server (or close proxy). Embodiments of the authentication management system extend password management to include a greater identity management model for all online interactions performed by a user, and to reduce or eliminate the need to use any password to perform user authentication. In an embodiment, this is achieved by providing an authenticating client or similar authorizing device that communicates with the authentication server 102 to exchange and validate the credentials of the user on behalf of the target server 114. The authentication management platform 101 implements aspects of a multi-factor authentication (MFA) method that authenticates the identity of a user by one or more multiple factors, of which there are three major types: something one knows, something one is, and something one has. Examples of something that one knows include passwords, passphrases, or codes, and is the most common form of single-factor authentication; examples of something one is commonly comprises biometrics, such as a fingerprint, drop of blood, retinal scan, and the like; and examples of something one has include something that is uniquely possessed, such as a security token with a dynamically refreshed password displayed, or a physical or electronic key, and the like.

Figure 2A:
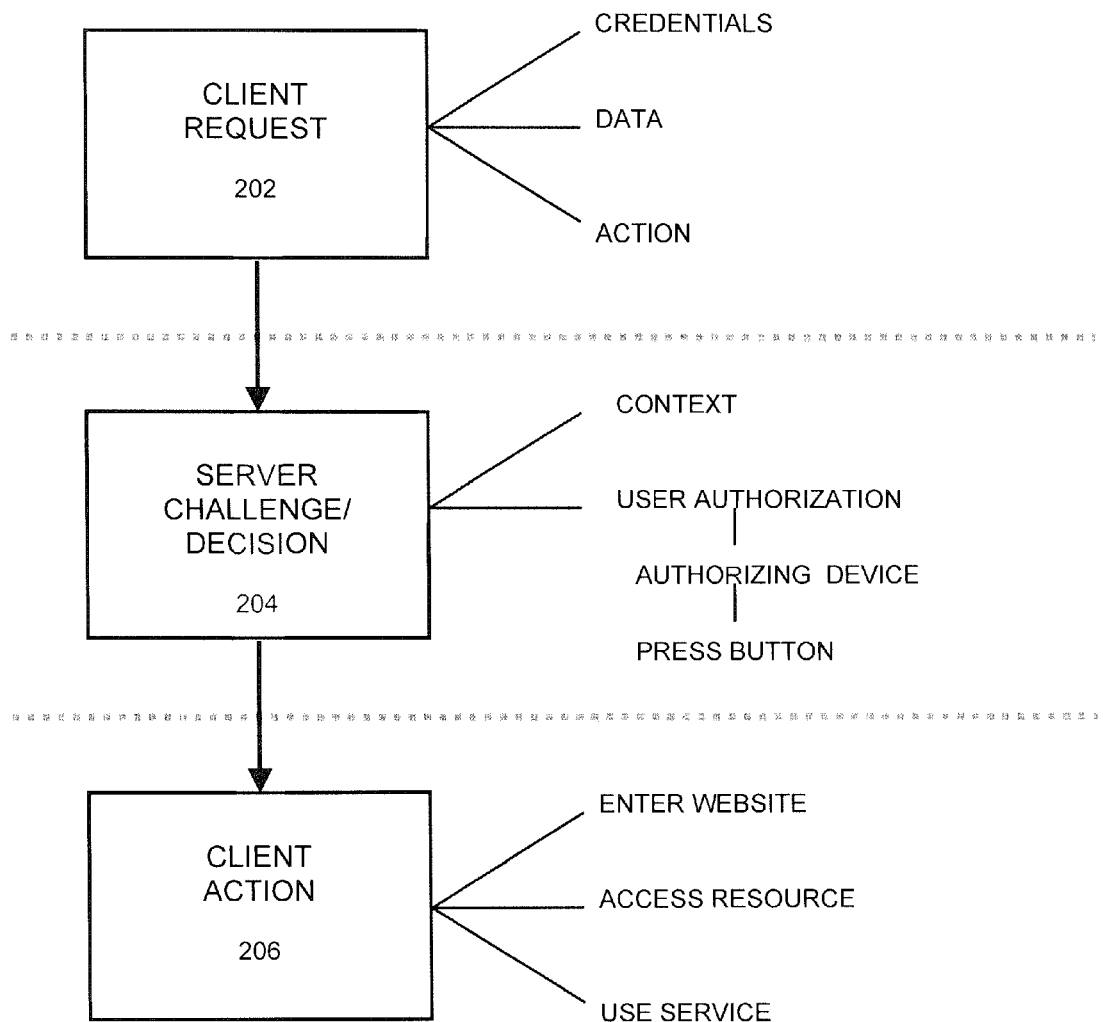
FIG. 2A is a flow diagram that illustrates client server exchange to validate user credentials, under an embodiment.

FIG. 2A is a flow diagram that illustrates client server exchange to validate user credentials, under an embodiment. As shown in diagram 200, the client request 202 comprises information that proves the identity of the client including credentials, such as a token, or username and password, or any of the other authorization objects mentioned above. The request may be of several types, such as a request for data, access to a service, to perform an action, or credentials. Data can be e-mail or other stored information associated with a user account, access to sensitive data, or a decryption key for sensitive data. For access to a service, the server may proxy access to a service and control the client's access to that service.

The client request 202 is processed by the server in a challenge and decision action 204. The challenge utilizes the context of the exchange and the decision is based on authorization based on the credentials provided by the user. In an embodiment, the user authorization is provided by a separate authorizing device or client. Upon valid authorization, the decision by the server allows the client action 206 to be allowed, in which case the user is allowed to enter the website, access the resource, or use the requested service, or other desired action.

In an embodiment, the response to the server challenge comprises the client sending the username and password of the user to the server. The server checks whether or not the password entered on the client matches the password associated with the identity. An encrypted or hashed version of the password may be used. As stated previously, various other methods of authentication may be used. For example, the client may supply a public cryptographic key or certificate containing such a key that corresponds to a public key the server is aware of. In order to prove that the client has a corresponding private key, the server may issue a challenge that is to be signed by the client's private key. If the client can supply the correct response, access is granted. When using a digital signature, the client may alternatively initially supply an identifier that corresponds to a public key known to the server. The challenge response can also be based on a secret known to both the server and client. Similar to a public key, if the client and server each know a secret, the server can issue a challenge that is encrypted with the shared secret (either as a key or content, such as in an HMAC scheme) and returned to the server as a response. The challenge can also or instead utilize the user's phone number or other real-time contact mechanism. In this case, a client may specify a phone number, which is called by the server. The receiver must then confirm by entering a code or sequence over the phone line previously associated with the user's account. Similarly a text or e-mail can be sent to the user for which an appropriate response must be provided. A hardware key could also be used as a mechanism to respond to a challenge. A hardware identifier of the client can be used to determine the identity of the client (e.g., IMEI, IMSI, UDID, MAC address, serial number or other unique ID associated with the client device. Hardware IDs are not always secret, so this mechanism may need to be used in conjunction with one or more of the other challenge response mechanisms.

Other challenge response mechanisms include cookies. In this case, the client may provide a cookie that was previously set. The client can later provide the cookie that associates the client with something the server knows about the previous client that connected with the corresponding cookie identifier. Similarly, a stored token can be used. When a client is previously authenticated with the server, the server can provide a token that the client stores and provides to the server in subsequent interactions. The token may be a random string that the server looks up in a dataset of known identifiers associated with accounts. It may be digitally signed so that the server can verify that the token was created by a trusted entity.

Under an embodiment and as shown in FIG. 1, an authorizing client 130 is associated or used with a requesting client 112 is used to provide the credentials of the user to the user authentication management platform 101 to access the target server 114. The authorizing client 130 is a device that is possessed and controlled by the user and is used by the authentication server 102 and/or target server 114 to authorize the request and allow access to the target server 114. One or more of the servers of system 100 may store the user credentials. In certain cases authorizing client 130 may access these credentials, or it may store these credentials itself for transmission to the appropriate server. In an embodiment, the authorizing client is embodied in a mobile phone 132 or similar device (e.g., a small tablet or PDA) that is small and portable and that can be linked with the requesting client (112, 118, 119) over a wireless link or direct connection. It is intended to be used in close proximity to the requesting client during the authentication process. In an embodiment, the authorizing client 132 may operate in conjunction with a client-side authentication process executed locally on the requesting client, and/or it may communicate over appropriate wireless links to the server-side authentication login component 106.

For an embodiment in which the authorizing client 132 is a mobile or cell phone, it may operate in a networked environment using logical connections to the requesting client 112, 118 or 119 via one or more communication interfaces. The communication interface may interface with a wireless network and/or a wired network. Examples of wireless networks include, for example, a BLUETOOTH network, a wireless personal area network, a wireless 802.11 local area network (LAN), wireless telephony network (e.g., a cellular, PCS, or GSM network), and/or near field communication (NFC). Examples of wired networks include, for example, a LAN, a fiber optic network, a wired personal area network, a telephony network, and/or a wide area network (WAN). In many use cases, the requesting client is typically a computer, such as desktop computer 112 or laptop/notebook computer 119 or tablet computer 118, and the user is logged in through a mobile authorization client, such as a smartphone 132 or other similar device. Alternatively, the smartphone 132 could be used as the requesting client and the associated computer 112, 118 or 119 could play the role of the authorizing client.

In an embodiment, the authentication server 102 requests user confirmation for the authorization, and the authorizing client is used for the authorization. The server 102 contacts the authorizing client 132 that is responsible for determining whether or not the request is authorized. The server may use a push mechanism to send the message to the authorizing client with low latency. The message pushed to the client may contain information about the request, or it may be an indication that the client must create a secure connection to the server to retrieve the information.

During the authorization process, the authorizing client 132 displays information about the request to the user through appropriate user interface and display mechanisms on the device. Such information can include the site/service being logged into, the action being performed (e.g., bank transfer), the IP address, location, or username of the requesting client, and a picture of the user taken by the camera of the requesting client.

Upon reviewing the request, the user either confirms or denies the request through appropriate user interface input. An action may be required to confirm the request, such as pressing a command button, entering a code, voice command, biometric input, or other similar input means. The client may provide trusted information as part of the user confirmation in order to prove the legitimacy of the server. Such trusted data can be predefined, generated by the server upon user enrollment, stored in a user account, derived from context data, or retrieved from a service that has knowledge of the user. Examples of trusted data include audio/video recording, photos, sound, text, cryptographic signatures, or messages generated from a known source populated with the caller ID, or similar data elements.

In an embodiment, the authorizing client 132 sends the result of the authorization to the authentication server 102. The client first authenticates the request using a relay of known credentials, digitally signed response, or other means, and provides the result data over a secure transmission channel. The network provider can provide header enrichment to the request sent from the authorizing client to the server, thereby providing additional context to the server of the device's identity. The digital signature of the result data can also be included. The authentication server stores the result of the authorization for non-repudiation purposes.

In an embodiment, the authentication server 102 uses certain context information to perform the authorization. Such context information can include information provided by the client, the location of the client (such as determined by geo-ip, GPS or other location finding means, nearby wireless infrastructure, cell tower or other device triangulation means, transaction locations, building locations, etc.), network information (e.g., client configuration information, IP address, gateway, netmask, DNS, server, network names, access points, etc.), application data (e.g., pre-installed apps), common accounts, and device usage patterns and anomalies. For common accounts, if the requesting client and the authorizing client are both logged into the same service, the system can use either as authentication or authorization, since a common user is likely involved. Multiple clients can provide account information to the server and the account information may be stored at the server so that a new client may be compared without having to communicate with the previous clients.

The authentication process 106 is dynamic in that authorization requirements may change depending on the information available to the server. The level of authorization may be characterized as weak, strong, or any value in a range depending on a number of factors. These include: server configuration and policies, client configuration and policies, user input, types of transactions (e.g., website access versus money transfers or building access or personal data access), transaction frequency (e.g., one-time versus periodic), vulnerability of the requested transaction (e.g., susceptibility to fraud or malware attack), location of the client (e.g., near or far from home, safe or dangerous location), and other similar factors.

In general, various data objects and signals are used and transmitted among the different client and server computers of FIG. 1. FIG. 2B is a table that illustrates the various possible instantiations of various data objects and signals processed by the authentication management platform 101 under an embodiment. As shown in Table 210 of FIG. 2B, various data objects processed within the system include user credentials, encryption keys, and other possible objects that are used to authenticate a user, message or other transaction within the system. The data objects, typically the user credentials, may be stored on the requesting client, the authenticating client, or the authorizing client. Typically the data objects are stored as unitary elements in one of the denoted locations, but in some cases they may be compound elements that are stored in parts in more than one location, such as a portion of the credentials or keys in the requesting client, and the other portion in the authenticating server or authorizing client. Other storage locations in the network may also be used, such as supplemental servers, cloud storage, and so on, in which case a separate authentication may be invoked to retrieve the data objects for use by the authentication platform 101. The credentials, key, or other data object and stored in encrypted or decrypted (unencrypted) form. In the case encryption is used, appropriate decryption processes are used at the point where the data object is utilized. The signals processed within the system include the request for the credentials, key, data, or any other authorization, a confirmation signal (e.g., yes/no), the returned credentials or other data object in either encrypted or decrypted format, an encryption key, and any other appropriate signal for the data objects and transactions within the system.

Figure 3A:
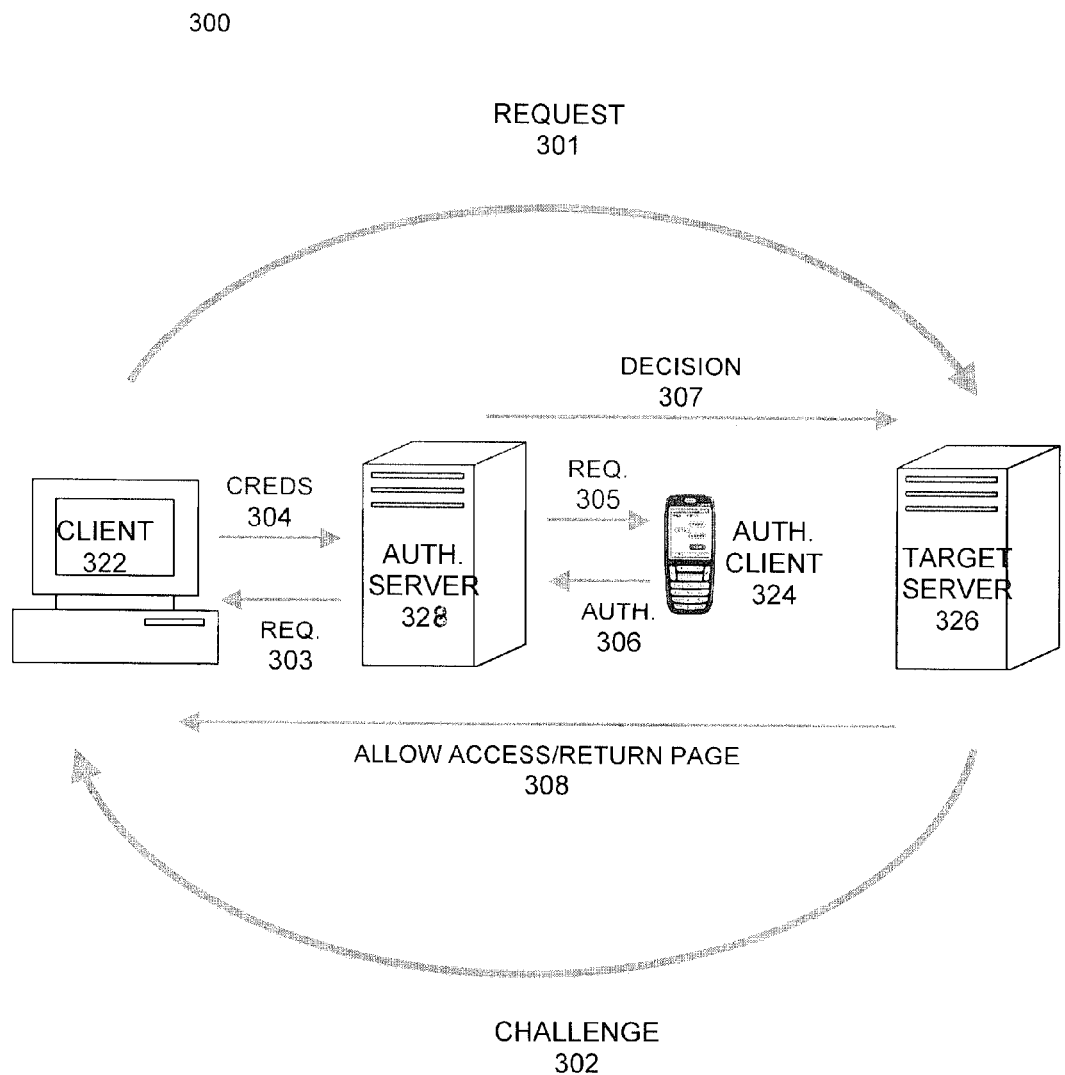
FIG. 3A is a flow diagram that illustrates a method of authorizing a user using an authenticating client device, under an embodiment.

FIG. 3A is a flow diagram that illustrates a method of authorizing a user using an authorizing client device, under an embodiment. As shown in diagram 300, a requesting client 322 transmits a request 301 to a target server 326. In response to the request, the target server 326 issues a challenge 302 back to the requesting client. In an embodiment, an authentication server 328 makes a request 303 to the requesting client 322 for authenticating data. The requesting client 322 may respond with credentials 304, directly, or an authorizing client 324 may be employed to provide the appropriate credentials for the user. In this case, the authentication request 305 is transmitted from the authentication server 328 to the authorizing client 324, which responds with the authorizing credentials 306. The authentication server then determines the validity of the returned credentials and passes the decision 307 to the target server 326. If the credentials are deemed to be valid, the client request 301 is granted.

In an embodiment, the authorization flow starts with the requesting client 322 identifying the authorizing client 324 to communicate with. Alternatively, the server may identify the authorizing client 324 based on the network information provided by one or both clients (such as through WIFI access point, common public IP address, etc.), or the requesting client 322 broadcasting to the local network, or other discovery means. Whether the requesting client or the server determines authorizing client could be based on the network information as described above or by user choice. For example, the requesting client may know about nearby authorizing clients based on proximity such as Bluetooth or network broadcasts if they are on the same LAN. Alternatively, the server may provide one or more "nearby" (based on IP, location, etc) authorizing clients and a method to reach them, such as an IP and port, broadcast address, Bluetooth address, etc.). The requesting client then requests authorization from the authorizing client. The request may need to be generated by the server and digitally signed by the server's private key, and the authorizing client only accepts requests that are validated against the server's public key. Alternatively, the request may be signed/validated against secret information associated with the account. The authorizing client receives the request and validates the request as legitimate. The authorizing client then performs the authorization and sends a response to the requesting client. The requesting client then either uses the response to complete the request (e.g., for login credentials) or provides the response to the authentication server as proof of authorization.

Figure 3B:
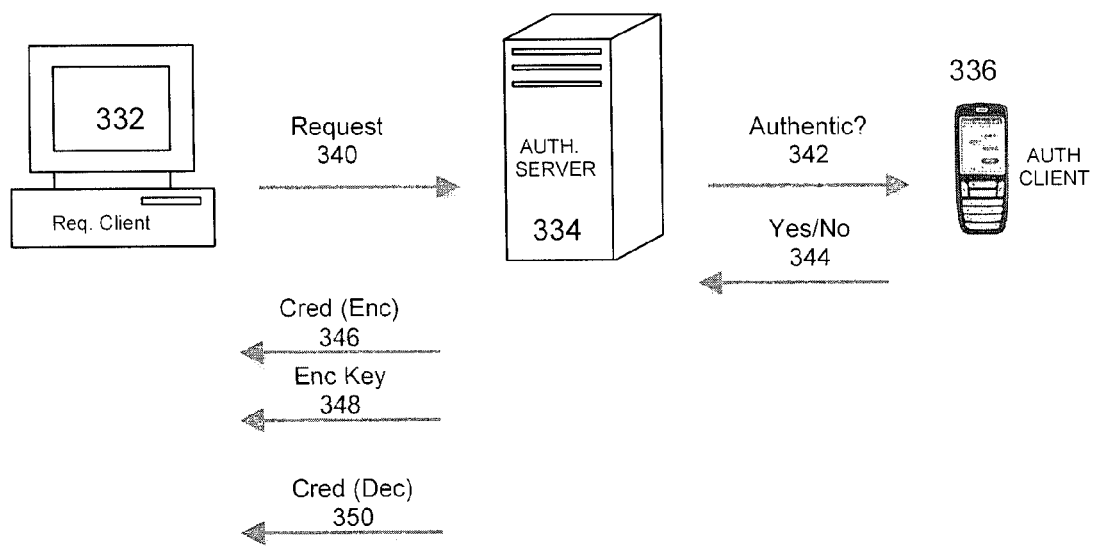
FIG. 3B is a flow diagram that illustrates a method of authorizing a user using an authorizing client device, under an alternative embodiment.

FIG. 3B is a flow diagram that illustrates a method of authorizing a user using an authorizing client device, under an alternative embodiment. System 330 represents a variation of system 300 in which the data objects comprising credentials and encryption keys are stored on the authenticating server. As shown in FIG. 3B, the requesting client 332 sends a request 340 to authentication server 334. The authentication server then initiates an authentication transaction with authorizing client 336 in which it sends a query 342 for confirmation, validation or authentication of the user of requesting client 332. The authorizing client then returns a yes or no response 344. If no response is returned, it is deemed to be a "no" answer. If the authorizing client 336 responds with a valid "yes" response, the authentication server then transmits the user credentials 346 to the requesting client 332. In one embodiment, the credentials 346 are encrypted, in which case, the encryption key 348 is also sent to the requesting client, either as part of the same message transaction, or in a separate transaction. The requesting client then performs the decryption operation to access the credentials. Alternatively, if the credentials are decrypted 350, they are simply sent from the authentication server 334 to the requesting client 332 as decrypted credentials 350.

Figure 3C:
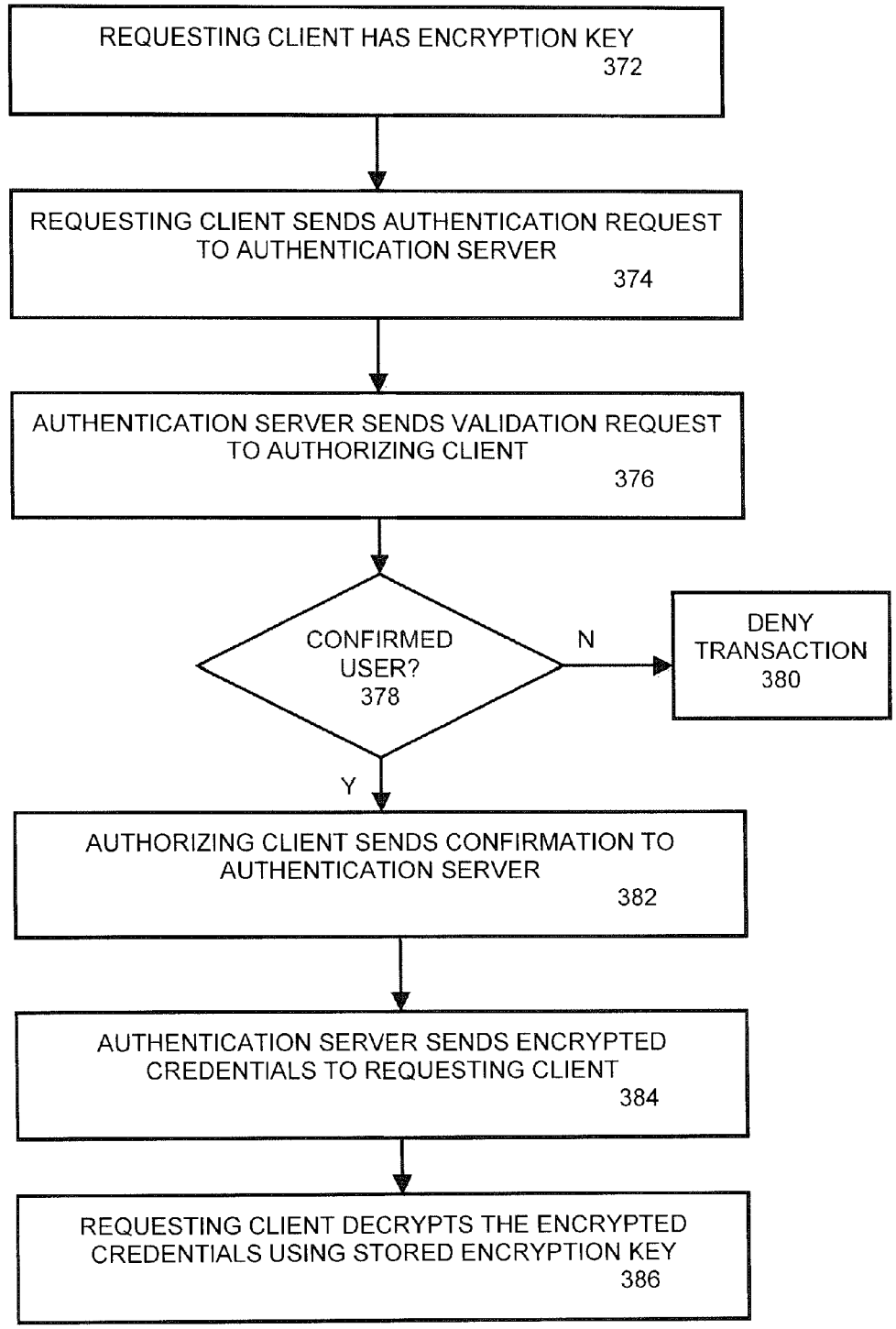
FIG. 3C is a flowchart that illustrates a method of credential transaction for the process flow of FIG. 3B under an embodiment in which the encrypted credentials are sent and the authorizing client validates the user.

As shown in FIG. 3B, the use of encrypted credentials requires the use of an encryption key as part of or as an additional transaction between the various entities of the requesting client, authentication server, and authorizing server, as well as any other intermediate computers that may be involved, such as key generators, key repositories, etc. FIG. 3C is a flowchart that illustrates a method of credential transaction for the process flow of FIG. 3B under an embodiment in which the encrypted credentials are sent and the authorizing client validates the user. For the embodiment of FIG. 3C, the requesting client stores or otherwise has access to the encryption key, act 372. The requesting client send a request to the authenticating server, act 374, and in response, the authenticating server sends a request to validate or verify authorization of the user to the authorizing client, act 376. If the authorizing client does not confirm or sends an invalid response as determined in decision block 378, the transaction is denied, act 380. If the user deemed to be authentic, the authorizing client transmits a valid message to the authentication server, act 382, and the authentication server then sends the encrypted credentials to the requesting client, act 384. The requesting client can then decrypt the encrypted credentials using the stored encryption keys, act 386.

Figure 3D:
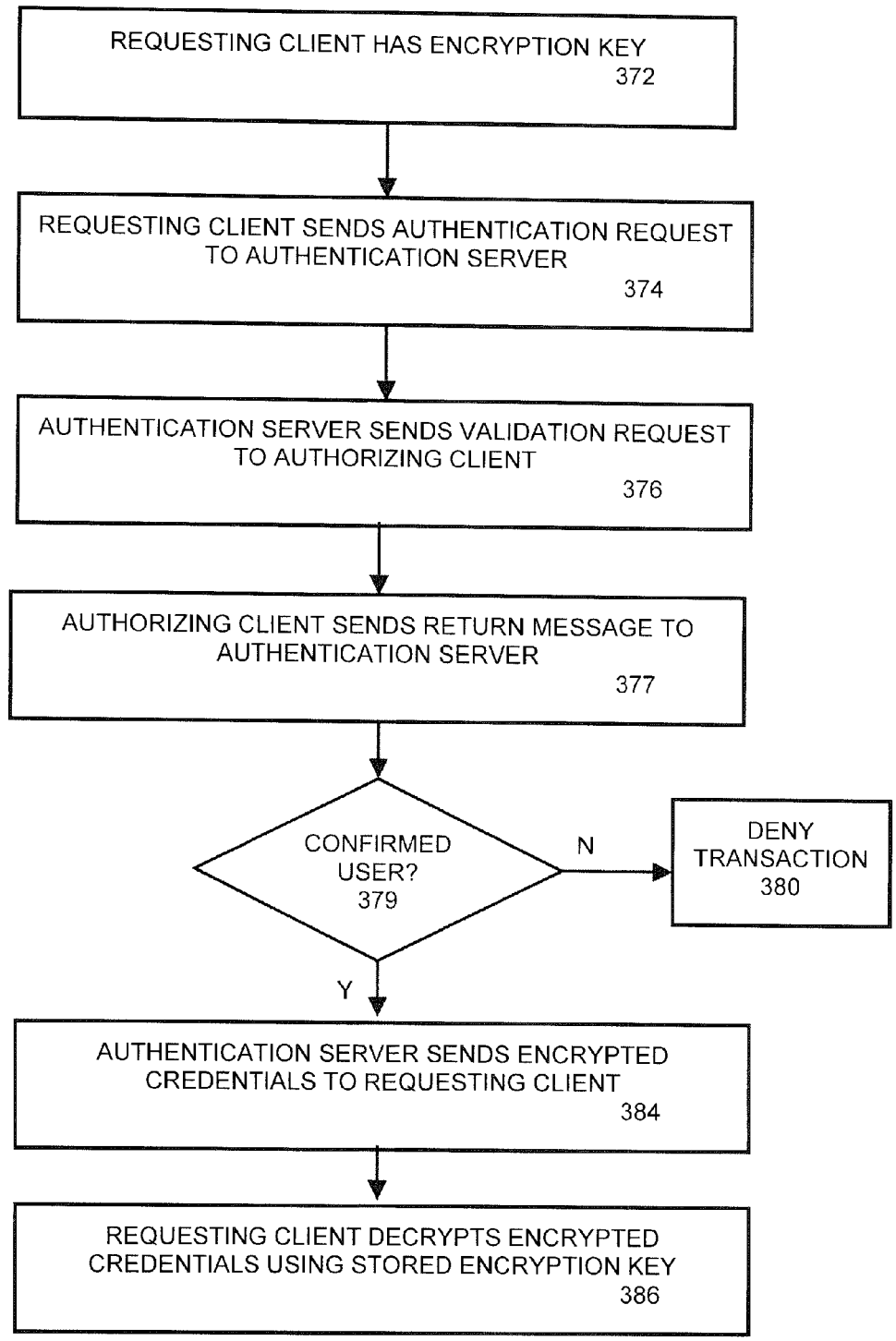
FIG. 3D is a flowchart that illustrates a method of credential transaction for the process flow of FIG. 3B under an embodiment in which the encrypted credentials are sent and the authentication server validates the user.

In an embodiment, the decision to validate the user 378 may be performed by the authentication server, in which case, the authorizing client sends a response to the authentication server and the authentication server then validates the identity of the user and then sends the encrypted credentials to the requesting client, if the user is authenticated. This alternative method is illustrated in FIG. 3D in which the authorizing client sends a simple return message, act 377 to the authentication server in response to the validation request, 376. In this case, the authentication server matches the return message against validation data to confirm a match between the authorizing client data and pre-defined validation data for the user. For example, the validation request from the authentication server may cause the authorizing client to simply return its own phone number and the authentication server can then verify that this is a correct response. Any other appropriate data string or data object can also be used. Thus, for method 371, the decision block 379 is performed by the authentication server prior to sending the encrypted credentials to the requesting client, act 384.

Figure 3E:
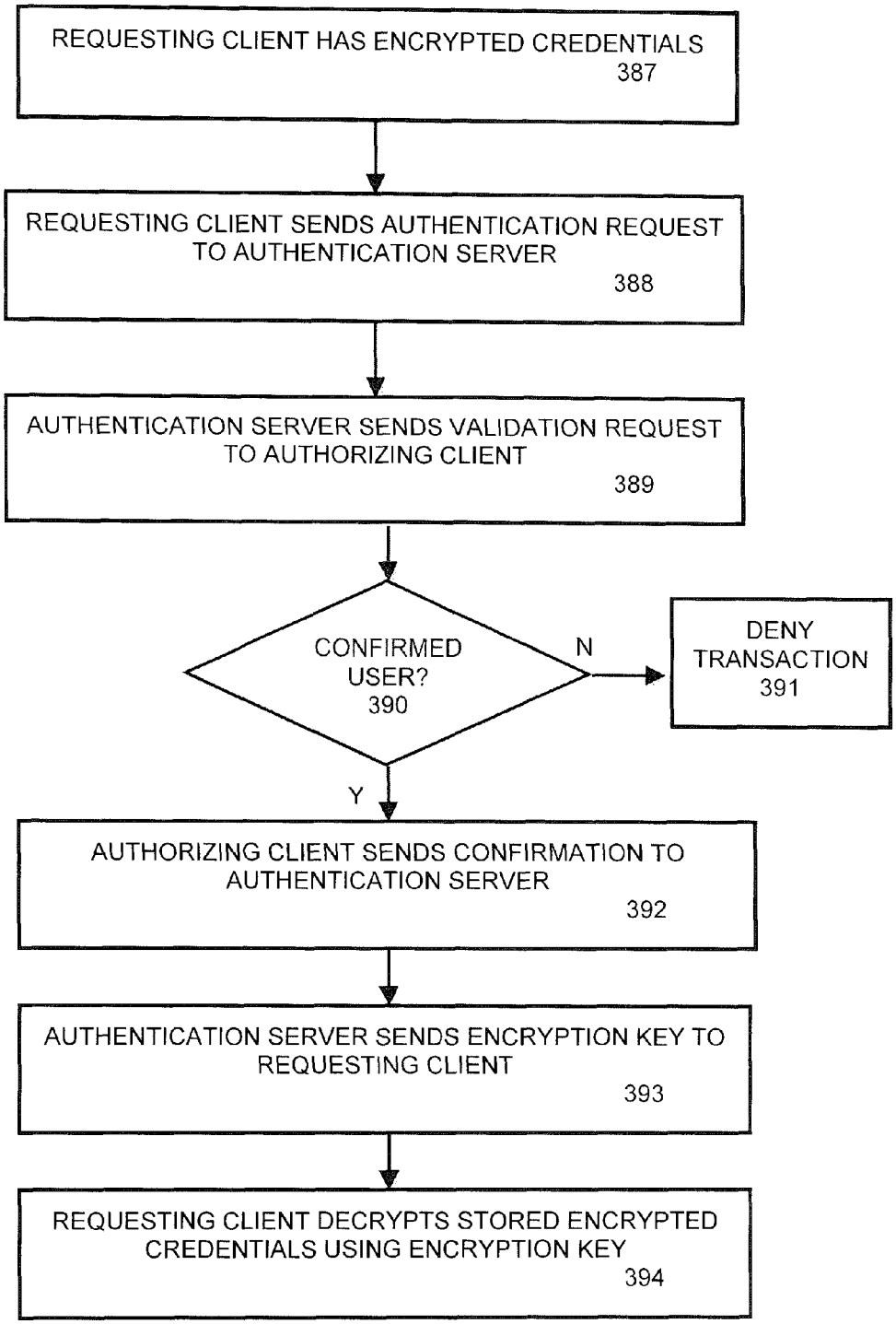
FIG. 3E is a flowchart that illustrates a method of credential transaction for the process flow of FIG. 3B under an embodiment in which the encryption key is sent and the authorizing client validates the user.

For the embodiments of FIGS. 3C and 3D, the authentication server sent encrypted credentials to the requesting client, which stored (e.g., locally) the encryption key. In an alternate embodiment, the requesting client can store the encrypted credentials and the encryption key represents the data object controlled by the authentication server for transmission to the requesting client upon authentication of the user. FIG. 3E is a flowchart that illustrates a method of credential transaction for the process flow of FIG. 3B under an embodiment in which the encryption key is sent and the authorizing client validates the user. As shown in method 385, the requesting client stores or otherwise has access to the encrypted credentials, act 387. The requesting client send a request to the authenticating server, act 388, and in response, the authenticating server sends a request to validate or verify authorization of the user to the authorizing client, act 389. If the authorizing client does not confirm or sends an invalid response as determined in decision block 390, the transaction is denied, act 391. If the user deemed to be authentic, the authorizing client transmits a valid message to the authentication server, act 392, and the authentication server then sends the encrypted key to the requesting client, act 393. The requesting client can then decrypt the locally stored encrypted credentials using the encryption keys received from the authentication server, act 394.

Figure 3F:
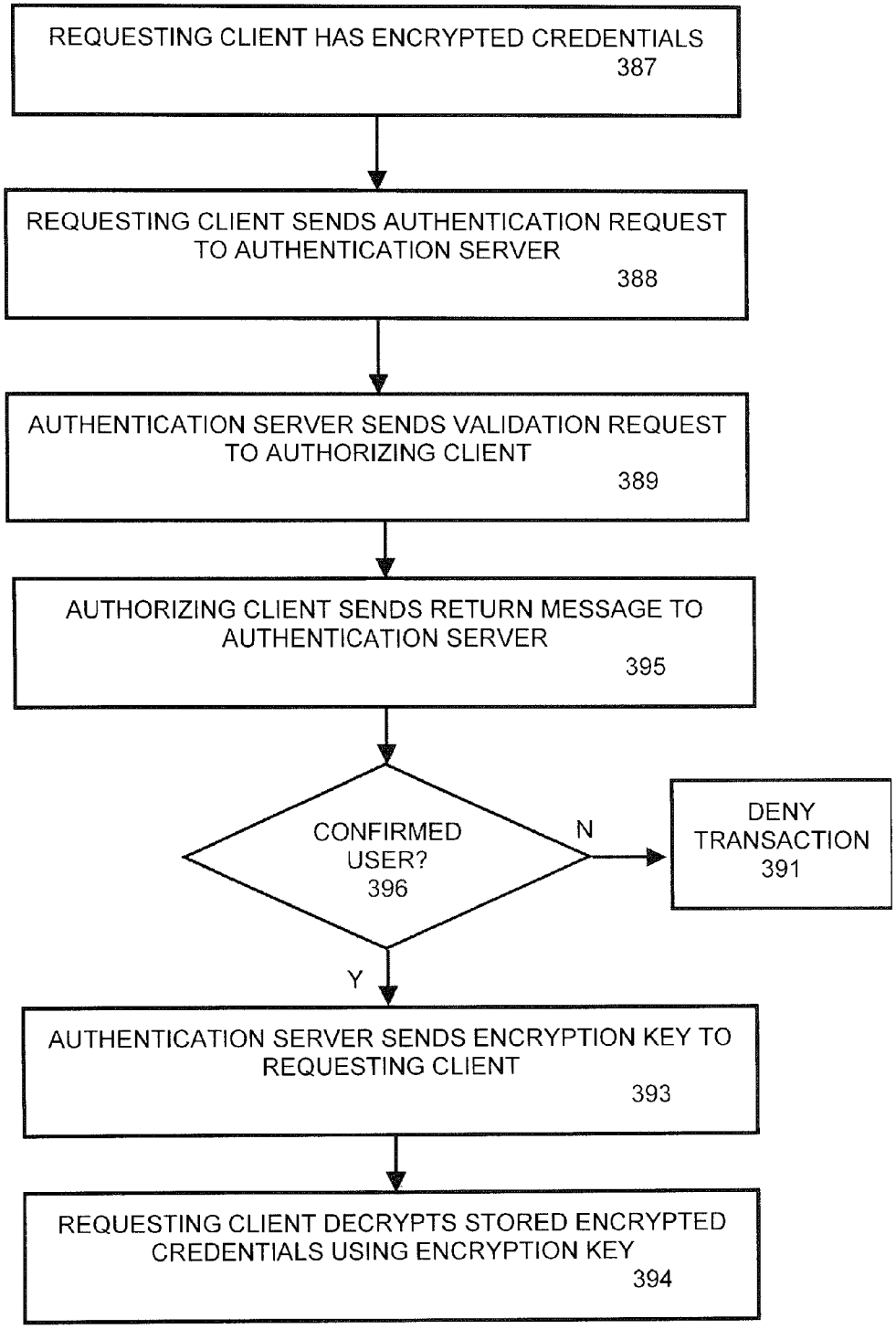
FIG. 3F is a flowchart that illustrates a method of credential transaction for the process flow of FIG. 3B under an embodiment in which the encryption key is sent and the authenticating server validates the user.

FIG. 3E illustrates an embodiment in which the decision to validate the user is performed by the authorizing client. Alternatively, this decision may be made by the authentication server, in which case, the authorizing client sends a response to the authentication server and the authentication server then validates the identity of the user and then sends the encrypted credentials to the requesting client, if the user is authenticated. This alternative method is illustrated in FIG. 3F in which the authorizing client sends a simple return message, act 395 to the authentication server in response to the validation request, 389. In this case, the authentication server matches the return message against validation data to confirm a match between the authorizing client data and pre-defined validation data for the user. Thus, for method 397, the decision block 396 is performed by the authentication server prior to sending the encryption key to the requesting client, act 393.

Figure 4A:
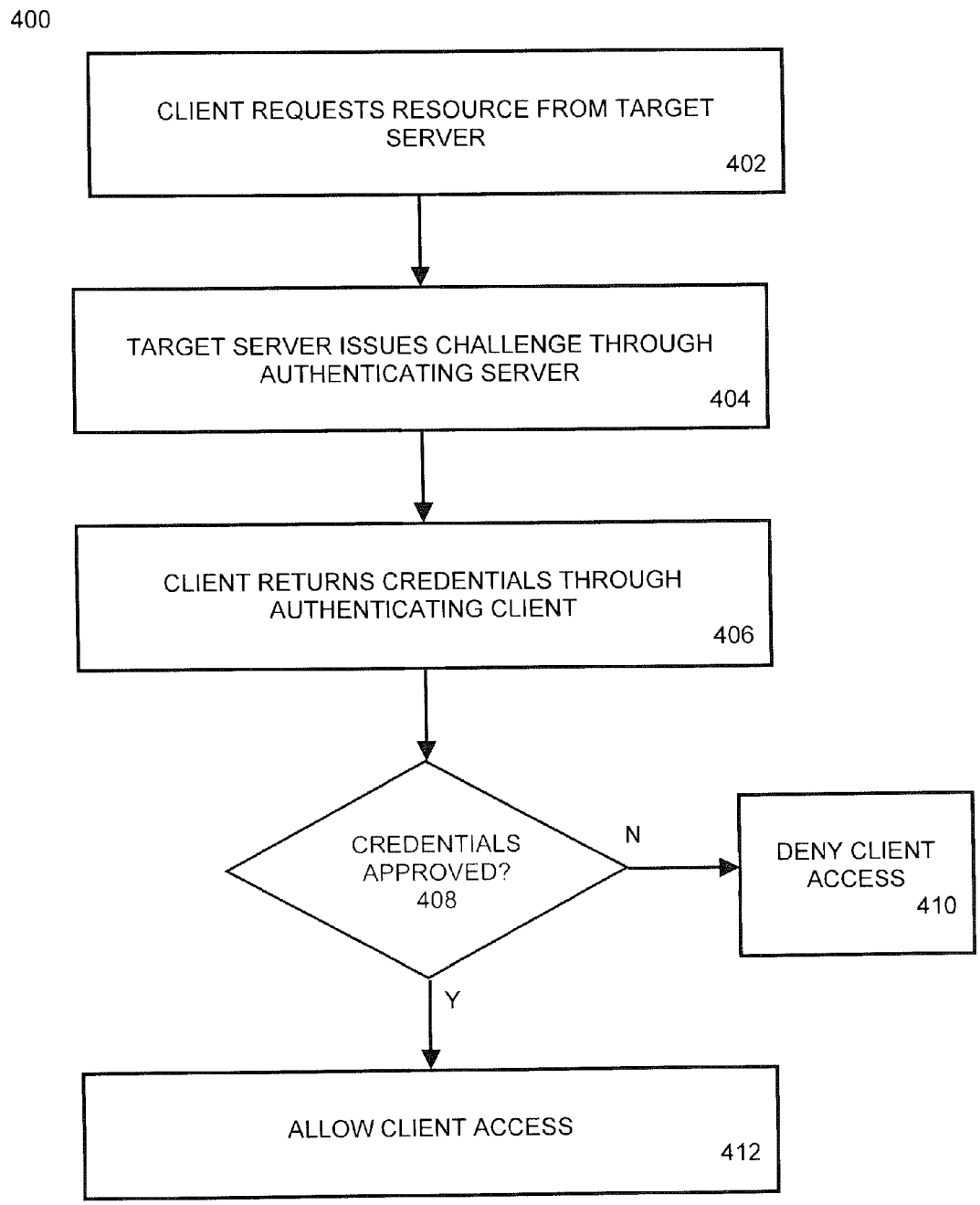
FIG. 4A is a flowchart that illustrates a method of performing user authentication, under an embodiment.

FIG. 4A is a flowchart that illustrates a method of performing user authentication under an embodiment. The process 400 of FIG. 4A begins with the user of the client making a request to access a resource on or through a target server, act 402. The target server then issues the challenge for authorization through the authentication server, act 404. The user's credentials are then sent to the authentication server by the authorizing client, act 406. In decision block 408, the authentication server determines whether or not the credentials are valid and approved. If they are not valid, the requesting client is denied access, act 410. If instead the credentials are approved, then the client is allowed to access the resource, act 412. FIG. 4A illustrates an embodiment in which the authorizing client stores or otherwise accesses or transmits user credentials directly to the server. In certain other embodiments, the authorizing client may be used to simply validate the user so that a credential exchange may be performed between the requesting client and the server.

Figure 4B:
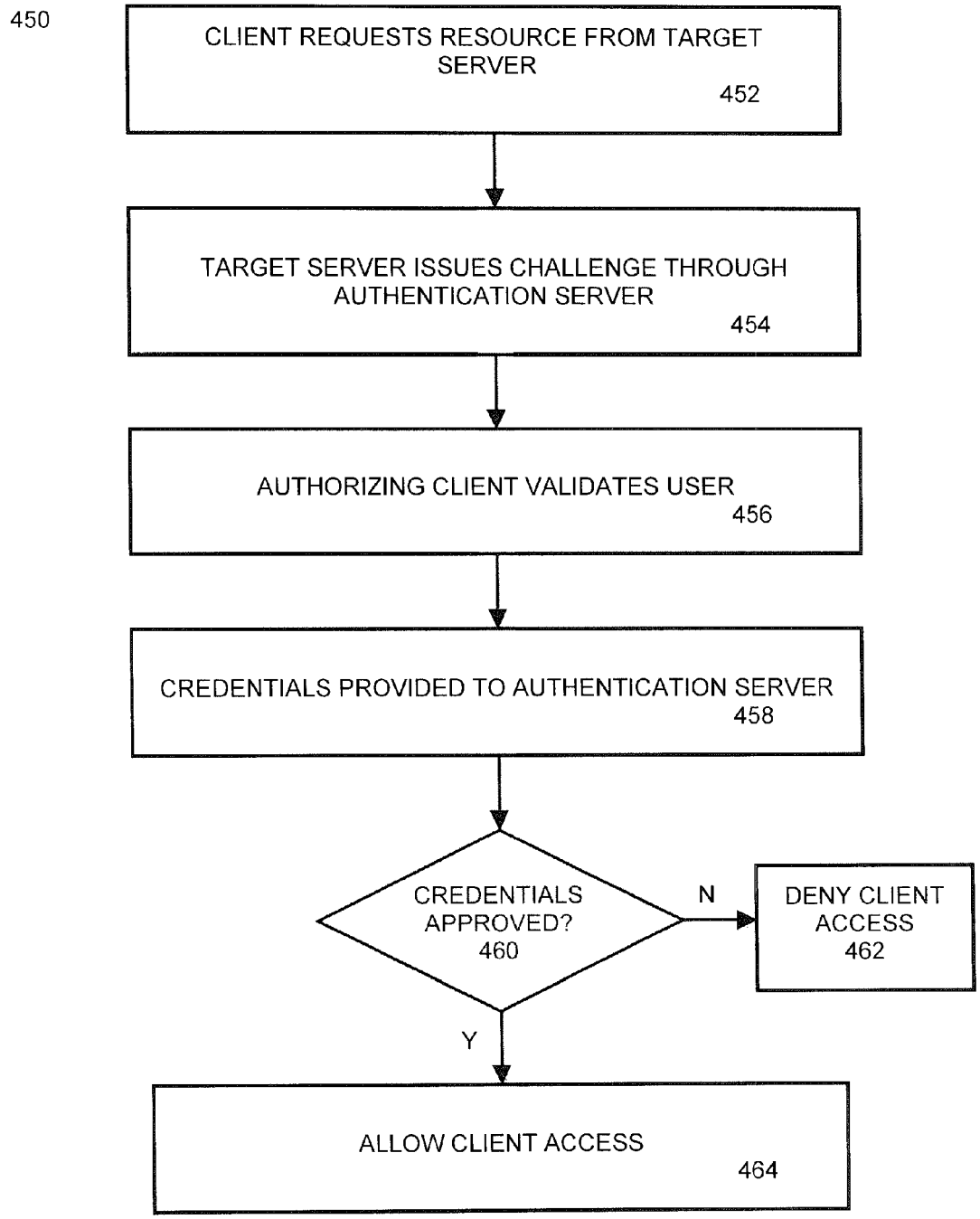
FIG. 4B is a flowchart that illustrates a method of performing user authentication under an alternative embodiment.

FIG. 4B is a flowchart that illustrates a method of performing user authentication under an alternative embodiment. The process 450 of FIG. 4A begins with the user of the client making a request to access a resource on or through a target server, act 452. The target server then issues the challenge for authorization through the authentication server, act 454. The user is validated by the authorizing client sending an appropriate indication to the authentication server, act 456. The user's credentials are then sent to the authentication server by whichever server or other resource is storing the credentials, act 458. In decision block 460, the authentication server determines whether or not the credentials are valid and approved. If they are not valid, the requesting client is denied access, act 462. If instead the credentials are approved, then the client is allowed to access the resource, act 464. In the embodiment of FIG. 4B, the authorizing client simply sends an indication to server, but authorizing client does not have any exclusive access to the credentials. The validation by the authorizing client 456 may occur after the request/challenge sequence (452 and 454) and prior to the credential exchange 458, as shown in FIG. 4B, or it may occur at any other practical time, such as after the credential exchange or before or during the request/challenge sequence.

Figure 4C:
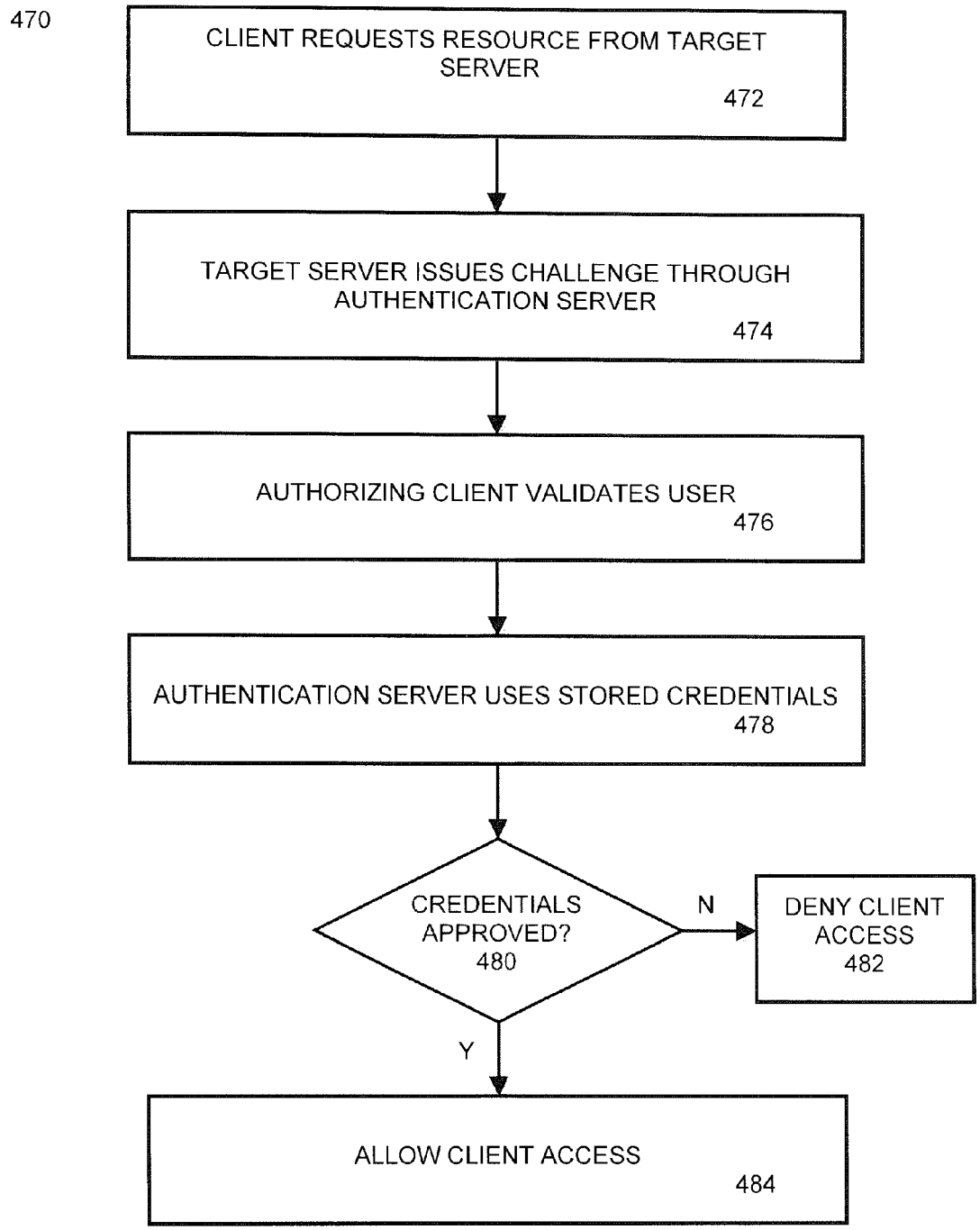
FIG. 4C is a flowchart that illustrates a method of performing user authentication under another alternative embodiment.

FIG. 4C is a flowchart that illustrates a method of performing user authentication under another alternative embodiment. The process 470 of FIG. 4A begins with the user of the client making a request to access a resource on or through a target server, act 472. The target server then issues the challenge for authorization through the authentication server, act 474. The user is validated by the authorizing client sending an appropriate indication to the authentication server, act 476. The authentication server then pulls and uses the user credentials are stored on the server locally, act 478. In decision block 470, the authentication server determines whether or not the credentials are valid and approved. If they are not valid, the requesting client is denied access, act 472. If instead the credentials are approved, then the client is allowed to access the resource, act 474. In the embodiment of FIG. 4B, the credentials are stored in the authenticating server itself. In certain cases, pulling the stored credentials is accepted as approval of the user so that decision block 470 is not performed and the user is simply authorized after the server uses the stored credentials.

In general, the processes of FIGS. 4A-4C operate such that when the application is activated, the requesting client displays a waiting for authorization user interface and sends a request to the server to authorize access to the application. The server contacts the authorizing client, and an authorizing client must approve access to the application in order for the request to be granted. If approved, authorizing client returns an indication of authorization to server. The server returns authorization (e.g. Boolean value, decryption key, username/password) to requesting client. The requesting client activates application and allows user to use it. In identifying a user/client to a website or application, the requesting client performs extra validation of site/application to ensure security. The authenticating information comprising the credentials provided by the system, such as by a server or the authorizing client can be a username/password combination or a session token for the application's backend service, or an authorization token to retrieve login from a service (local or network-based), or other type of credential as described above.

The authentication server 102 may be configured to contain certain preference information indicating particular applications/services to manage or categories of apps/services to manage. Enrollment, authentication, authorization for certain services, apps, or categories can then be dynamically controlled. For example, if an application/service for which authorization and authentication is being requested matches certain defined preferences, these preferences determine whether the server automatically grants, denies, or performs additional authorization steps for the request.

With regard to password management, in general, the authorizing client 324 serves as the sole device that the user needs to validate his or her identity to the system. The authorizing device is itself protected by its possession by the user and its own password or similar protection scheme. As is known, cell phones and other mobile devices can be locked or unlocked by the user through the use of native password protection mechanisms. Upon power up, a user is presented with a lock screen on the phone or device that requires a password to activate the device. This mechanism is used by the system to implement an overall identity management process for the user. In an embodiment, the only password used by the user in the system is the authorizing client unlock password. In a recoverable implementation, the authentication server 102 stores all passwords on the server without the use of encryption based on a user-selected master password, such as that mobile device lock password. If the user ever forgets the master password, credentials could still be provided to the system provided the user verifies his or her identity to the system. To prevent any possible breach of the server system 101, a zero-knowledge method may be employed in which the server 102 does not know the user's master password or any of the other passwords. All credentials stored on the server are encrypted and can only be decrypted and accessed using the master password. If the user forgets the master password, the system cannot retrieve their information. Under an embodiment, the user may be given the option of selecting either recoverability or zero-knowledge with respect to the storage of passwords in their account.

In an embodiment, the authentication server and/or authorizing client is configured to perform aspects of identity management for a user. The user defines the credentials to be provided by the authorizing client, but these credentials can be automatically updated and managed by certain client and/or server processes. For example, a user may request that one or all of his or her service credentials are rotated; or credentials are rotated on a particular interval (e.g. change all of my passwords every month). Users may maintain accounts on the authentication server, and the server may be configured to manipulate such account information, e.g., using background page in client or headless browser on server side. Using a background page or headless browser, an automated system acting on behalf of the user can enter information into appropriate fields (e.g. update password form, new address form) and submit them to the server. Changing information may require a multiple step flow, e.g., the user may need to click a link in an e-mail message to reset password, and a server may store the methods used for a given service, e.g., Facebook, to change a password. The server storing methods to complete a flow solves the problem of a multi-step flow being used that would not allow a simple form submission to reset passwords. These procedures can be embodied by methods such as using Javascript and an open source repository.

Alternatively, the server may send procedures to client (e.g., through Javascript) to perform them. The server may need to intercept e-mail or other authorization mechanisms in order to complete process (e.g., e-mail asking user to confirm password change, or to complete password change). In an embodiment, the procedures may be stored in an open source repository so service owners can maintain their own information change procedures. The server or client uses an API (application program interface) exposed by the server directly to change information. The server signals to service that user's information has changed and that it should re-request it. Upon a site breach or other compromise to the system, the account information can be rotated automatically. In the case of a security breach, the server identifies all users of the service and rotates their respective passwords, e.g., by sending a request to the client to perform a rotation using a given or implied procedure. In an embodiment, all users of a given service are rotated. In an alternative embodiment, where the server knows of a subset of users that have been compromised, only those users who have been compromised have their passwords rotated.

In an embodiment, the authentication management platform 101 provides a management console that provides the data for the authentication server 102. The server provides an API so that a viewer client can retrieve information (e.g., a mobile app). The management console may be a site or application shows list of accounts, services, apps a user has enrolled. The user may change identity service or app is associated with, change password or e-mail for all sites/services or selected service. The server may revoke a service/apps access to user/account information or delete an account, such as by interacting with the service in the background to delete an account. The management console may be used to define and enforce certain behavior policies. The requesting client regulates behavior for applications/sites.

Authorization by the authentication server may occur in one of several ways. First, the server may authorize behavior locally (e.g., with policy based on user configuration or a pre-stored database). The process may authorize with server synchronously. In this case, before allowing behavior, the client must receive a result or decision from the authentication server. The process may also authorize asynchronously. In this case, the target server allows behavior if permitted by client, inform the authentication server about it but does not wait for response from the authentication server before allowing. The authentication server may later come back and revoke behavior, at which time the server stops behavior for that application or site.

The authentication process can be configured to utilize a proxy for a user. For example, when enrolling an app/service (or when changing account information for a service), the process sets the user information to be a unique address associated with the proxy, rather than providing the user's actual information. When the proxy receives input from the service, it checks a policy to see if the service is allowed to provide input to user, if so, then it is forwarded to the user, if not then it is ignored or returned input is sent to the service as rejected. The proxy policy can be set per service, by service category, or globally for the user, or type of communications e.g., deny all shopping sites, allow this specific service, deny all, allow billing e-mails, but not promotion e-mails.

The service category can be determined, such as by an application or site categorization service, by an application's category in an app store. The type of communications can be performed on server side by analyzing content to be proxied (e.g., e-mail, SMS, package, letter), source information (e.g., known marketing e-mail service provider, known junk mail sender, third class presorted mail, etc.). The configuration can be based on rate limiting; for example, all services can send one e-mail per week, a particular service can send up to ten, but if any go over their limit, they will not be able to send more that week.

Comprehensive Login System

In an embodiment, the user authentication management platform supports a comprehensive login component 106 for one or more web browsers used on the client computer 112. Under the comprehensive login system, the user has stored his or her credentials for use with certain websites or other network resources. The login component is configured to detect navigation to a website for which the user has stored credentials with the server, and to detect empty username and password fields. The login component presents itself to the user in the form of a popup either on the requesting client or the authorizing client and prompts the user to login through the platform 101. The system can be configured to hide the login window if the user manually enters their username and password, but could also force a user to authenticate for a second time on their desktop if they logged in manually. The client then sends a request to the server 102 to initiate the MFA (multi-factor authentication) process. It receives the credentials back from the servers (target and/or authentication servers) following a successful MFA exchange and automatically fills in the username/password and logs in the user. Such a login system could be configured to work for a variety of different browsers capable of being launched on the client computer (e.g., Chrome, Firefox, Internet Explorer, Safari, etc.)

Figure 5:
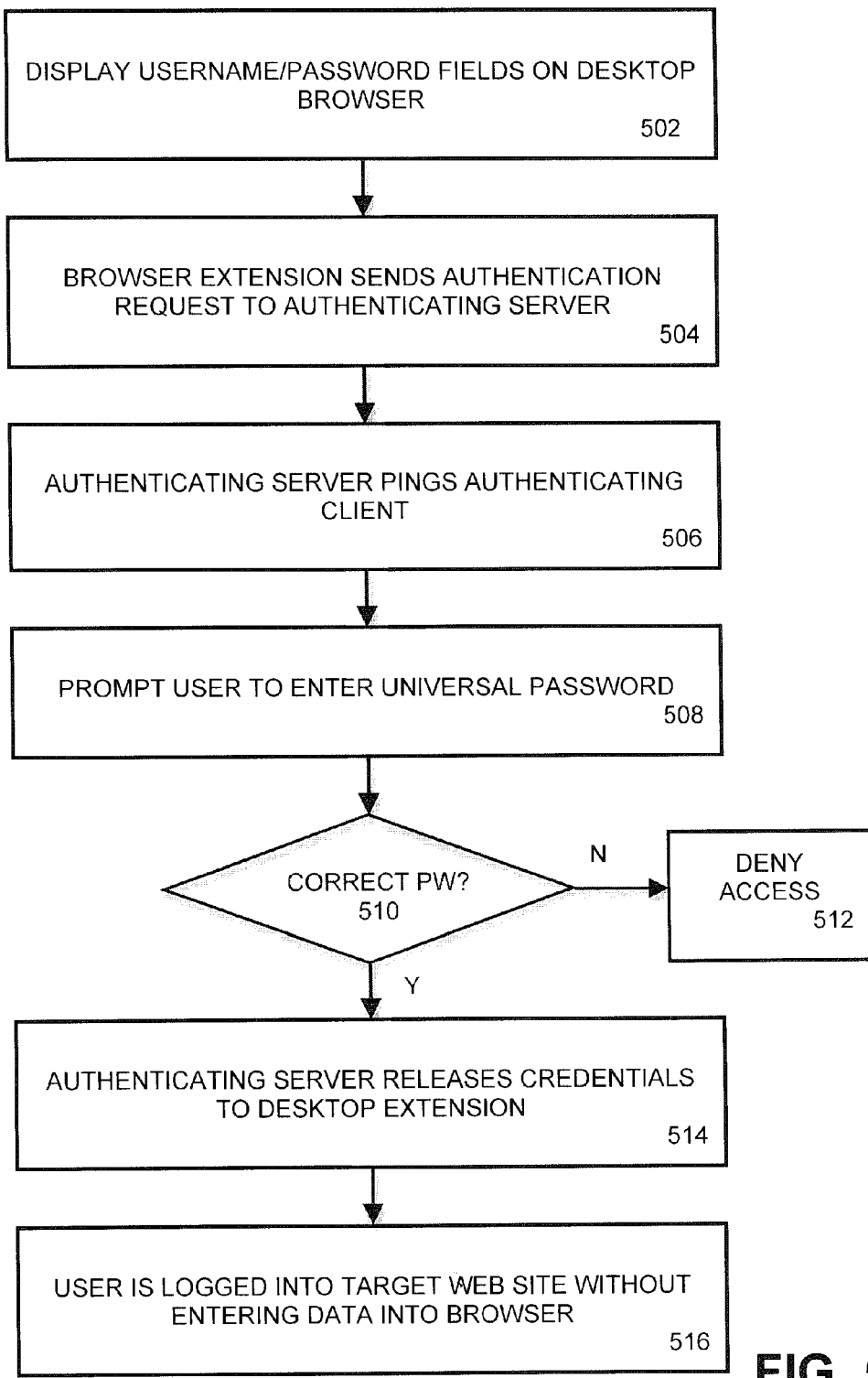
FIG. 5 is a flowchart that illustrates a method of comprehensive login, under an embodiment.

FIG. 5 is a flowchart that illustrates a method of comprehensive login, under an embodiment. As shown in process 500, for an accessed website in which a user's credentials have been stored, the server displays the username/password fields in the browser, act 502. An installed browser extension sends an authentication request to the authentication server, act 504. The authentication server then notifies the authorizing client, act 506. The authorizing client has an appropriate client side application installed that enables the client to provide user credentials to the server. On the authorizing client, the user is prompted to enter the universal password for the system, act 508. This password could be the same password that is used to unlock the client device, or it may be a different password that is known only to the user. In decision block 510 it is determined whether or not the provided password is valid. If not, the user is denied login access, act 512. If the password is correct, the authentication server releases the user's credentials to the client desktop extension, act 514. The user then logged into the target web site without needing to enter any data into the browser, act 516.

The comprehensive login and MFA process enables the user to easily configure many frequently used and security sensitive websites for access without requiring the use of separate passwords and login procedures. For example, in a first consumer use case, a user may login to a bank web site with their password through their PC web browser. The browser extension prompts the user to save the password with the platform 101. The next time the user visits the bank website, the extension prompts the user to login using the comprehensive login process. The user clicking OK results in a message/dialog box displayed on the user's authorizing client device. The dialog asks the user to confirm the login process. If the user clicks OK, they are logged into the bank's website. In a second consumer use case, the user visits the bank website through their PC browser. Instead of logging in with a regular username and password, they are given the option to login through the platform 101. A prompt is displayed on the user's authorizing client device and a dialog asks the user to confirm the login process. If the user clicks OK, they are logged into the bank website. In a third use case in which the user is only using a mobile browser, and the mobile device is the same as the authorizing client, login may be automatic upon entry of the appropriate password into the mobile device.

Figure 6:
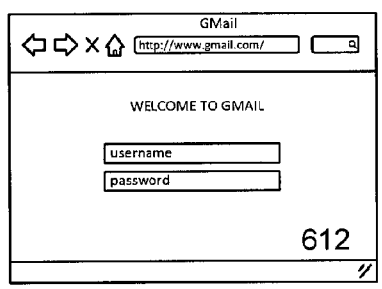
FIG. 6 illustrates a first sequence of display instances on both a client computer and authenticating client device during a comprehensive login session, under an embodiment.
Figure 6:
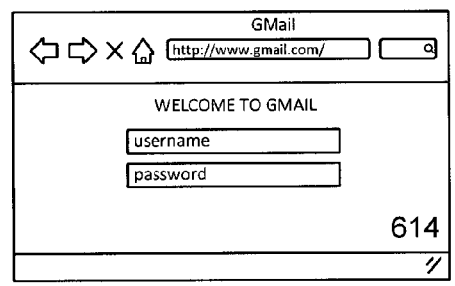
Figure 6:
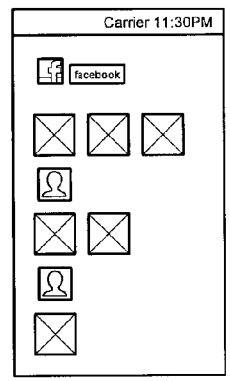
Figure 6:
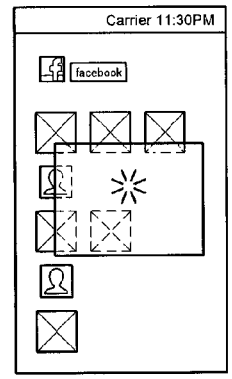
Figure 7:
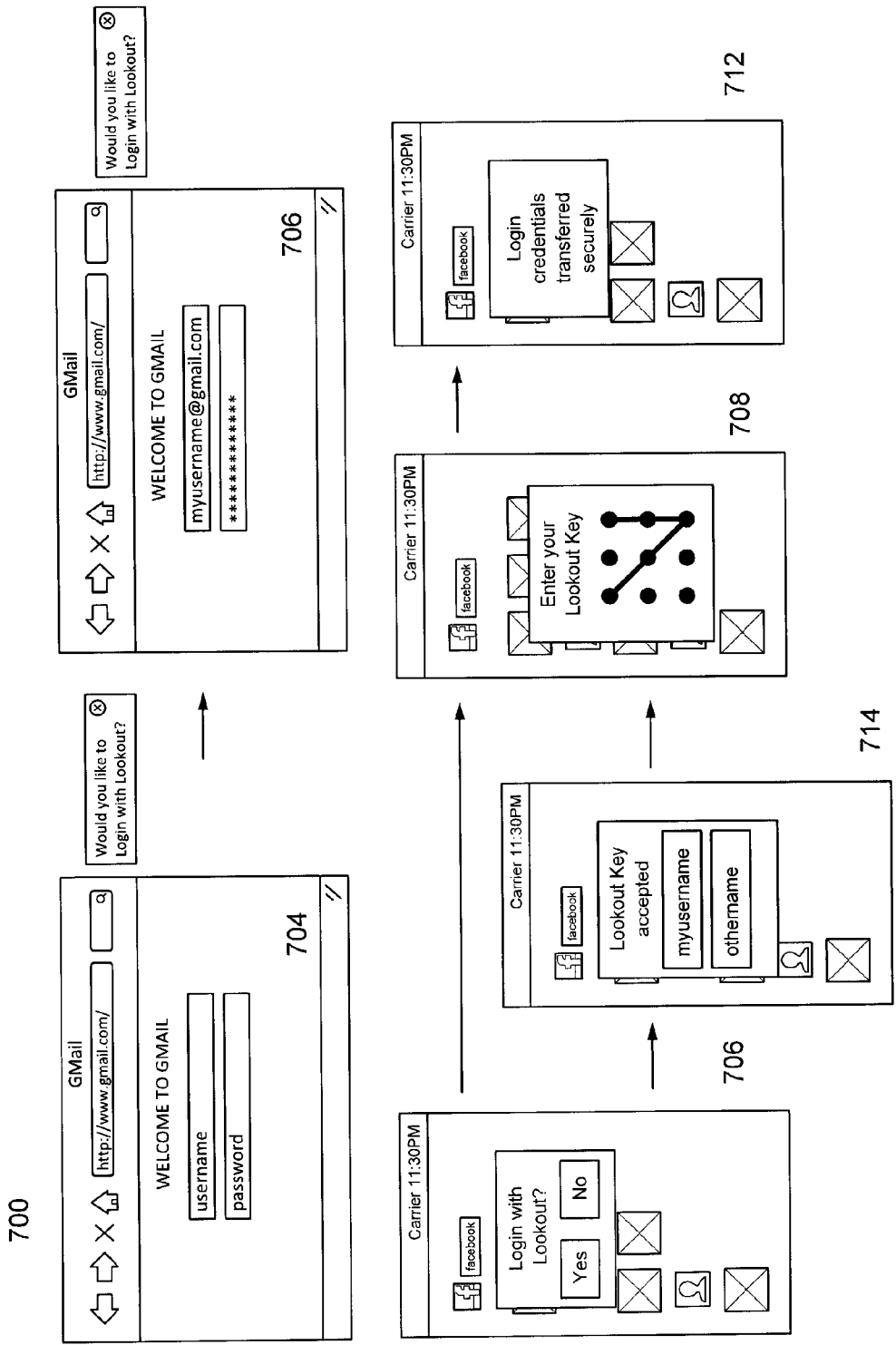
FIG. 7 illustrates a second sequence of display instances on both a client computer and authenticating client device during a comprehensive login session, under an embodiment.

As described with reference to FIG. 5, the comprehensive user login system utilizes dialog boxes and prompts displayed on the user's requesting client computer and the authorizing client. FIGS. 6 and 7 illustrate a sequence of display instances on both a client computer and authorizing client device during a comprehensive login session, under an embodiment. As shown in sequence 602 of FIG. 6, the client web browser 612 illustrates a login screen for a website accessed by the user, in this case an example Gmail welcome screen that prompts the user to enter their username and password for the Gmail account. The user's authenticating device (mobile phone) 622 is placed in proximity to the client computer. As shown in sequence 604, the authentication server 102 causes a comprehensive login prompt 615 to be displayed to the user, which invites the user to login using the authentication platform 101. At this point, the authorizing client starts processing the login process. The process then continues with sequence 700 of FIG. 7. As shown in FIG. 7, the login request 706 is displayed on the mobile device. If there are multiple accounts available on the website, the user is further prompted to enter the proper account, 714. The authorizing client then goes through the login process 708, and upon validation of the user's credentials, the user is logged into the target website as notified on the mobile device 712. As shown in FIG. 7, throughout this process, the browser web site 704 and 706 has not changed with respect to the display, and the user did not need to enter any information into the browser to perform the login. For purposes of illustration, the user interface may display the login message as "Login with Lookout" where Lookout refers to the name of the comprehensive login service or platform. Any appropriate prompt content and format may be used for the login dialog box or display area 615, and the platform may be referred to as any name or reference.

Figure 8:
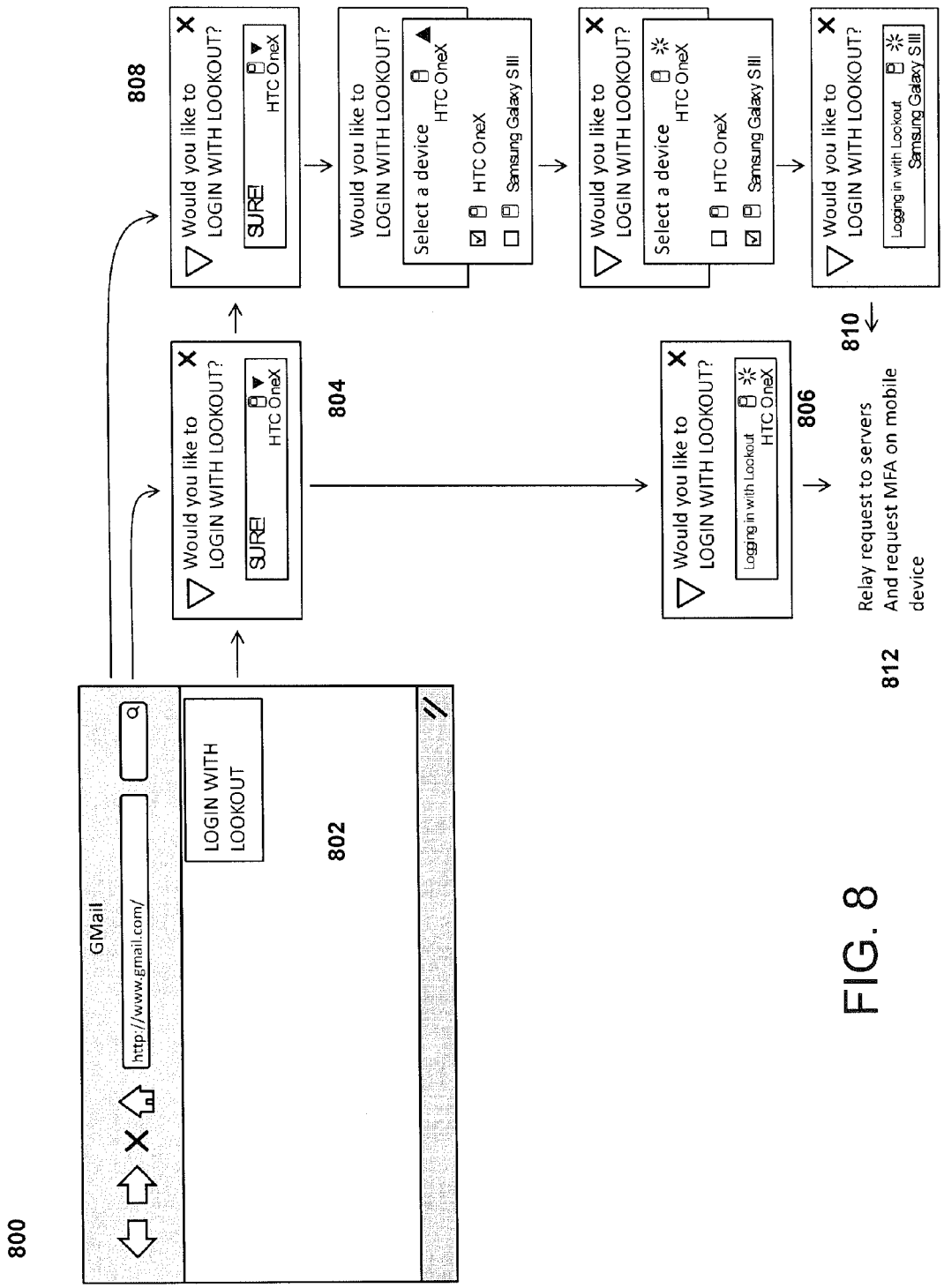
FIG. 8 illustrates a sequence of display instances on a client computer and authenticating client device during a comprehensive login session, under an alternative embodiment.

FIG. 8 illustrates a sequence of display instances on a client computer and authorizing client device during a comprehensive login session, under an alternative embodiment. As shown in FIG. 8, the user is prompted to login to the target website using the comprehensive login process through a prompt message 802. In general, the authentication platform can support many different brands and models of authorizing clients, just as there are many brands and models of mobile phones. In certain cases, a user may in fact use more than one phone or mobile device that is capable of acting as an authorizing client. As shown in FIG. 8, the login process prompts the user to select the particular phone or device that is being used as the authorizing client. Displays 804 and 806 illustrate the case where the default authenticating device is a particular pre-defined phone (e.g., HTC One X). Alternatively, the user may be able to select a particular phone model through a pull-down menu selection, as shown in sequence 808. In this example case, the user is given the option of logging in using a HTC phone or a Samsung phone and chooses to login with the Samsung phone, 810. Once the appropriate phone is selected, or the default phone is used, 806, the authorizing client relays the request to the server to request MFA of the user on the mobile device, 812.

Figure 9:
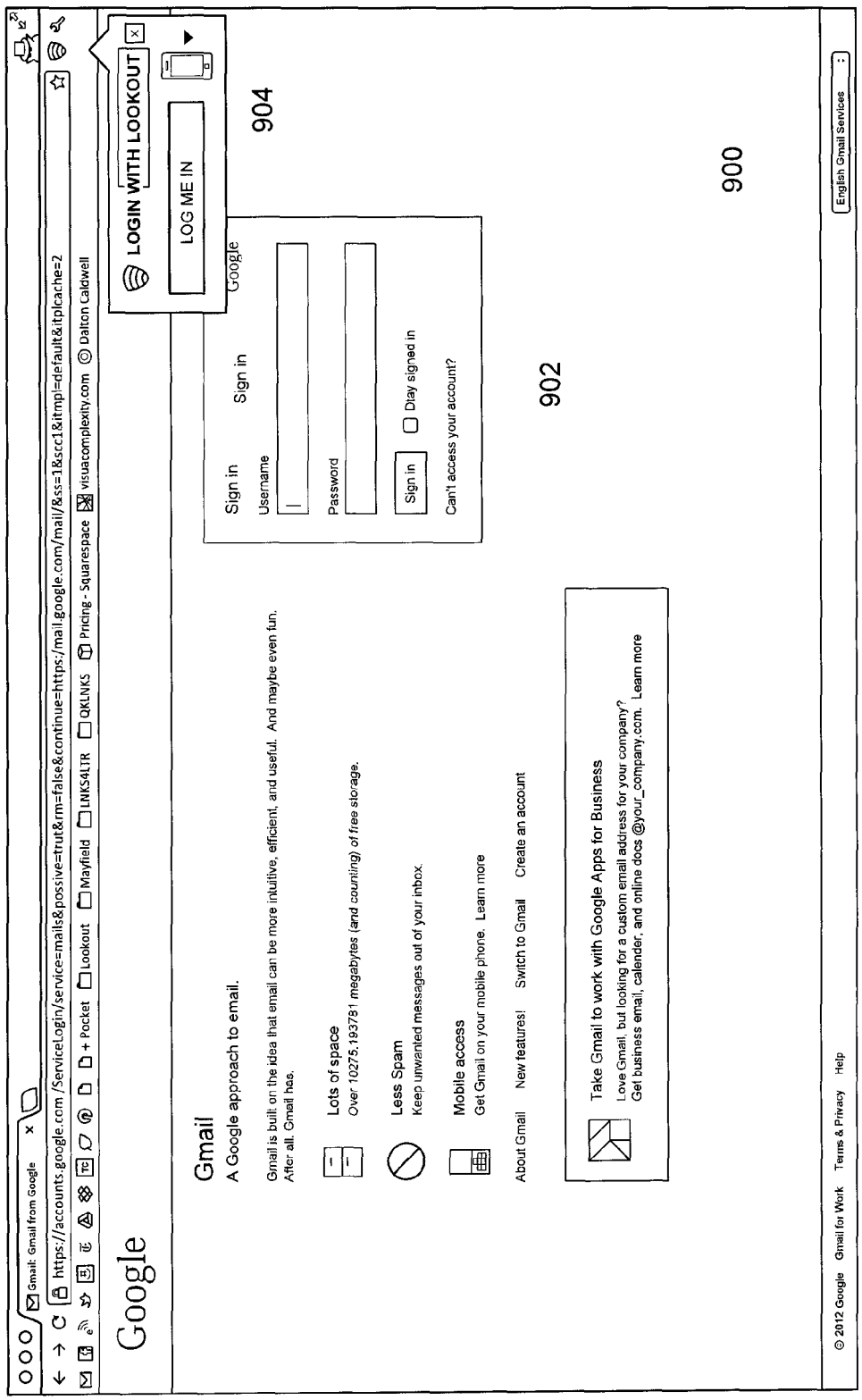
FIG. 9 illustrates a comprehensive login option displayed in a web browser, under an embodiment.
Figure 10:
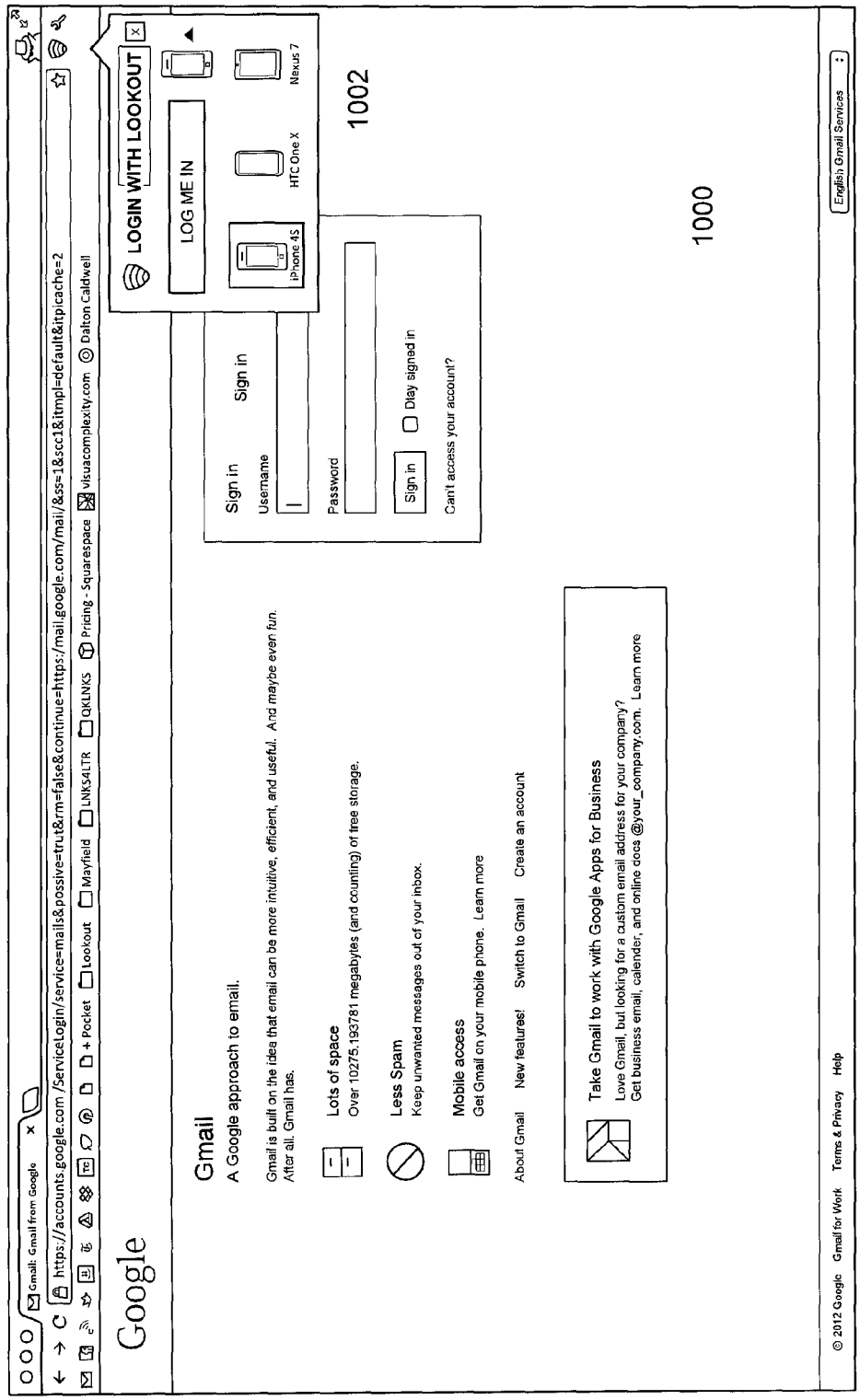
FIG. 10 illustrates a comprehensive login option displayed in a web browser and providing selection of one of several authenticating client device types, under an embodiment.
Figure 11:
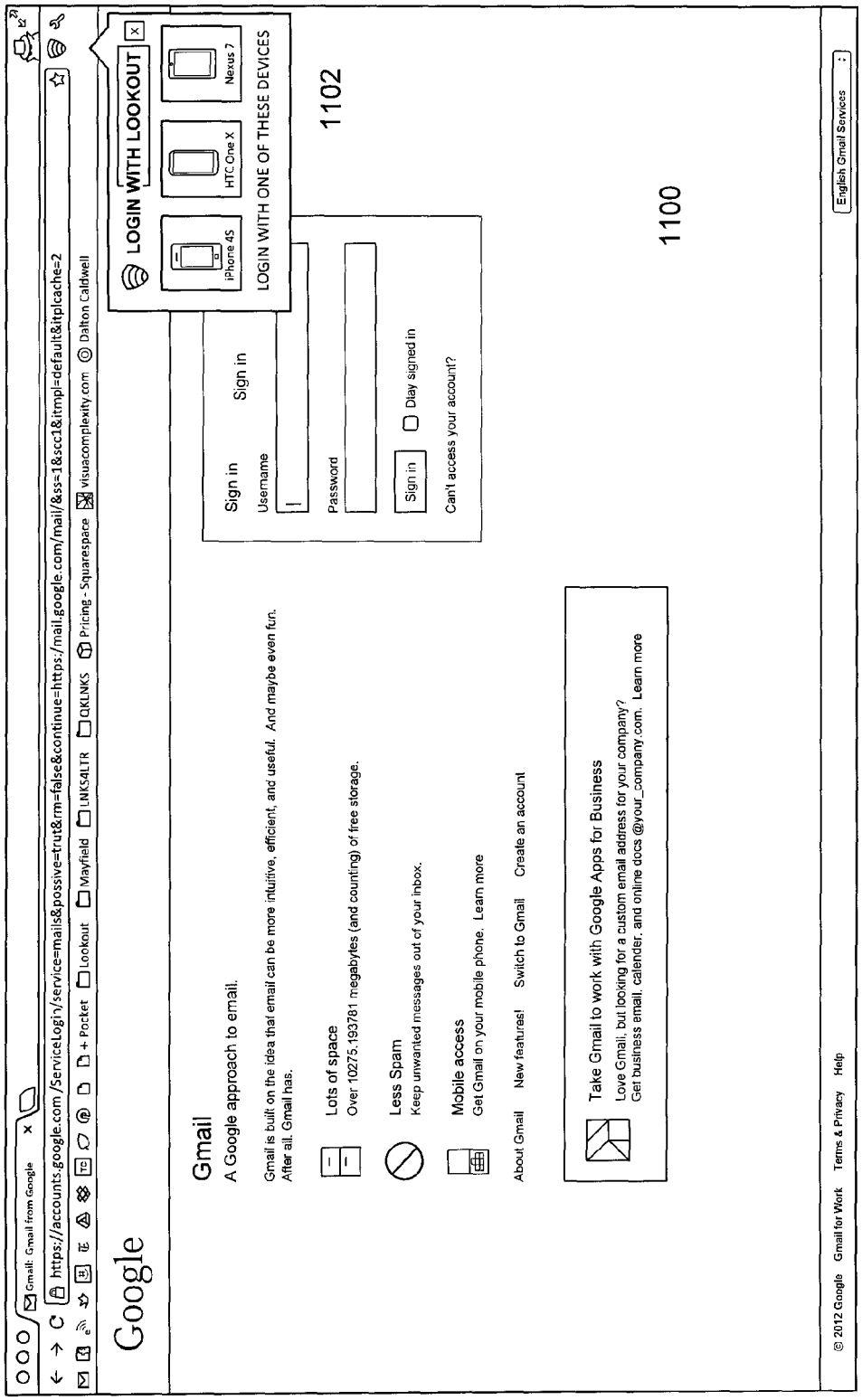
FIG. 11 illustrates a comprehensive login display area for selection of different authenticating client devices for accessing a website, under an alternative embodiment.

As described above, the comprehensive login process inserts a login option to be displayed in the desktop browser of the user's client computer. FIG. 9 illustrates a comprehensive login option displayed in a web browser, under an embodiment. As shown in FIG. 9, a browser display screen for a particular website (e.g., Google) includes a sign-in or login display window 902. This is the normal login area for the website. Under an embodiment, the authentication server 102 causes a separate login window 904 to be displayed. This invites the user to login to the site using credentials exchanged through an authorizing client. In this case, login through the display window 904 uses a universal password and eliminates the need to login through the dedicated website process 902. The authentication system can be configured to allow login through a default or single authorizing client device. Alternatively, one of several different devices may be used as an authorizing client device. In this case, the login display area may display several different devices, of which a particular device is selected through a drop-down or similar menu selection method. Thus, as shown in FIG. 10, display area 1002 in browser window 1000 shows several different device types that can be selected. Various different display formats and selection techniques can be used to provide the user with a prompt to utilize the comprehensive login system. FIG. 11 illustrates a comprehensive login display area 1102 for selection of different authorizing client devices for accessing a website 1100, under an alternative embodiment.

Figure 12:
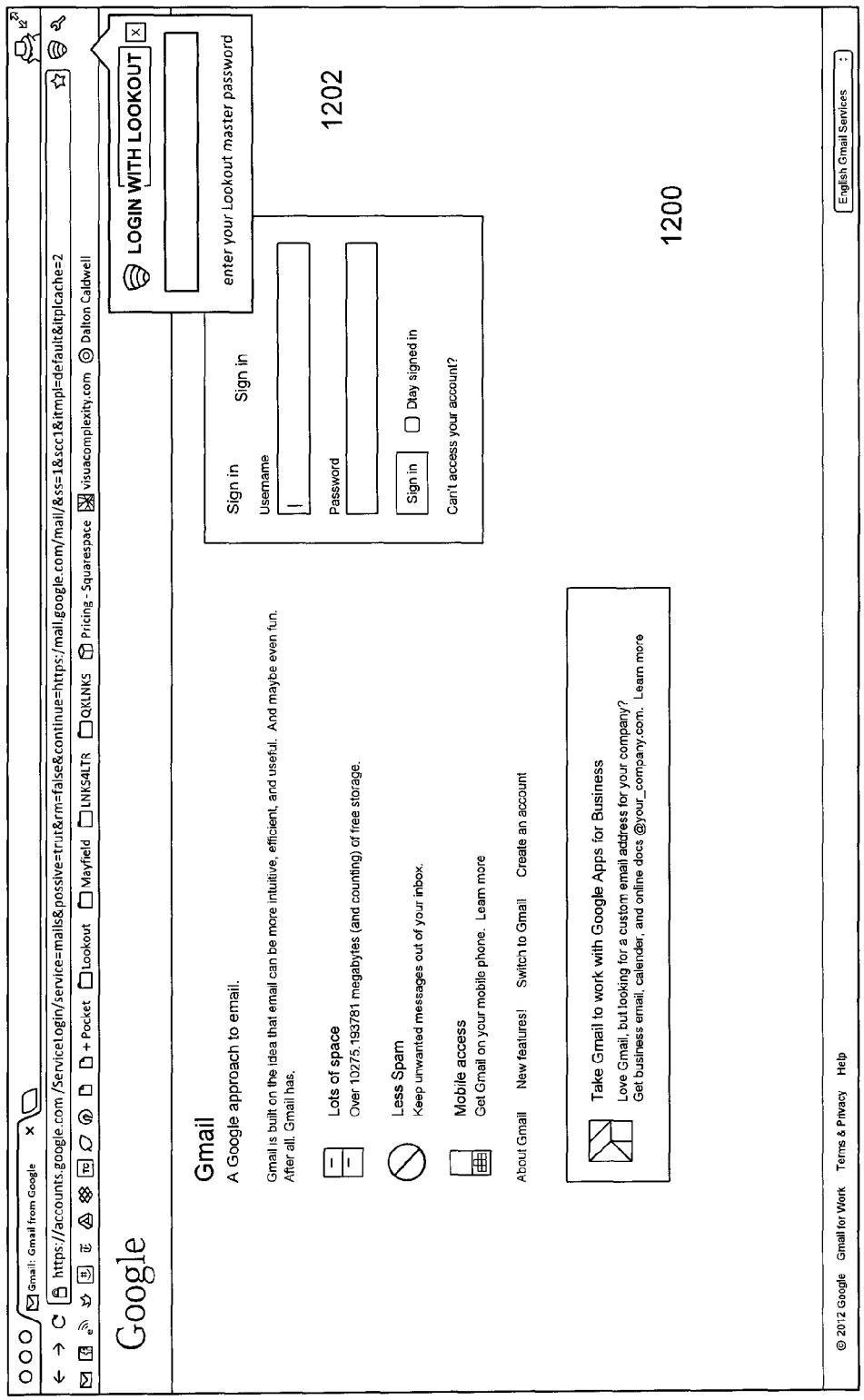
FIG. 12 illustrates a password prompt for comprehensive login displayed through a web browser, under an embodiment.

Once the user has selected the appropriate authorizing client device, he or she is prompted to enter the universal password through the web browser. FIG. 12 illustrates the password prompt displayed through a web browser, under an embodiment. As shown in FIG. 12, display area 1202 in browser window 1200 asks the user to enter the master password. Once the proper password is entered, the user is logged into the target website.

Figure 13:
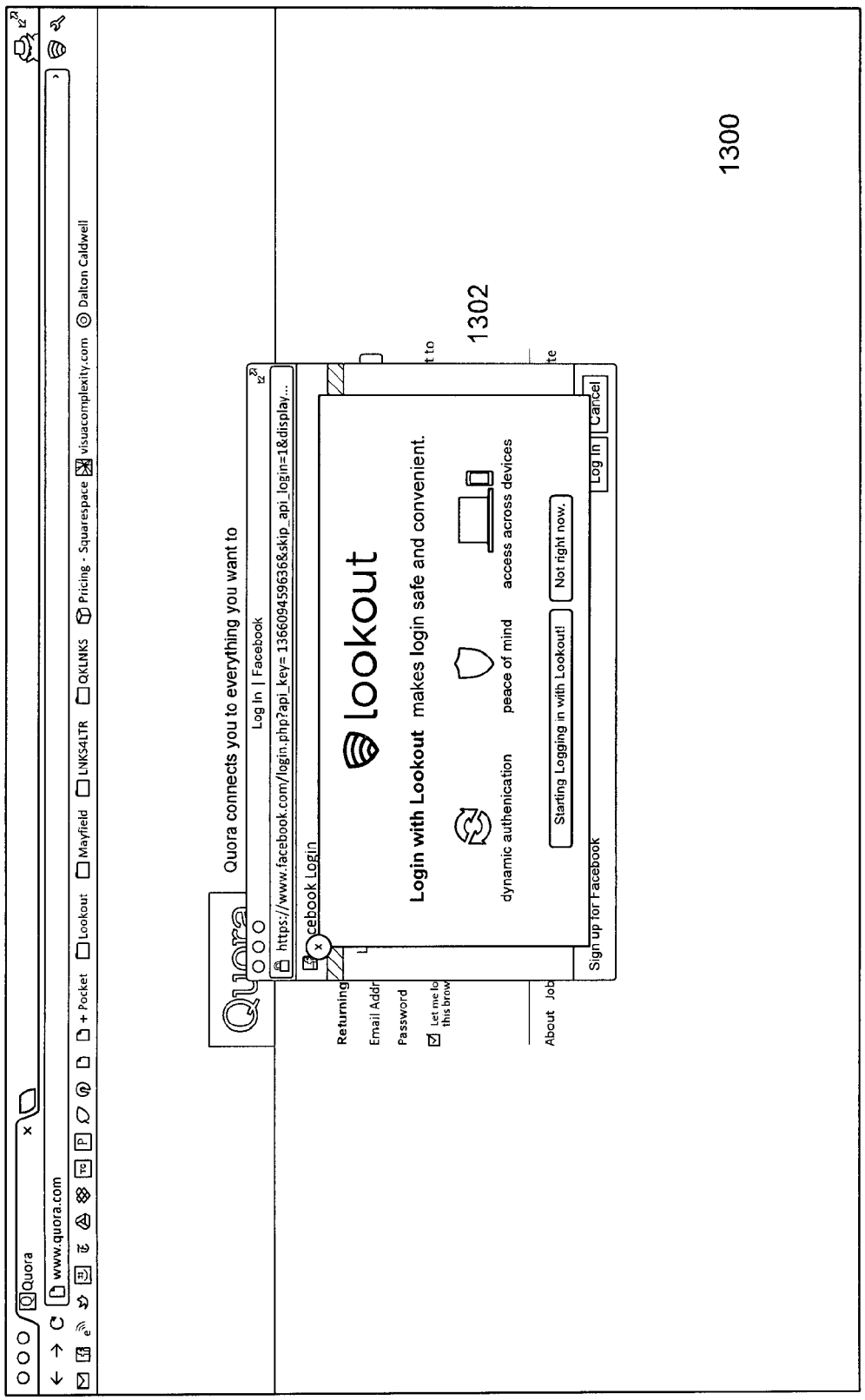
FIG. 13 illustrates the comprehensive login mechanism integrated with an example social network platform, under an embodiment.
Figure 14:
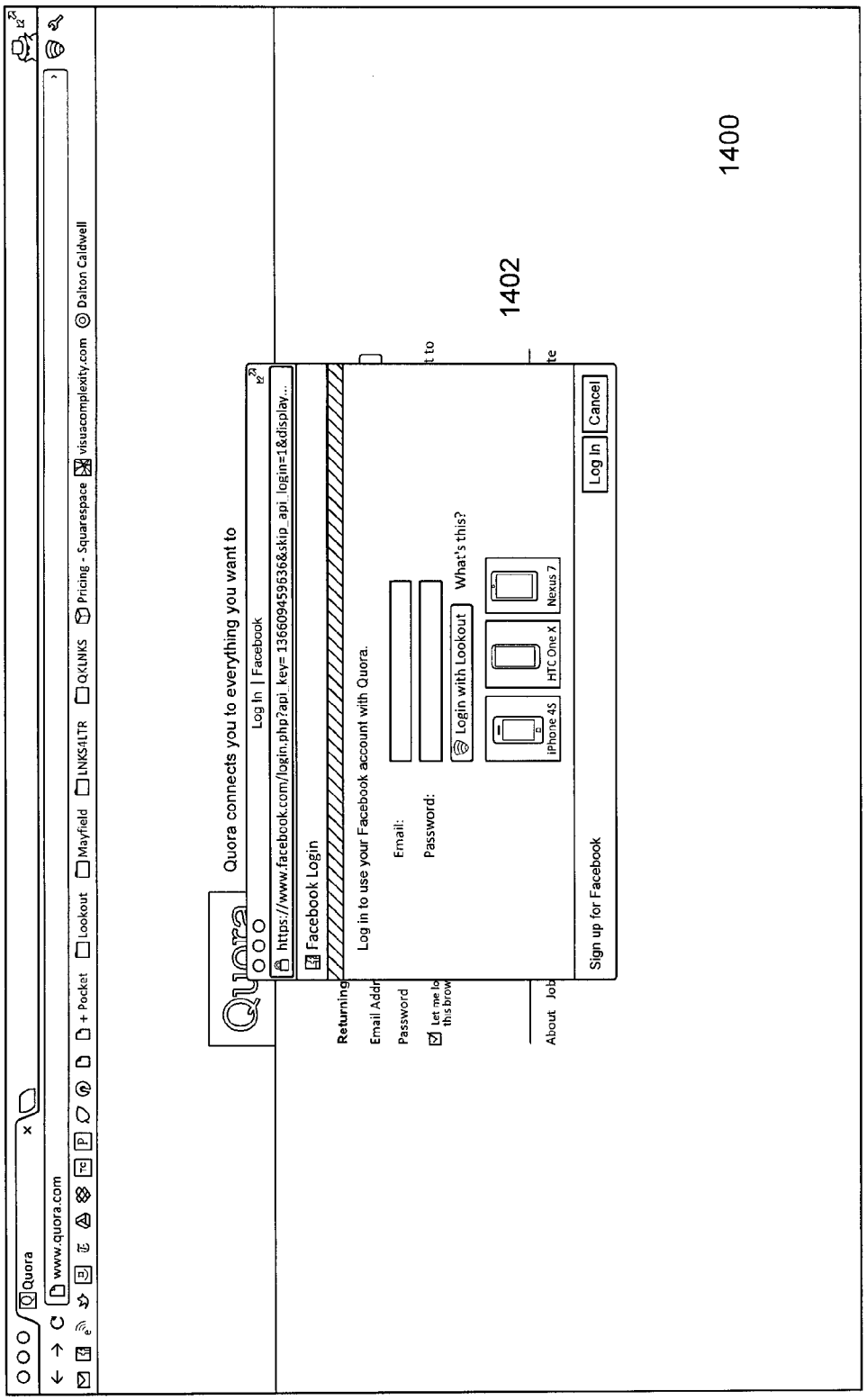
FIG. 14 illustrates a social network integrated login display that provides a selection of authenticating client devices, under an embodiment.

In an embodiment, the comprehensive login and user authentication platform can be used with one or more different social network platforms, such as Facebook. Many of these social network platforms already have their own login, connection, and validation mechanisms. In an embodiment, the comprehensive login process is integrated with the login and connection mechanisms of a social network platform. FIG. 13 illustrates the comprehensive login mechanism integrated with an example social network platform, under an embodiment. In the example of FIG. 13, an user attempts to enter a website 1300 hosted by Quora. Upon entering the site, the user is prompted with a login page 1302 that allows comprehensive login using a Facebook connect interface. As described above, the user may login using one of several different authenticating devices, and that different login screens may be provided to allow the selection of the proper device. This extends to the integrated login system as well. FIG. 14 illustrates a social network integrated login display that provides a selection of authorizing client devices, under an embodiment. In this case, the login display area 1402 provides a choice of mobile device displayed in browser window 1400.

It should be noted that the particular instances and examples of displayed websites and social network partners illustrated in FIGS. 9 through 14 are intended to be for example only, and that other websites, partners, entities, and web resources can be used.

Figure 15:
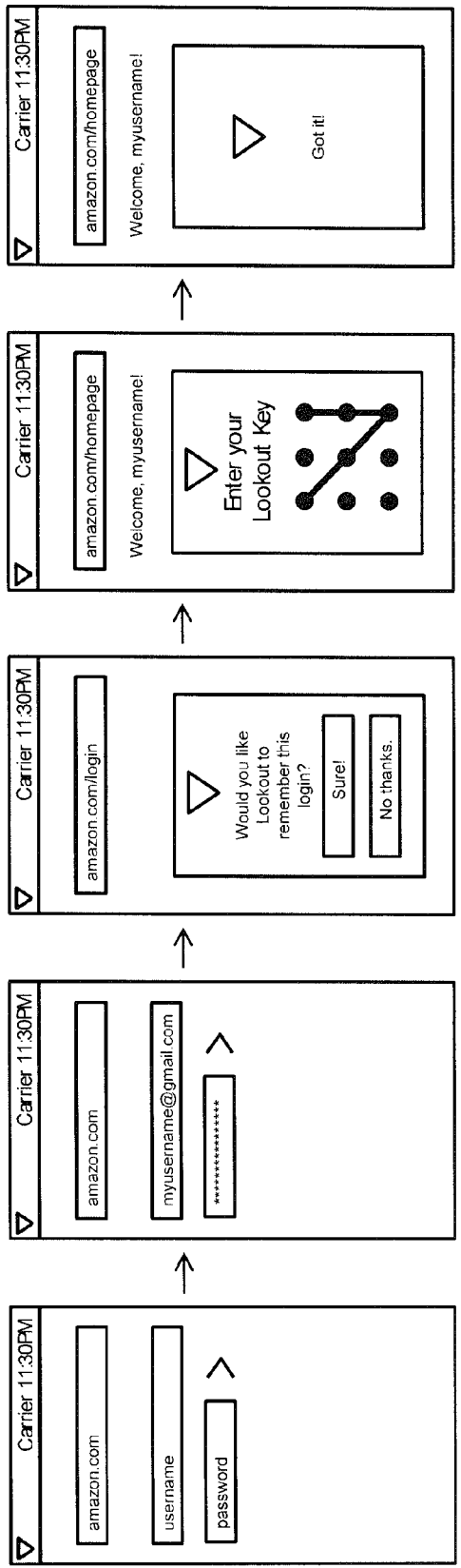
FIG. 15 illustrates a method of storing a new password in a mobile device using a comprehensive login system, under an embodiment.

In an embodiment, the comprehensive login system may be configured to allow login through the mobile device that acts as the authorizing client. The mobile client automatically displays a semi-transparent notification that prompts the user to login using the authentication platform 101. FIG. 15 illustrates a method of storing a new password in a mobile device using a comprehensive login system, under an embodiment. As shown in FIG. 15, process 1500 prompts the user to enter the password for a particular site (e.g., Amazon.com), and then select that system to remember the login for the site. This is similar to the process for the desktop browser, except that it is performed exclusively on the mobile device. The sequence of steps displays and steps may proceed as shown earlier with prompts asking the user to select a particular account if more than one account exists, with all of the display prompts shown in the mobile device.

Figure 16:
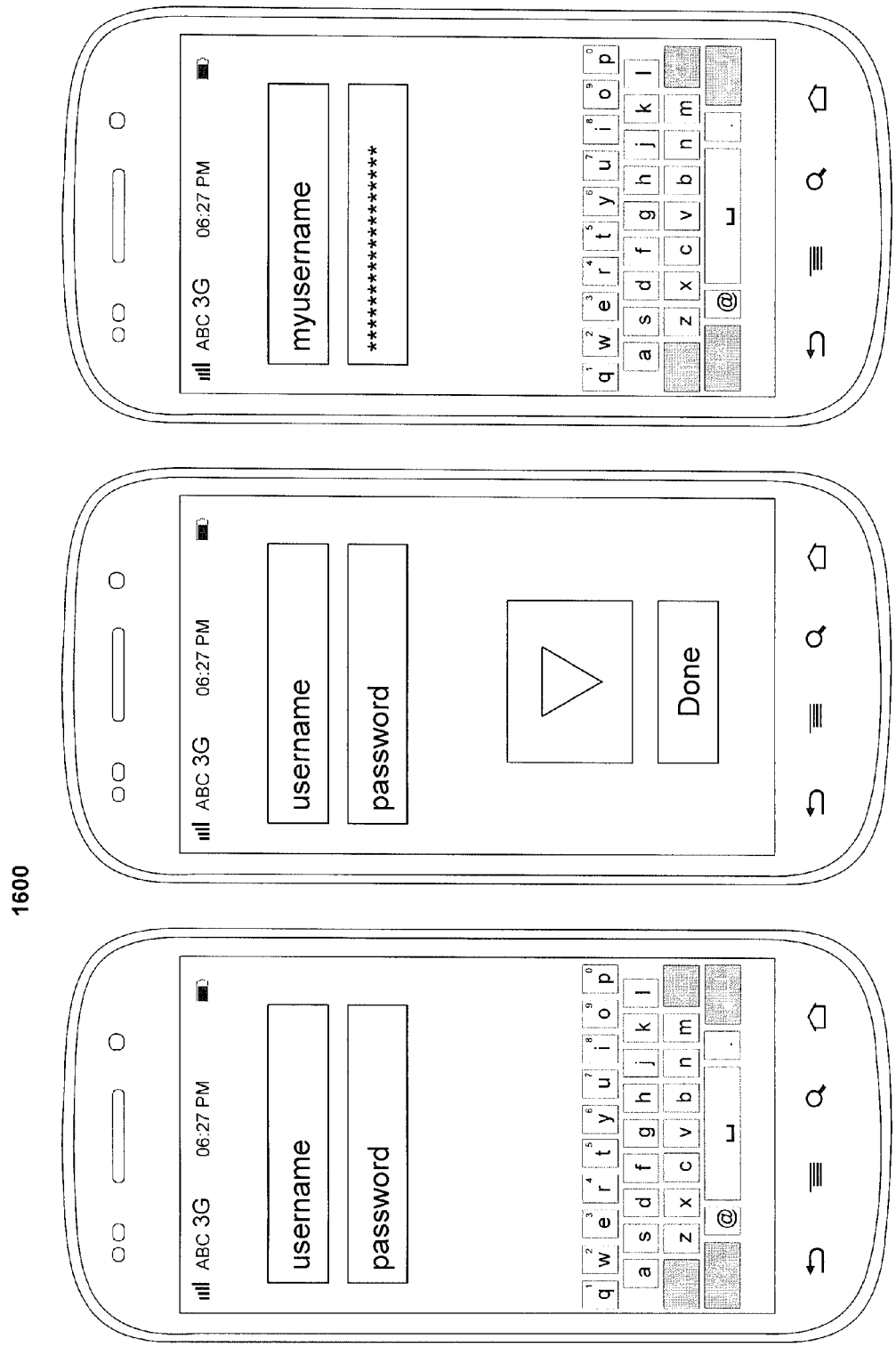
FIG. 16 illustrates a mobile device login interface that utilizes a universal or soft keyboard, under an embodiment.

In an embodiment, the mobile device login method may utilize a user installable keyboard with a 'comprehensive login' button included. Diagram 1600 of FIG. 16 illustrates a mobile device login interface that utilizes a universal or soft keyboard, under an embodiment.

In an embodiment, the comprehensive login system is used to login in to websites that are accessed through captive portals. In general, a captive portal forces a client to view a special web page before using the Internet normally. It intercepts all packets regardless of address or port, directing them to the special web server instead of the intended destination. When a user attempts to access a web page using a browser, the browser is redirected to a web page that displays policy messages, requires authentication or payment or other actions. Such portals are common in public access areas (e.g., WiFi hotspots that require login before routing traffic, hotels, business centers, etc.). Many captive portals allow DNS (domain name system) requests to properly resolve, creating a mechanism for a client on a captive portal to send information to and receive information from a DNS server. For example, a client can perform a DNS resolution request for a domain whose subdomain encodes information (e.g. abcdefgasdf23131hk2j3j1h2kj3.1w1.lookout.com, where the first component in the domain name is data to be sent to a server). The DNS server can then return information in standard DNS responses, e.g. TXT responses, A responses, CNAME response, and the like. In this case, the login system may use DNS to transport credentials. In an embodiment, it may be desirable for a client to quickly detect if it is behind a captive portal and not simply subject to a network outage. In this circumstance, a client requests a web page with known content from a server. If the contents are not the known contents (i.e. the captive portal has intercepted the request), then the client knows the portal is captive and may use alternate techniques to communicate with authentication server. Some captive portals allow the use of ICMP (Internet control message protocol), which could also be used for tunneling. This allows the system to essentially tunnel through DNS, will to flow the DNS request through a configured DNS server and allow functioning of the login system behind a captive portal. Such behavior is essential if the login system is to be used to log the user into a captive portal's authentication system (e.g. username and password required to access).

As described above, certain embodiments facilitate a user logging into a target server using a linked authorizing client. Certain alternative implementations are made available through such a system. For example, in one embodiment, the authorizing client can be used to automatically fill-in credentials and data to the target client from saved data by the authentication server pushing a request into the authorizing client mobile device. In this case, the mobile device only needs to display a one-click login button. For this embodiment, the response-challenge routine could include a step in which the user must to accept a challenge on their mobile device after clicking a login screen or command on the target server website. This type of solution is useful when the target device is locked and user needs to login, or a service (e.g. a website with a login form) is attempted to be accessed via the requesting client. In this scenario, the requesting client detects there is a candidate key device, such as the user's authorizing mobile device in proximity to the requesting client, and requests login credentials and/or other form data from it; the user's phone responds with the credentials which are presented to the requesting client, or alternatively, are presented by the requesting client to the target server website. This latter case is similar to having a password manager that runs on a mobile device, and which is accessed remotely by an agent process on the requesting client.

Performing a login through an authorizing client also facilitates secure login to public machines. Thus, in an embodiment, an authorizing client may be configured to login to a website as a guest through a requesting client that is a machine at a public place, such as at a café, library, airport, school, office, etc. This solution helps prevent problems that are obviously associated with entering one's own password in a public and unsafe computer. In this embodiment, an identifier, such as a phone number is entered instead of a private password, when logging in to a target site. The system will make the push of a login request to the authentication server, sending the entered identifier (e.g., a phone number), and the authentication server then does the reverse lookup and pushes a notice of the device to prompt the user for a confirmation of login. In this case, the user only needs to click an "accept login" command (or similar command or prompt) on the authorizing client device. This essentially provides login by delegation via alternate identifier, in which a relatively innocuous identifier, such as a phone number is used instead of a secret password.

Embodiments of login through an authorizing client can also be used to implement a form of enhanced secure login by requiring a combination lock of multiple authorizing client devices. For example, login may require the use of a combination of a tablet and a phone challenge to authorize a login request, and if only one device is provided or compromised, the login will not succeed. For this embodiment, the system enables a multi-secure mode where a login request is pushed to login through an authentication server, and the login request is then pushed to more than one authorization client. In this case, the login challenge needs to be authorized on all devices for login to succeed. In an embodiment, authentication server pushes a request to multiple authorizing clients but only requires one of the to respond for the login to succeed. After the first authorizing device responds affirmatively or negatively, the authentication server pushes a cancellation message to the other clients so the user does not see old requests on his or her devices. In an embodiment, the multiple authorizing client devices may need to each be in sufficient proximity to the requesting client, and or to each other in order to propagate the challenge/response message sequence. In an embodiment, a proximity detection system may be implemented, such that described in co-pending U.S. patent application Ser. No 14/207,100, entitled "System and Method for Changing Security Behavior of a Device Based on Proximity to Another Device" filed on Mar. 12, 2014 and assigned to the assignee of the present application, the disclosure of which is hereby incorporated by reference in its entirety.

For this embodiment, the enhanced secure login procedure requires that the user provide multiple forms of evidence, which can include evidence from multiple of the user's devices. The proximity element provides that some of the additional evidence can be transmitted automatically by the system, rather than through individual user interaction with each of the multiple devices due to the proximity module logic described in relation to the proximity disclosure mentioned above. Such a scenario provides a security level of proof of user identity employing multiple devices, instead of just a single authorizing client, and essentially sets a chain of accessing devices comprising the requesting client and two or more authorizing clients. Such a multiple authorizing client system may also be implemented in a personal device group comprising multiple portable devices used by a person, such as described further with reference to FIG. 17 below.

In a typical present login scenario, a user generally has as much time as he or she wants to login to a site. In certain security applications, a time limit may be placed on entry of login information to prevent users from having too much time to guess or otherwise improperly obtain passwords. In an embodiment, the authorizing client based login system implements a time-based login mechanism. In such a case, a user must select or click on a user interface element that displays an appropriate message, such as "allow log in" to effect the web page login. For example, in an embodiment, the time-based login mechanism provides five seconds (or a similar period of time) to login to target server through the authorizing client. In an embodiment, the time-based login mechanism may be extended to the multiple authorizing client system. In this case, time-based login is deferred to be accepted on two or more authorizing devices. This requires the login time window to be shared across the authorizing devices. A single time window can be provided during which the login sequence can be completed for all authorizing clients within a defined minimum amount of time, or multiple time windows may be provided in which login must be completed for each device sequentially.

In an embodiment, a variation of multiple authorizing client device implementation includes a request forwarding or keychain scenario. In this case, multiple authorizing devices are not required for login, but instead, authorization delegation is performed by forwarding requests to access a device keychain to a secondary mobile keychain for authentication. For example, if a user is using a guest phone or device, this solution allows the system to forward a login request to the user's phone. In this case, a keychain is tied to a device, with one keychain per machine and/or one keychain per phone. Alternatively, a shared keychain may be used. This makes it relatively easy to share credentials, such as if a user types a password on one device, his or her other devices (e.g., phone and tablet) are logged in.

Form Detection and Analysis

Embodiments may also include methods that implement form detection and analysis techniques. In certain cases, an accessed page may contain a login or registration form. The MFA authentication and login process may use a number of methods to detect the presence of a form, the categories of information required by the form, and the entry of information into that form implementation. A form may be implemented as a browser plug-in, browser software, web page included software (e.g. Javascript), or an application component, keyboard, or other software that can interact with a user interface. The system includes a model that examines form structure and identifiers to determine presence and field categorization (e.g., name, email, address, city, state, etc.), such as type of field, e.g. password field, e-mail field, name of field and associated or adjacent fields. The name is or includes username, email, password, pword, or uname; a form element's label contains "username". The model may also specify the position in DOM or other UI hierarchy (e.g. immediate child of element with class "password"). The system extracts information based on user interaction with a form. It may be configured to detect which fields are mutated by user by text entry on registration or login, determine which fields receive keyboard input from user, capture the initial value of form fields, then on submission determine final values to determine which changed, and it may compare final values to keyboard input to determine if dynamic behavior (e.g. password encryption) is taking place. The client may send information about application identity and form structure (e.g. field names, field types, position in DOM) to a server to have it determine mapping and combine with other users' results to improve accuracy. It may also analyze code of a page or application to determine field mapping, e.g., static analysis of android or iOS application to determine which field is a username field, which is a password field, and which button is a submit button. It may also implement crowd-sourcing, in which during form entry, it allows a user to mark field as particular type (e.g. username, email, first name, street address directly on form (e.g. right click context menu), or during form entry, visually highlight each form field and ask user to specify what type of information it is requesting, or after submission, present user with interface showing the list of fields, asking to tag what type of data each field has (e.g. name, email, etc.), and option to flag for someone to review/fix. A user interface dialog may ask the user to categorize the information they entered (e.g. "You entered 'myname@company.com', is this an email address", with the form asking the user to select what type of information "myusername1234" is). The client sends this mapping information to server. Using mapping of field names/identifiers to categories from multiple users, the server can avoid asking new users how to map their fields if a certain proportion of users map a given field to the same category. The system service-specific model that determines presence of a login/registration form, field to category mapping, and any unique requirements (e.g. password length/content). This can be based on a URL or URL pattern for the specific service that determines presence of a login or registration page, a field name, DOM selector, or other user interface hierarchy information that determines presence of form and categorization of form fields, delivery which is cached on client or delivered to client based on client's request to server where client specifies identifier for service. The system then analyzes what form data is transmitted to server over network, such as by the name and values of fields sent by submitting form. It also analyzes the form on the server to send form configuration, including name and types for fields, application identity information, DOM/UI hierarchy information, for example sending a hierarchy of types, names, classes, and identifiers. The server then returns whether or not is login or registration form and maps fields on page to categorization.

Web-Browser Registration/Login

Embodiments also include a web browser registration/login deployed as: embedded in the browser, as a browser plug-in, or as a Javascript library included in the site. If the user has multiple clients, e.g., browser plug-in and a Javascript library, the plug-in detects the site's integration with the Login with Lookout function and disables the plug-in's functionality or the Javascript detects the browser plug-in and disables the Javascript functionality. The system also determines enrollment by local cache or server request. The display may be implemented outside of page context (e.g. popup window), overlaid in the page, e.g., over a location of password form, where the position of the overlay is determined by detecting position of a target element via Javascript, and the size of the overlay is determined by the size of the form or container hosting form. In an embodiment, the UI is collapsable and closable.

The system may be configured to allow user pressing a button to initiate authentication or authorization request (potentially after selecting options, such as which authorizing client to use or what identity to authenticate as). A login UI shows waiting indicator while request is processing, and may show the status of request (e.g. contacting server, contacting authorizing client, waiting for user response on authorizing client, dialing phone number, waiting for response via text message). The server sends a response to the client, which may contain one or more of the following: categorized information (e.g. username="myName", password="aSecretPassword!" address="123 Main St. Apt. 112", city="San Francisco", state="CA", postal="94111"), and for which the form detection and analysis component of the client may determine how to map categorized information to particular fields in a form; a URL to redirect browser to (e.g. that includes a token) form data to post to a given URL; a decryption key for already stored information (e.g. password) on client; encrypted data for client to decrypt using a key it has; or an identifier for information already stored on client (e.g. address #3, credit card #2).

In one embodiment, the system may support a mobile keyboard that is a software keyboard module that can log in and register accounts. This enables application identity information that identifies target user interface (usually the currently focused UI dialog), e.g. using authoritative identity of target UI, such as a digital signature of the hosting application, can prevent UI phishing attacks (e.g. fake Facebook login form displayed), detection of login or registration form in UI and map fields to categories, e.g. examine Android view hierarchy for input fields, examine name of input fields, type of input fields (some may specify that they are an email address or password field), identifiers of fields; determines whether target application is enrolled, e.g., send package name and signing certificate of application to server, server responds with enrollment information. If enrolled, the system receives authorization from server to authenticate application (e.g. ask server for authentication credentials, server authorizes request and provides credentials if authorized); and if not enrolled, certain enrollment processes, as described above are performed. The keyboard also allows the system to insert text, keyboard events, navigation commands (e.g. up, down, left, tab), or other input to populate form elements in dialog as a result of server's authorizing login to pre-enrolled account or when enrolling an account, navigate target's UI tree (e.g. view tree, DOM tree) to move between fields, inject text, then inject tab, then more text ask user to go to username field, inject text, then ask user to go to password field, then inject text, and submit the form (e.g. button press of an affirmative button).

In one embodiment, the system may support a mobile application authentication API that detects the presence of a requesting client as an authentication/authorization provider (e.g., an application on the device). This may be implemented, by for example, sending an Android intent, or enumerating whether any applications will respond to a given intent; by checking if any application register to receive a given URI scheme; by querying the list of applications installed on the device and looking for a particular characteristic (e.g. package name, signing certificate); by checking in a shared memory (e.g. pasteboard) or file system location; or by checking whether a system service is present; by attempting to load a shared library. The application sends a request to the requesting client to determine if enrolled or to perform an enrollment. The requesting client may have a local cache of enrollment, or may request enrollment from server. If the requesting client determines that application is enrolled, it responds to the application, which displays UI element asking user if they want to log in to application. Alternatively, request from application to the requesting client may trigger the requesting client to display UI asking user if they wish to log in. If the user confirms that they wish to log in/register, requesting client authorizes the request (locally or with server) and returns information (e.g. credentials, account information) to the application or server specified in the request or previously associated with the requesting application.

In an embodiment, the system may support a mobile application authentication to the server. In this embodiment, the mobile application directly requests for server to authenticate a user on a device, such as by the application sending an HTTP request to server. The request may specify device identification information (e.g. IMSI, IMEI, android ID, UDID, account information, response to a cryptographic challenge), application identification information, or a variety of other types of information specified above. The server the authorizes request, as described above. If the request is authorized, the server returns account or authentication information to known trusted place. The application retrieves information from a trusted place, which may be specified in advance or via a URL provided by the application, checked against a domain policy list specified as part of the developer's configuration, which helps solve the problem of fake apps asking for credentials for a user. Alternatively, the server returns account or authentication information to the requesting application.

Additional Embodiments

The authentication and login platform may also be used to identify a user/client to a website or application. In this case, the user identifies him or herself to a site or application via a client that directly communicates with site/application, browser plug-in, Javascript library, or application/service provides information about the user via an API (e.g. Javascript API, HTTP API. Android intent, environment variables, shared pasteboard), or a browser/JS library provide an identifier that site can use to query the server via an API (e.g. HTTP API) to get more information about the user, and the client sets HTTP headers to include identification information. The user can also be identified transparently to site (e.g. no direct integration required), such as where the client pre-populates and submits login or registration form, the client creates a background page and logs in, so the user does not notice that they are being logged in, or the client sets cookies based on a previous session. Identification of a user to a site may occur automatically without per-site user intervention, based on pre-set preferences (e.g. only identify myself as anonymous or provide real name to all sites, but provide email only with user confirmation), or based on site categorization or reputation, e.g., a trust provider provides a rating system for sites and determines what information is acceptable for them to have, this may be based on expert review or crowd-sourced. A categorization provider may classify site into a category (e.g. eCommerce, social networking, news), and the user may select preferences for what level of identity they wish to provide each category of site. The system may also use operate with user opt-in behavior, e.g. user specifically select whether to opt the user in or not when they first visit the site. The user may have multiple identities, and selection may be made by UI on registration or upon visiting page, or it may be automatic based on category of reputation of site. Identity information may include name, email, demographic information, address, advertising preferences. An identity may be session-oriented (e.g. disappears after the browsing/usage session is over), anonymous persistent (e.g. unique identifier, where the identifier does not carry any additional information), or persistent with user-selected or site-selected information, e.g., email, real name, current location, payment information, address.

The requesting client performs extra validation of site/app to ensure security before enrolling user or automatically providing user/account information, determine if the site meets user's standards only provide authentication or account information to sites using SSL with a valid certificate by confirming with the server that this is an expected certificate for this site and not being spoofed. It may also determine categorization, maliciousness, quality, or reputation of site/app before enrolling. In this case, the requesting client provides application identification information to app/site assessment service, or an assessment service provides response, e.g. indicating that the site or app is authentic, whether it is a phishing site, how popular it is, how well it is rated by an expert rating service, how it is categorized, what country it is hosted in. Alternatively, the determination may be based on assessment, to determine whether to provide identity or other information, e.g., do not provide information to certain categories, advertising services, sites in particular countries, malicious sites or applications, sites or applications with poor privacy practices, phishing applications. Instead of denying a particular site or app, the requesting client may warn users why it is not recommended to register or purchase from a given site.

The system may also be configured to provide cookie isolation. In general, a server may set a cookie associated with a particular domain whenever an HTTP request is sent by a user's browser to that domain, even if the user is visiting a page not on that domain. For example, visiting www.a.com may show an HTML page that contains a reference (e.g. img tag) that loads an image from www.b.com. In this case, the www.b.com server may set a cookie so that any other sites (e.g. www.c.com) that also contain resources from www.b.com will cause the browser to send the previously stored cookie. This creates a privacy issue whereby services that users never directly visit can track users without their knowledge by integrating tracking images or scripts onto many sites on the internet. Similarly an application may use a global device identifier to track a user's behavior across multiple applications.

The problem of sites tracking users across many domains is generally solved by only allowing a site that user visits to set cookies, no third party sites. For example, if a user visits. www.a.com, only that server can set cookies for the user, any requests to www.b.com from the page returned to the user's browser for www.a.com will not transmit cookies nor will they store cookies returned by b.com Embodiments include methods for isolating cookies to only a specific site, e.g. a browser stores a cookie state for each site, it stores and sends cookies set by the primary site being visited and any third-party sites referenced, and when a user is no longer visiting that site (as primary navigation), the cookies are not used or modified. Thus, if a user visits www.a.com, the browser will store and send cookies; however if he/she visits www.b.com, and it contains content retrieved from www.a.com, the browser will not send the previously set cookies for www.a.com; however it will store any received cookies and send them to www.a.com whenever the request to www.a.com originates from a page primarily controlled by www.b.com. The policy of whether or not to isolate a site may be controlled by user preference or by a trust provider. Interaction with an assessment service in extra validation may be used. For example, known advertising tracking networks may be isolated, whereas, single-sign-on providers (e.g. Facebook, Google) may not be isolated.

Embodiments may also be directed to facilitating session transfers, which is the problem of a requesting client having access to raw credentials (e.g. in the case of an untrusted client, or a shared account is solved by server creating session and transferring it to the client. The server submits login form on its backend, captures session information (e.g. URL token, cookie). The server provides session information (e.g. token, cookies, URL) to the client and the client sets the session information. The server may request that client unsets information (e.g. if multiple users need to access the account, but only one can do so simultaneously, if a user's access has been revoked).

Embodiments may also be directed to certain account enrollment/management applications. In this case, the authentication management platform also manages personal information for one or more accounts. On enrollment, the user selects an identity to associate with a respective account. If the user changes identity, the system updates all accounts using that identity. Example types of information include:

name, address, phone number, payment information, email address, company, interests, music preferences, and so on.

The system can be configured to modify user account information in the background. The user may request that one or all of his or her service credentials are rotated; or credentials are rotated on a particular interval (e.g. change all of my passwords every month), the system manipulates account information, e.g. using background page in client or headless browser on the server side. The form detection and analysis component may be used to determine category mapping of form fields, and a background page or headless browser may be used to enter information into appropriate fields (e.g. update password form, new address form) for submission. Changing information may require a multiple step flow. For example, a server stores procedures for changing particular types of information; the server may directly use them to change information or may send procedures to client (e.g. Javascript) to perform them. The server may need to intercept email or other authorization mechanisms in order to complete process (e.g. email asking user to confirm password change, or to complete password change). An open source repository may be used, such that the procedures may be stored in an open source repository so service owners can maintain their own information change procedures. The server or client uses APIs exposed by server directly to change information. The server signals to a service that the user's information has changed and that it should re-request it. The system can rotate account information on site breach, determine when a service has been breached, or determine which users of server are enrolled in the breached service. In response, the server can change authentication credentials, contact information, and other account information associated with the compromised service.

Embodiments may also implement a mobile application launcher in which a launcher loads another application. The app may already be installed on the system and loaded from its installation point, or from an uninstalled package on the file system (e.g. IPA, APK). The launcher may be integrated into an app (e.g. wrapping an app) and not a separate application as far as the OS (operating system) is concerned so that the launcher loads the embedded original app it is wrapping. The launcher may perform validation of the app, e.g., verifying its digital signature, checking with a reputation database, locally or on a server to ensure that the app and/or its signer is acceptable. The launcher may decrypt the application if it is encrypted, and such encryption may occur for DRM (digital rights management) or security purposes. Both the app data (e.g., configuration, documents, cache, databases) as well as the application code/assets may be encrypted). The launcher starts an app or invokes a portion of app with certain authentication information, such as a pre-filled in an environment variable accessible to the app, or pre-filled in configuration data accessible to the app. The launcher populates the login form in the app when appropriate. Authentication information can be: a username/pw or a session token for the app's backend service, or authorization token to retrieve login from a service (local or network-based).

In an embodiment, the authentication server acts as proxy for goods and information to protect privacy and provide user control over access. Types of proxies for this application include: e-mail, phone call, text message, or mailing/shipping address, or payment. This functionality is implemented when enrolling an app/service or when changing account information for a service. It sets information to be a unique address associated with the proxy, rather than providing the user's actual information. When the proxy receives input from the service, it checks a policy to see if the service is allowed to provide input to user. If so, it forwards to the user, and if not it ignores or returns input to the service as rejected. For configuration, the system sets a proxy policy per service, service category, or globally for the user, or type of communications, e.g., deny all shopping sites, allow this specific service, deny all, allow billing emails, but not promotion emails. The service category can be determined by an application or site categorization service or by an app's category in an app store, and the type of communications can be performed on server side by analyzing content to be proxied (e.g. e-mail, SMS, package, letter), source information (e.g., known marketing e-mail service provider, known junk mail sender, 3rd class presorted mail, etc.). The configuration can be based on rate limiting (e.g. all services can send one email per week, a particular service can send up to ten, but if any go over their limit, they will not be able to send more that week), or whether or not the proxy is authorized by the user each time a service wants to proxy to them (alternatively, only the first time, or if it has been a long time since the proxy was used for that service).

Applications

Embodiments of the user authentication and login platform can be used in a variety of different online applications from communications (e-mail, messaging), electronic commerce, education, and home and family management. In these embodiments, the authentication server acts as proxy for goods and information to protect privacy and provide user control over access. Types of proxies include e-mail, phone call, text message, and mailing/shipping address, among others.

E-Mail

One current issue associated with electronic mail (e-mail) communication is the threat of phishing, which is the act of attempting to acquire user information (usernames, passwords, credit card information, etc.) by posing as a trustworthy entity in an electronic communication. For example, a user may be invited to login to a website or respond to an e-mail that links to a site containing malware or data capture processes. In an embodiment, the user authentication management platform provides an e-mail system that eliminates or reduces the threat of phishing attacks. The platform creates a trusted pathway so that authentic e-mails from trusted accounts are treated differently than e-mails from unverified e-mails. The problem of unwanted e-mail from services a user signs up for is solved by allowing a user to control each service's ability to send e-mail to them via an e-mail proxy that has a unique e-mail address per account the user has with a given service and a configuration determining which services can proxy.

In an embodiment, the e-mail system generates a unique e-mail address and associates that e-mail address in a database with user account and a service. The system sets the e-mail address of an account on a service to the generated e-mail address upon registration by the server returning the generated e-mail address to a client that is providing account information to the service. By changing the e-mail address associated with the user's account on the service, when an e-mail server receives e-mail from the service at the generated e-mail address, the system checks the database to see what user and service the e-mail account is associated with to the server, performs validation on the source of the message, and rejects the e-mail message if invalid. The check can be performed by verifying whether or not the sending server is the appropriate sender for the service. Domain keys and sender policy framework (SPF) techniques are used to verify incoming e-mails sent to the assigned e-mail account.

In an embodiment, the electronic mail system includes a provision to protect the user's actual e-mail address to which the incoming e-mails are forwarded in the event the user replies to the incoming e-mail. Ordinarily when a reply to an e-mail message is sent, mail header information is included that shows the user's e-mail address. Thus an e-mail that came from marketer@xyz.com at service XYZ to a unique generated e-mail address k4iYuEvFAs9a6e3R@example.com would be forwarded to the user's real e-mail address usersrealemailaddress@gmail.com by the e-mail system. Should the user reply to this message, the original sender would see the user's real e-mail address (usersrealemailaddress@gmail.com). The e-mail system takes several steps to prevent the exposure of the user's real e-mail address or IP address. The e-mail system generates, if it has not already done so, a unique e-mail address for the original sender's e-mail address, e.g., from-marketer-at-xyz.com@example.com and rewrites the From: and any Reply-to: headers in the e-mail to use this address. Replies sent from the real user will go to the e-mail system, which will strip any information identifying the user such as the user's real e-mail address before forwarding the e-mail reply on to the original sender marketer@xyz.com. Additionally, the e-mail system will protect the identity of the user's IP address by rewriting any HTML content that is embedded within the original e-mail. Such HTML content can include page objects such as images that are pulled from the sender's web server; the act of fetching such page objects exposes the IP address of the reader of the e-mail. Any URI included in the HTML content in the e-mail will be rewritten to proxy through the system. For example, <img src="http://www.xyz.com/img/banner.gif"> will be rewritten as <imgsrc="http://webproxy.example.com/url?url=http%3a%2f%2fwww.xyz.com%2fimg%2fbanner.gif">. In this manner, the XYZ service will only see the IP address for the webproxy.example.com server, not the actual user's IP address. Additionally, in an embodiment, any executable objects such as scripts or flash or applets can be stripped from the HTML embedded in the e-mail message (because in executing they would be able to expose the user's IP address). Additionally, any page object that is fetched via the proxy webproxy.example.com is also examined for embedded URIs and these are rewritten in the same manner (e.g., a CSS stylesheet linked from a LINK element or html page embedded within an IFRAME element fetched that contains other URIs within it).

The e-mail system may also include a mechanism for spam reporting. This component checks whether spam has been reported by this site or this sender IP analyzing multiple e-mails from service, such as by checking whether or not a particular IP address or IP block is a typical sender for this service or atypical given other e-mails received for this service for this user or other users. It can also perform an IP address reputation check to see whether the IP address is for a known spammer. It can further perform a reverse DNS lookup to see whether the IP address of the sender matches the domain of the service or a domain associated with the service. Other verifications can also be performed, such as checking the digital signature of message from originating server, or the configuration/policy settings to determine whether service is allowed to send e-mail.

Once an incoming e-mail message is validated, the user preferences are checked to see whether or not the user is allowed to receive e-mail from the service. If so, the message is transmitted from the service to the user's e-mail account. If the preferences disallow the e-mail the system can be configured to either ignore the message or reject the message and return to sender, marked as disallowed. The system can be configured to automatically detect important messages (e.g. human generated, billing-related, urgent, etc.) and allow them to bypass the preference policy. Important messages may be digitally signed by a digital signature known to server to signify that a trusted entity is asserting that they are important.

In the case of a rejected e-mail transmission, instead of rejecting the message, the server 102 may instead quarantine the message. It can then send daily/weekly/periodic list of all quarantined message to user's e-mail address, and/or show a list of quarantined messages in a web application. To prevent links to dangerous or undesirable sites, the server can modify references to external resources. For example, reading an e-mail may expose the user to links to malicious sites links, images, attachments, etc. In this case, the system can retrieve all images reference and embed in the e-mail, strip off uniquely identifying strings when retrieving them. The system can also modify referenced URLs by stripping off any uniquely identifying strings. It can also change a referenced URL to a URL hosted by server after storing the original URL in database, or as parameter in the new URL hosted by server. When visiting URL, or in advance of a user visiting the URL, the system checks to see whether or not the destination is unsafe (e.g., blacklisted). The browser can then be directed to visit the URL and determine if malicious or unsafe. In an embodiment, the system can incorporate a safe web browsing method for mobile devices, such as that described in co-pending U.S. patent application Ser. No. 13/160,382, entitled "Mobile Web Protection" filed on Jun. 14, 2011 and assigned to the assignee of the present application, the disclosure of which is hereby incorporated by reference in its entirety.

Password reset mechanisms that may be employed by phishing sites or other malicious parties can also be prevented from operating. The system provides a single repository for all password notifications sent by server providers. Valid service providers would be instructed to send password reset e-mails to the user's verified login e-mail address. Every time that a password reset e-mail is received, a notification would be sent to the authorizing client, rather than the user's e-mail account. Thus, valid password reset notifications would be transmitted through the system, and any other password reset messages could be deleted or quarantined.

In an embodiment, the server 102 can be configured to use clickthrough and open rates of e-mails to predict the relevance of e-mail content. For example, services that have high clickthrough and open rates may be allowed a higher default quota of messages than services that have lower rates. Thus, if the server determines that 50% of users open a message from service, and 20% click a link in the message, for example, the service may be allowed to send a high volume of e-mails (e.g., five per week). However, if the server determines that only 15% of users open a message from a service and only 1% of users click on content, for example, the service may only be allowed to send a low volume or no volume of e-mails. The server can also use clickthrough information and message content to identify patterns a service uses to reset an account password or change other account information. The server can then use these patterns to automatically change a user's account password or other account information without a user having to manually change their information.

In an embodiment the server may choose to consolidate multiple e-mail messages received from a service into a single e-mail message to be sent to the user. This can be done as a digest (incorporating the body of multiple e-mail messages into a single e-mail message) or can be done by sending the multiple e-mail messages as attachments to the single e-mail sent to the user. Whether the server is consolidating e-mail messages or not is configurable, and may depend on the current quota and volume of e-mails being received. In an embodiment the server may consolidate e-mail messages from more than one service into a single e-mail sent to the user.

With regard to e-mail proxying, in embodiment, the server 102 can add human-readable authentication information in e-mail, such as an image, text, color, pattern, or similar data element. The server can add machine-readable information to e-mail content or headers to prove it came through the service and has been validated. For example, an S/MIME digital signature or PKCS digital signature of the message content can be embedded as a header or part of e-mail content, or the server can embed the HMAC of message content as a header or part of the e-mail content. Alternatively, a secret token known only to proxy service can be embedded as part of the message. The token may be unique to the user, unique to the message, or may be a digitally signed data bundle that includes information such as the service being proxied for, the message ID, etc. A user-defined image or text may also be used to authenticate the source of the email. Such user defined images maybe pre-defined and pre-stored in the system, or they may be provided by the user dynamically through UI prompts.

The e-mail functionality of the user authentication management system can also be configured to verify whether or not e-mail is received at the user's e-mail account. This can be implemented as a browser plug-in. When the user opens an e-mail in a browser-based e-mail client (e.g. Google Gmail) examines the contents of the e-mail API/login access to the user's e-mail account. The server then connects to the user's e-mail account and retrieves the e-mail message(s), and performs validation and other operations. The mail server that has access to user's e-mail account may maintain a persistent connection to the user's e-mail account to receive "push" e-mail and modify it as soon as it is received as opposed to waiting. Instead of proxying to enforce which services/applications are allowed to send mail to a user, the server 102 may enforce by interacting with user's e-mail account, such as by setting up a quarantine folder, and moving quarantined messages to that folder as soon as they arrive, or deleting disallowed messages.

To determine which e-mails are authentic from an e-mail server, the system can validate machine-readable or human readable information in e-mail, validate digital signatures, examine secret tokens and validate digital signatures, or look up in database of secret tokens to confirm that it is valid (e.g., for this user or this user-service combination). The system can also validate by examining e-mail headers (e.g. source IP of server relaying e-mail) to ensure it came from a valid source. The server can then take action based on authenticity of e-mails. Such action can be alert or status messages sent to the user. For example, the subject line may be modified (e.g., "SPAM:", "TRUSTED:", "UNVERIFIED:"), or the display color of the e-mail can be changed (e.g., green for authentic e-mails, no color change for unverified e-mails), or messages can be moved to a different folder (e.g. trusted folder, per-service folder, spam folder). Unverified or threatening e-mails can be deleted or modified, such as by appending a header reading "This e-mail is sent from an unverified sender, you may not want to trust its contents." The system administrator can be notified if the user receives unverified e-mail attributable to a trusted source (e.g. e-mail contains a reply-to or from address from a service, but was not sent through that service, then notify an administrator for the user's account or an administrator for the service).

Sales/Payment Systems

The significant increase in e-commerce sites and Internet sales transactions has necessitated increased security in user information and payment accounts (e.g., credit card, debit card, bank information, etc.). In an embodiment, the user authentication management platform 101 includes a component that facilitates payment through the secure platform. In the case that the target website is a vendor site, the authentication server generates a unique payment account (e.g., credit card number) for the transaction or for the service such as in the case of a recurring transaction). The server provides the generated account to the service, and can be configured to automatically fill out the transaction forms, change payment details associated with the account without user intervention, and so on. When the service charges the generated account, the server can determine if the charge is authorized by preferences for the service on the user's account, or an organizational preference that determines policy (e.g. spending limits by amount, by category of purchase, or by service).

The server authorizes the transaction with user by pushing to the authorizing client the amount of transaction and the service name. The server then waits for user confirmation/decline of transaction. If authorized, the user is charged. The system can create a pre-paid balance supplied by user (e.g. by charging to credit card or loading balance via ACH or wire transfer) or charge a pre-enrolled credit card supplied by user. If charging the user is successful, the system allows the transaction initiated by the service. If charging user is unsuccessful or the transaction is declined based on policy/preferences/user action, the system does not allow the transaction initiated by the service to succeed.

The sales component can also include processes that facilitate the shipping of purchased product. The server can be configured to generate a unique shipping identifier for a transaction or for user's account with the service. It first determines an appropriate shipping proxy location, and then determines by location of shipper and the location of the end-recipient to minimize overall shipping cost (e.g. cost to ship from shipper to proxy and proxy to user). The server populates the address field in a checkout form associated with an account or other shipping address information entry method (e.g. via API) with the proxy's physical address, including the unique shipping identifier.

The server can generate a unique name that has high enough entropy to uniquely identify user's account with service or user's individual transaction. At the proxy center, personnel receives the mail, looks up the identifier in a database to determine the intended destination, and sends the mail to intended destination in new or original, re-labeled packaging. Alternatively, they can hold with no intended destination for the user to pick up. For example, near a user's home or office, may be a set of lockers that allow a user to pick packages or mail up from. When a package is delivered to the proxy address, personnel bring the package to an appropriate locker near the user's home and the user receives a notification that they have a package waiting and that they should pick it up at a specified location. When the user arrives at the location, they may use login system to unlock their package. For example, a user enters a phone number in the locker's terminal. The locker terminal contacts authentication server to determine if that phone number authorizes a package to be picked up. Authentication server contacts authorizing client on the user's mobile phone and if the user confirms that it is OK to pick up the package, the authorizing client sends an indication to authentication server and authentication server informs locker terminal that it is OK to release the package.

Locker terminal then identifies the correct locker the user is authorized to retrieve a package from and unlocks it.

The authorization system can be extended to multi-party authorization or notification. Instead of a single authorizer, it is often useful to allow the server to provide notifications or get authorizations from multiple people, or from a user different from the user whose action triggered the request. Instead of a single authorizer, it may be useful to allow server to provide notifications or get authorizations from multiple people, or from a user different from the user whose action triggered the request form a requesting client or other request origin. For a given process (e.g. task completion, action that needs approval before it can happen), authorizations may be triggered when the process originates, such as on a time interval (e.g. every night the store needs to be closed and locked) or based on user action (e.g. employee submits expense report, requests to sign contract, or requests access to a bank vault). Throughout the process users are assigned roles. If user did not originate a task, that user may be assigned to complete the task every time period. One or more user may be assigned to an approver role for a given step in the process. A group of users that are candidates for a given role are pre-determined or otherwise configured at service.

One or more people may be determined to be in a role where they are notified of progress or at particular points in the process, e.g., a store owner receives confirmation when the store is closed for the night, with a picture of the store's closure. Role selection can be based on a number of factors, such as: pre-configured, selected based on a schedule (e.g. John has Wednesday, Mary has Thursday, etc.), based on current location (e.g. closest user from a set of possible users) determined as described above, based on activity status, for example, is an authorizing client currently online and available (which is a state which may be determined automatically, e.g. by accelerometer motion, or manually set by a user). The server may receive information associated with the process (e.g. name of originator, photo of task being completed, task name, documents associated with task). If authorization needed in order for process to proceed, the system must determine user who can authorize task authorize request (e.g. as described above). If a task or authorization requires confirmation of completion, a user is requested to do it, the client prompting the user to provides the required information (as specified by server), e.g. picture, information, etc. A process may have a set of time periods for a task or a step in the process to be completed, if a time period has elapsed, the process escalates, e.g., assigning task/approval to a new user. The system notifies that an escalation user that the task was not completed. Multiple escalation steps are possible, and the escalation steps may change forms of communication, e.g. start with authorizing client request, move to text message, then to phone call. A process may be defined at the server using a management console to specify the flow, types of information required for different steps to complete, how to select an owner of a step, how to select an approver of a step, how to select someone who needs to be notified of a step, escalation path, repetition frequency of task, and other information described above.

A process may interface with external systems to perform one or more steps. For example, a building access control system transmits information to server when all occupants have left, if server has not received information by 10 PM, notify building manager. If all occupants have left but someone enters the building before normal hours, notify the building manager with the name of the person entering the building and a security camera video of them entering, the manager may only be notified of the entry or may be required to approve the entry. Example process automation using an authentication server include payments (e.g. payroll, billing), contract signing approval, PTO approval, hiring approval, e-mail content approval, and report approval Process Management Embodiments of the user authentication platform can also be used to perform certain aspects of process management, where a given process involves task completion and at least one action that needs approval before it can happen. Throughout a typical process, users are assigned roles. If user did not originate a task, that user may be assigned to complete the task. One or more users may be assigned to an approver role for a given step in the process. A group of users that are candidates for a given role pre-determined or otherwise configured at the service. One or more people may be determined to be in a role where they are notified of progress or at particular points in the process. For example, a store owner receives confirmation when the store is closed for the night, with a picture of the store's closure. Role selection can be based on a number of factors: pre-configured, selected based on a personnel schedule, based on current location, based on activity status (e.g., is authorizing client currently online and available).

The server may receive information associated with the process (e.g., name of originator, photo of task being completed, task name, documents associated with task); if authorization needed in order for process to proceed, the system determines user who can authorize task. If a task or authorization requires confirmation of completion, a user is requested to do it. A process may have a set of time periods for a task or a step in the process to be completed, and if a time period has elapsed, the process escalates by assigning task/approval to a new user. The escalation steps may change forms of communication, e.g., start with authorizing client request, move to text message, then to a phone call, if necessary.

A process may be defined at server using a management console to specify the flow, types of information required for different steps to complete, how to select an owner of a step, how to select an approver of a step, how to select someone who needs to be notified of a step, escalation path, repetition frequency of task, and other information. A process may interface with external systems to perform one or more steps.

In an embodiment, a management console may be implemented as a site or application shows list of accounts, services, applications a user has enrolled. The user may change identity service or app is associated with, such as through account modification background processes described herein. This can be used to change a password or email address for all sites/services, or selected service, revoke a service/apps's access to user/account information, or delete an account e.g. interact with service in background to delete account. With regard to behavior policy, a local client regulates behavior for applications, sites. Types of behavior include payment, login/retrieve previously associated info, retrieve information about user/sign up and store for later relating site/app and person, application launch or site visit, application network access generally or to a particular domain, IP, access to location or other behavior on the device executing the application/site. With regard to timing, authorization can happen after an app/site attempts to engage in a behavior or before. This can occur upon access, such as when an application on device wants to make a payment or retrieve location or preemptively: e.g., app on device wants the ability to retrieve login information for a user (can be declared as part of a permission manifest for the application, or may be requested ahead of when it needs to happen).

For authorization, the system can authorize behavior locally (e.g. with policy based on user configuration or a pre-stored database, e.g. categorization database of apps/sites), or it can authorize with the server. Authorization can occur synchronously: before allowing behavior, the client must receive result from server; or it can occur asynchronously: allow behavior if permitted by client, inform server about it but don't wait for response from server before allowing. The server may later come back and revoke the behavior, and the client would then stop the behavior for that app/site.

Security and Disaster Recovery

In an embodiment, the user authentication and management platform includes one or more mechanisms to help users stop or recover from an attack (e.g., password hack, identity theft, etc.) and give them a clear course of action. An interface referred to as the 'panic button' provides a means to alert the service providers of every account the user has stored Login credentials. This puts the service provider on high alert that an impostor might phone or e-mail claiming to be the user. In this case, the strictest form of identity verification would be employed in the event of contact, and certain behavior would trigger automatic denial or further investigation, such as a user saying "I don't remember" to a security question. This security measure begins the process of resetting each and every password the user has stored with the authentication server. Several management functions can also be employed, such as an archive would be made of the old passwords and delivered securely to the user at a later date; the user would be notified of the change; and the user can request that certain credentials be frozen (i.e., not changed) by the panic button. In an embodiment, the authentication server provides a user interface that provides certain information to the user and prompts certain action. For example, the security user interface could instruct the user to do the following tasks in the event of a breach or emergency: (1) "Call your service providers", (2) "Begin with financial institutions", (3) "Consider contacting your credit card companies to freeze your accounts and search for suspicious activity . . . ". Telephone numbers and other relevant contact information could also be provided.

With regard to security, the system can also be configured to ask dynamic security questions. During normal use of the login and user authentication management platform, there may be certain times that the system needs to employ traditional security questions to verify a user's identity. Some situations in which this could be necessary include: registration for the service, verification before initiating the panic button, verification when using comprehensive login on a mobile device, verification when using a platform proprietary browser, initiation of an MFA request on the desktop browser extension, and other similar situations. Current security questions such as "What was your mother's maiden name" are quite easy for an identity thief to determine. In an embodiment, the authentication server derives specific questions that are based on the context of network usage by the user. Thus, the system innovates the security routine by asking dynamic questions that are tailored to the user's unique knowledge about him/herself. Example questions might include: "which of these pictures did you take yesterday on your Galaxy Nexus?, Which of these is a Google Street View of your childhood home?, Which of the following contacts is in your address book?, and other similar context or use-specific questions.

Parental Control

In an embodiment, the user authentication management platform can also be used to facilitate the management of family or organization user access to Internet resources. Within the home environment, parental control is an important consideration given the free access to huge amounts of information on the Web. Parents usually desire some degree of control and consent over their children's' online activities. Parents typically want to manage what sort of services online or applications their children access and may also want to manage when their children access this. In some legal systems, service operators are obliged to obtain consent from parents if children under certain ages access their services (e.g., COPPA). The server 102 can be configured to determine when a child's requesting client wants to enroll or authorize access to a service, and then have the parents authorizing client handle the request for authorization. The parent can then choose to allow or disallow the child's access to service. The parent can set preferences of when to allow or deny service requests for the child so they do not need to approve every request. In an embodiment, child's requesting client authorizes access to run an application, for example, an app on a device is protected (e.g. encrypted or another form of access control) so that the requesting client must receive authorization from server before it is allowed to be opened. In an embodiment, a parent sees activity of child's authentication and authorization, e.g. new services enrolled in, when they visited given services, but does not authorize it directly. The server pushes notifications to parent when events, such as a child enrolling into a new service, occur.

The parental control mechanisms can also be extended to apply to other organizations or entities, such as companies, schools, and so on that make computers and networks available for general use, but want to limit activities or access to certain sites and content.

Alternate System Architectures

Figure 17:
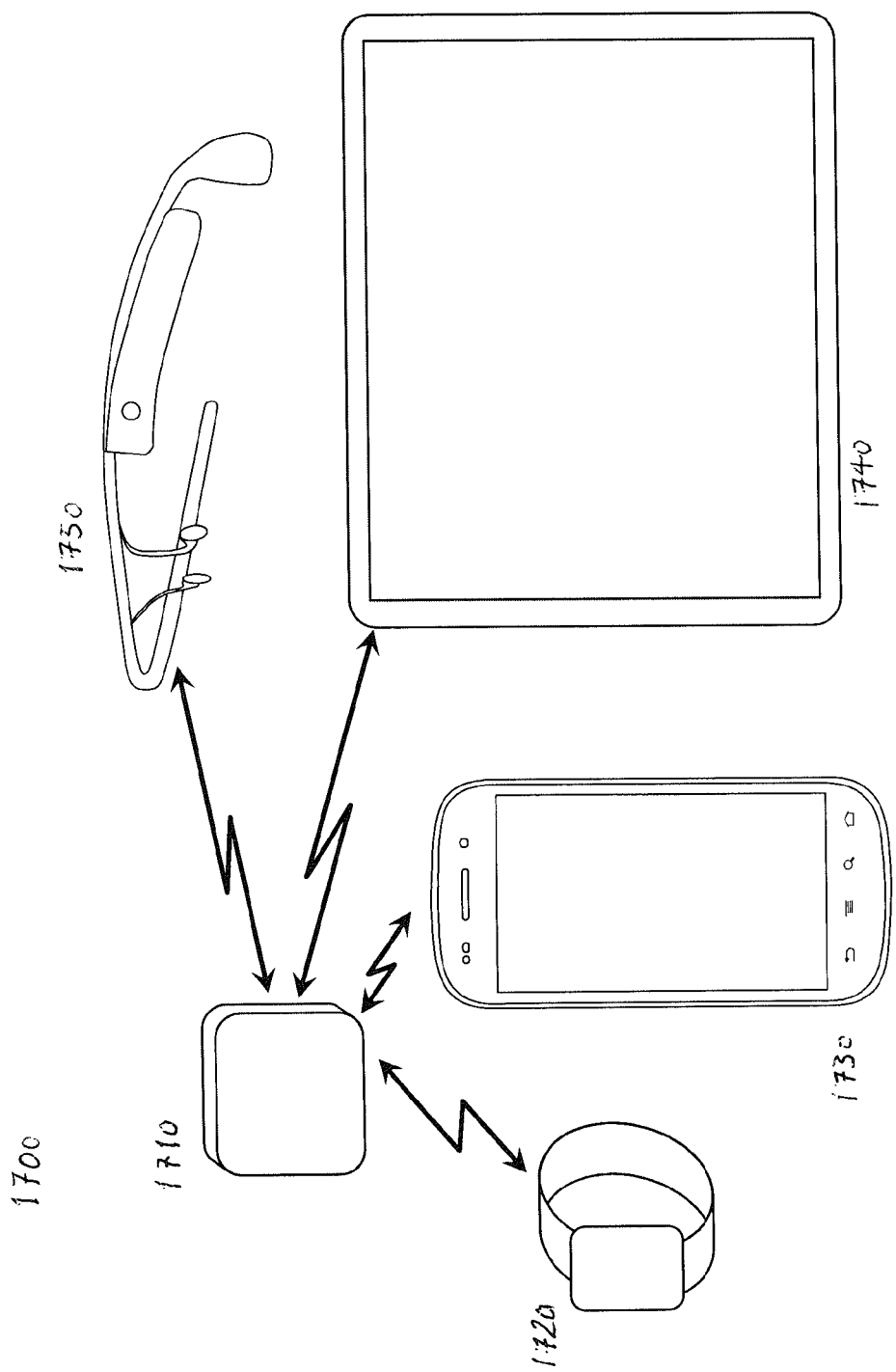
FIG. 17 illustrates a personal mobile device system in which there are multiple communicating components coupled wirelessly to a server component.

As shown in FIG. 1, embodiments of the user authentication and login process may be implemented in a client-server system comprising different types of client computers 112, 118, 119 coupled to one or more server computers 102, 114 over a network 110. In an embodiment, the server 102 and/or 114 can be a computer that is located at some distance from the user and the mobile device. For example, it could be located somewhere in the 'cloud' embodied-in network 110, or it could be a component/device that the user carries upon his person, or keeps nearby, such as a personal computing device, smartphone, PDA, smartwatch, etc. FIG. 17 illustrates a personal mobile device system in which there are multiple communicating components coupled wirelessly to a server component 1710. The server 1710 may have a large battery to power long distance communications networks such as a cell network or WiFi. The server 1710 may communicate with the other components of the personal mobile device system via wired links or via low powered short-range wireless communications such as Bluetooth. Alternatively, one of the other components of the personal mobile device system may play the role of the short-range wireless server, e.g., the watch 1720, the head mounted device/glasses 1750, the phone 1730, or the tablet 1740. In the configuration shown in FIG. 17 the server 1710 may be of a size small enough that it can be kept in the user's pocket, bag, or purse. This allows a large and therefore heavier battery to be used to power long distance network communications. In general, the other individual components 1720-1750 require lower power to communicate with the server 1710 and thus can use smaller and therefore lighter batteries. This also removes the high intensity radio frequency signals from the close vicinity of the user's head. The individual components of FIG. 17 can also play roles in the proximity device login scenarios, as tokens or as authenticating devices. These components themselves can use NFC taps or other similar mechanisms to link them together. Any of the devices 1720-1750 may be configured to act as an authorizing client 132 or they may be configured to act as the requesting client, based on system configuration.

FIG. 17 illustrates a use case wherein a user may use multiple wireless devices simultaneously to perform a variety of tasks. Such devices may comprise part of a 'personal device group' or may represent multiple physical components of a single or integrated personal device. In an embodiment, the authentication/login platform may be configured to work with such a personal device group. For this embodiment, server 1710 plays a communication and/or coordination role amongst multiple personal devices 1720-1740. These devices are either multiple independent personal devices affiliated in a personal device group for a user, or can be considered as a personal device with multiple physical components. Certain resources, such as network services, file services, or other services are provided by server 1710 and used by the other components. For example, server 1710 may be the only device with a cell-phone radio and an ability to connect to a network, and it proxies communication attempts by the other devices in the personal device group for such services. Alternatively, server 1710 could play the role of authentication/login platform server or as part of the authentication/login platform. It may serve as the authenticator for the admission of a new personal device into the personal device group for a user. It may also serve as the authenticator for access to services provided by a target server 114. In this role, it may have the ability to authorize directly; or it may need to connect to a separate authentication server 102 in order to complete the authentication operation.

In conventional mobile device or portable client architecture, such as shown in FIG. 1, a mobile device (e.g., mobile phone 118) runs an operating system, and applications that are installed upon the mobile device, are stored and executed using protocols and mechanisms defined by the operating system. In one or more alternative embodiments, the applications, operating system and/or file system components may be distributed among one or more other components or computers of the system. In a typical network application, applications and file systems are usually made available by one or more servers that are maintained in network 110. In certain cases, however, one or more applications and file systems may be provided by target server 114 and/or authentication server 102.

The various processes described above made reference generally to the embodiment of FIG. 1, wherein one or more of the requesting client 118 and authorizing clients 132 may be embodied as mobile communications devices (e.g., smartphones or mobile phones) that run an operating system. In a general case, applications are installed on the device, stored using the file system of the device, and run under the control of the operating system. In this embodiment, the provision of the login and authentication processes and file system manager component on mobile communications device allow for local operation and management of these functions.

Figure 18:
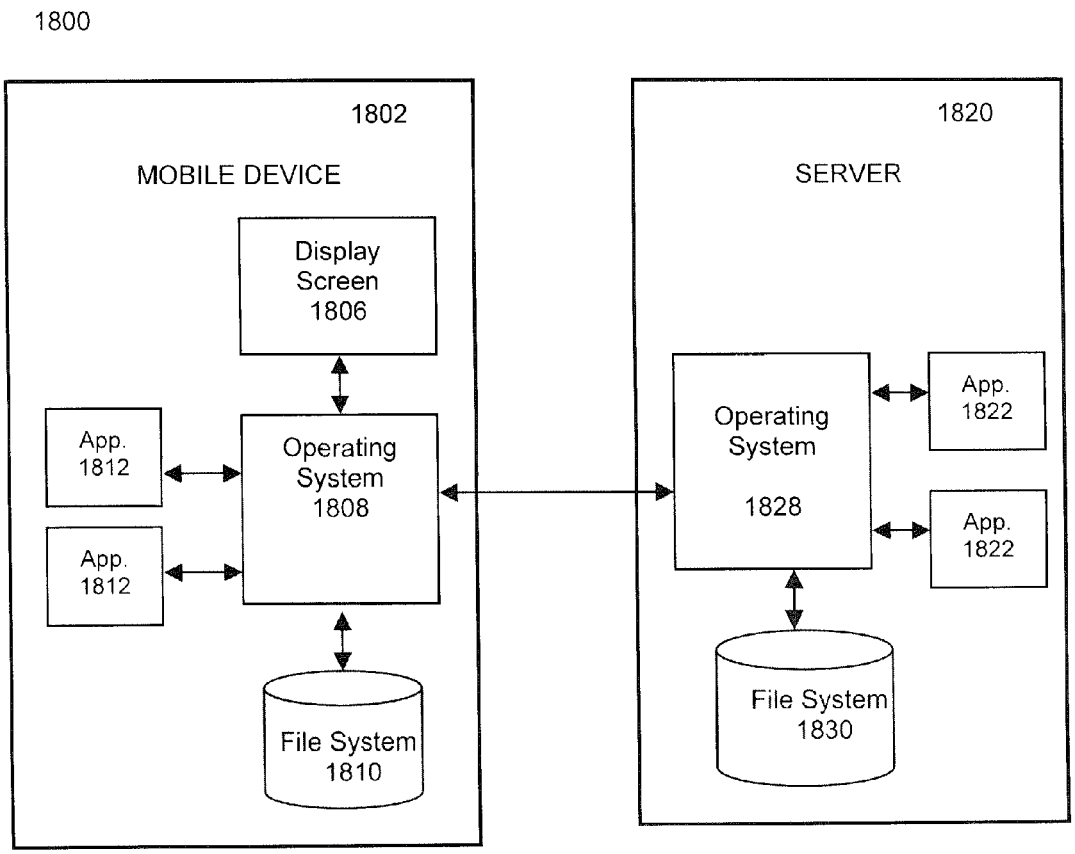
FIG. 18 illustrates an embodiment of a mobile device architecture in which the mobile device comprises an operating system, a file system and one or more applications all resident on the device.

FIG. 18 illustrates an embodiment of a mobile device architecture in which the mobile device comprises an operating system, a file system and one or more applications resident on the device. In system 1800, the mobile device 1802 has one or more resident applications 1812 stored on the device, a file system 1810, an operating system 1808, and a display screen 1806. In this system, there is an associated server 1820, which has an operating system 1828, and a file system 1830. The server 1820 is intended as a master control point for the user's mobile device (or devices) 1802. Applications 1822 are installed on and controlled from the server. These applications 1822 are different from the resident applications 1812 and are applications that are executed to perform login, authentication, or other network associated tasks. In an embodiment, the distributed architecture of system 1800 implements a particular form of virtualization. Executable applications 1822 in this architecture are not installed directly on the mobile device 1802 itself, rather they are installed on the server 1820, and stored in the file system 1830 on this server.

In an embodiment, a file scanning system and associated logic and processes for mobile devices may be used in conjunction with file system operations and application installation operations on the file system. Such systems and methods include those described in co-pending U.S. patent application Ser. No. 13/710,162, entitled "Method and Apparatus for Enhanced File System Monitoring on Mobile Communication Devices" filed on Dec. 10, 2012 and assigned to the assignee of the present application, the disclosure of which is hereby incorporated by reference in its entirety.

In system 1800, when a user wants to run an application 1822, the operating system 1808 on the mobile device 1802 requests the operating system 1828 on the server 1820 to provide the necessary files (application executables, associated data) to the mobile device. The operating system 1828 on the server 1820 sends the necessary files to the operating system 1808, which places them temporarily (like a cache) in the file system 1810 and executes the application. While the application is running any modifications to the files which had been brought to the mobile device are either immediately sent to the server 1820 so that corresponding modifications can be made to the corresponding files on the server, or are monitored and at a later time (which may be after the application has finished running, or could still be running) the modifications are sent to the server so that a decision can be made whether to make the corresponding modifications to the corresponding files on the server, and if the decision is yes, to make such modifications. The decision may be made based on security and privacy policies in place on the server. After the application has finished running, the files that had been sent to the mobile device are marked for removal. Removal may happen immediately or at a later time. If the same application is initiated again while the necessary files still reside on the mobile device (they have not yet been removed) and the files are the same version, then the mobile device can use these local copies rather than requesting copies of the necessary files again from the server. In this sense the local file system 1810 on the mobile device acts like a local cache for the necessary files, but the definitive version lives on the server.

Figure 19:
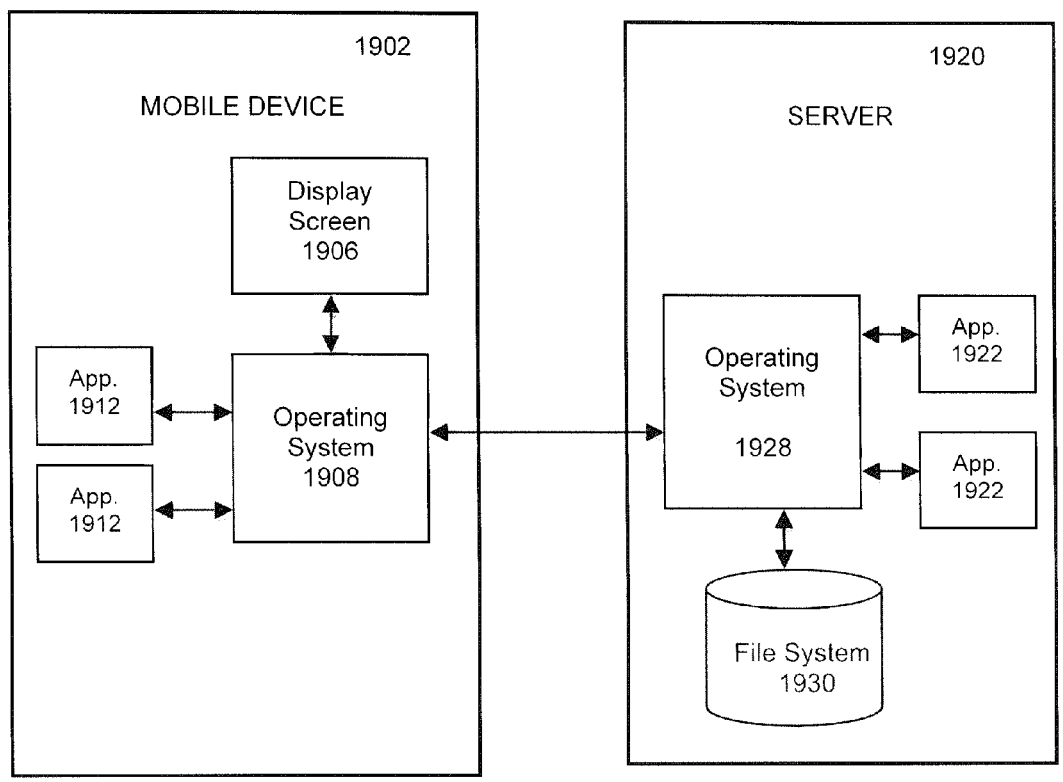
FIG. 19 illustrates an alternative embodiment of a mobile device architecture in which the mobile device comprises an operating system, one or more applications, but no file system resident on the device.

FIG. 19 illustrates an alternative embodiment of a mobile device architecture in which the mobile device comprises an operating system, one or more applications, but no file system resident on the device. The alternative architecture of system 1900 is similar to that of system 1800 in that executable applications are installed on the server 1920, and not directly on the mobile device 1902. In system 1900, however, the executable files for an application are not stored in a local file system on the mobile device 1902; rather when they are requested from the operating system 1928 on the server 1920 the files are placed directly into memory on the mobile device 1902 and executed. Any file reads or writes by resident applications 1912 running on the mobile device are directed by the operating system 1908 via the server's operating system 1928 to the server's file system 1930. In this architecture no application data is stored locally on the mobile device 1902, only in the file system 1930 on the server 1920. Applications 1912 may exist in the memory of the mobile device while they are being executed or prepared for execution, but after the application has ended, these sections of memory are marked for removal/reuse. If an application should be re-invoked by the user while a copy of the application executable still remains in memory and is the same version as is held on the server 1920, then the operating system 1908 may simply use that local memory copy rather than re-requesting the server 1920 to send the files. In this architecture the mobile device is a pure execution engine for applications and has no permanent file system.

Figure 20:
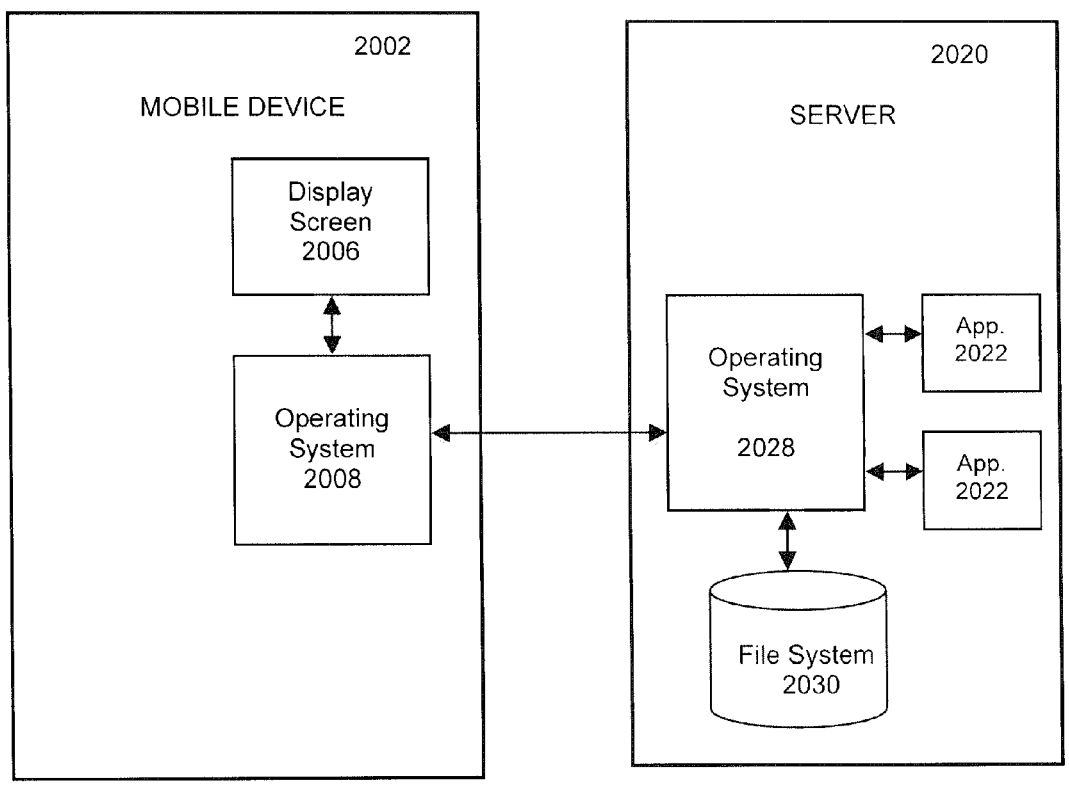
FIG. 20 illustrates a further alternative embodiment of a mobile device architecture in which the mobile device comprises an operating system, but no applications or file system resident on the device.

FIG. 20 illustrates a further alternative embodiment of a mobile device architecture in which the mobile device comprises an operating system, but no applications or file system resident on the device. The alternative architecture of system 2000 has a server component 2020 upon which applications 2022 are installed by the operating system 2028, storing the executable and data files necessary in the server's file system 2030. The mobile device 2002 does not run the applications on the mobile device's operating system 2008; rather the applications 2022 run on the server's operating system 2028, and requests by the application to draw to the screen are sent by the operating system 2028 on the server 2020 to the operating system 2008 on the mobile device 2002, with the drawing operations occurring on the mobile device's display screen 2006. Requests by the application for user input (touch, taps, typing, etc.) are sent from the application 2022 via the operating system 2028 on the server to the operating system 2008 on the mobile device, and such user input is solicited from the local sensors on the mobile device 2002 (e.g., from the touch screen 2006 on the mobile device 2002). In this architecture the mobile device is a pure display and user interaction engine for applications, and does not run applications on the mobile device.

In any of system 1800 and 1900, network operations from the running application may optionally be routed through the server so that the operating system on the server (or special applications running on the server) can provide security and/or privacy operations on the network communications initiated by the running application. This would be in lieu of network operations being conducted directly from the mobile device.

Any of the architectures of FIGS. 18-20 could be implemented in a hardware mobile device which has a conventional architecture, with the difference that the alternative architecture aspects regarding the file system, executable application and operating system interaction can be viewed as a form of containerization. Containerization, or sandboxing, is a technique of program isolation used to enforce security or privacy policies. As known in the art, there are three main types of sandboxing. The first type comprises a hypervisor upon which one or more virtualized operating systems run that are completely sandboxed. A second type comprises one in which a virtualization layer runs atop the native operating system on a device, and a guest operating system (and applications within it) run within that virtualization layer. A third type comprises application wrappers, content wrappers, and work space wrappers, which tend to be application-oriented types of virtualization that are functionally oriented and although similar to the second type, do not represent a full virtualization layer with a guest operating system; instead, the work space itself is an application what runs other applications and enforces isolation.

It should be noted that all three of the architectures of FIGS. 18-20 could be considered to constitute a different kind of containerization. In each of these systems, some or all of the executables and/or data reside at the server, and not on the mobile device. An enterprise could use any one of these architectures as a containerization solution. A user's personal applications could be installed upon and run conventionally on the mobile device, but all enterprise data and applications could be run from the server, such as server 2020 of FIG. 20.

The containerization methods of FIGS. 18-20 enhance the security aspects of the embodiments. In general, all existing types of containerization are vulnerable to attacks against data that is physically stored on the mobile device. The containerization architectures described herein, however, feature no permanently stored application data on the mobile device. Additionally, any of the above-described three types of containerization could be employed on the server side in conjunction with any of the three architectural models described with respect to FIGS. 18-20.

Embodiments of the containerization and program/data isolation techniques described with respect to FIGS. 18-20 in relation to the user authentication/login system employing authorizing clients may be used in conjunction with an enhanced file system monitoring method and system. Such embodiments are described in co-pending U.S. patent application Ser. No. 13/710,162, referred to above, and as previously stated, that disclosure is hereby incorporated by reference in its entirety.

The alternative architecture embodiments of FIGS. 18-20 may be implemented in one of a number of configurations, depending on overall system constraints and requirements. In one embodiment, the alternative systems 1800, 1900, and 2000 may be implemented as a modification to the operating system on a respective mobile device 1802, 1902, and 2002. It may also be implemented as a hybrid configuration based on one or more of the three containerization types described above. Thus, in an embodiment that utilizes a first type of containerization scenario, the embodiment is one in which one of the virtualized operating systems is a modified operating system as described in the context of FIGS. 18-20; in an embodiment that utilizes a second type of containerization scenario, the embodiment is one in which a virtualization layer running atop the host operating system contains a guest operation system that is a modified operating system as described in the context of FIGS. 18-20; and in an embodiment that utilizes a third type of containerization scenario, the embodiment is one in which an application has been wrapped so as to virtualize access to files, displays, and sensors as described with respect to FIGS. 18-20.

It should be understood that the arrangement of components illustrated in the figures are only possible implementations of the embodiments and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of components. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

Any of the above embodiments may be used alone or together with one another in any combination. The one or more implementations encompassed within this specification may also include embodiments that are only partially mentioned or alluded to or are not mentioned or alluded to at all. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

In addition, one will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for processing a request to access a target server over a network from a user operating a client computer, the method comprising:
    receiving, at an authentication server, a request to access the target server from the user operating the client computer, wherein the target server is separate from the authentication server and wherein the target server is accessible to the user executing a web browser on the client computer;
    causing, by the authentication server, user input fields to be displayed on the client computer to prompt the user for entry of user credentials through the web browser;
    issuing, by the authentication server, a challenge to an authorizing client device requiring validation of an identity of the user in response to the request to access the target server;
    sending, from the authentication server, a command to the authorizing client device to prompt the user to input a response to the challenge into the authorizing client device;
    receiving, at the authentication server, verification from the authorizing client device that the response to the challenge is valid;
    evaluating, by the authentication server, at least one item of context information related to the client computer being operated by the user, the at least one item of context information including at least one of a location of the client computer, characteristics of a network to which the client computer is connected, security risk data associated with an application operating on the target server for which the user requests access, an identification of accounts common to both the client computer and the authorizing client device, and an identification of usage anomalies, wherein the at least one item of context information is provided by the client computer to the authentication server separate from the request to access the network resource and separate from the user credentials;
    determining, at the authentication server, a disposition of the request to access the target server based on the verification from the authorizing client device and the evaluation of the at least one item of context information; and
    releasing, by the authentication server, user credentials to a client desktop extension on the client computer when the determined disposition is to grant access, the released user credentials being used by the client computer to obtain access to the target server.

2. The method of claim 1 wherein the disposition of the request to access the target server includes one of granting the request by the user to access the target server or denying the request by the user to access the target server, and the method further comprising transmitting, by the server, the disposition information in a message to the authorizing client device to cause the authorizing client device to display the disposition.

3. The method of claim 1 wherein the target server provides access to a network resource from the group consisting of: a web site, a service provided by the target server, a hardware device coupled to the network, access to physical facilities controlled by the target server, an executable application, and a product sold by an operator of the target server.

4. The method of claim 1 wherein the authorizing client device comprises a mobile communications device coupled to the client computer over a network link, wherein the network link is at least one of: cellular link, Bluetooth link, WIFI link, and near field communication link.

5. The method of claim 4 further comprising causing, by the authentication server, a display of a device selection field on the client computer to allow the user to select a specific type and model of mobile communications device from a selection of mobile communications devices.

6. The method of claim 1 wherein the response to the challenge is a universal password.

7. The method of claim 1 wherein the at least one item of context information is the location of the client computer.

8. The method of claim 1 wherein the at least one item of context information is the characteristics of a network to which the client computer is connected.

9. The method of claim 1 wherein the at least one item of context information is the security risk data associated with the network resource to which the user requests access.

10. The method of claim 1 wherein the at least one item of context information is the identification of common accounts.

11. The method of claim 1 wherein the at least one item of context information is the identification of usage anomalies.

12. A non-transitory computer-readable medium encoded with a plurality of instructions which, when executed by a processor, cause the processor to perform a method comprising:
    receiving, at an authentication server, a request to access a target server from the user operating a client computer, wherein the target server is separate from the authentication server and wherein the target server is accessible to the user executing a web browser on the client computer;
    causing, by the authentication server, user input fields to be displayed on the client computer to prompt the user for entry of user credentials through the web browser;

issuing, by the authentication server, a challenge to an authorizing client device requiring validation of an identity of the user in response to the request to access the target server;

sending, from the authentication server, a command to the authorizing client device to prompt the user to input a response to the challenge into the authorizing client device;

receiving, at the authentication server, verification from the authorizing client device that the response to the challenge is valid;

evaluating, by the authentication server, at least one item of context information related to the client computer being operated by the user, the at least one item of context information including at least one of a location of the client computer, characteristics of a network to which the client computer is connected, security risk data associated with an application operating on the target server for which the user requests access, an identification of accounts common to both the client computer and the authorizing client device, and an identification of usage anomalies, wherein the at least one item of context information is provided by the client computer to the authentication server separate from the request to access the network resource and separate from the user credentials;

determining, at the authentication server, a disposition of the request to access the target server based on the verification from the authorizing client device and the evaluation of the at least one item of context information; and releasing, by the authentication server, user credentials to a client desktop extension on the client computer when the determined disposition is to grant access, the released user credentials being used by the client computer to obtain access to the target server.

13. The non-transitory computer-readable medium of claim 12 wherein the disposition of the request to access the target server includes one of granting the request by the user to access the target server or denying the request by the user to access the target server, and the non-transitory computer-readable medium further comprising instructions to cause the processor to perform a method comprising transmitting, by the server, the disposition information in a message to the authorizing client device to cause the authorizing client device to display the disposition.

14. The non-transitory computer-readable medium of claim 12 wherein the target server provides access to a network resource from the group consisting of: a web site, a service provided by the target server, a hardware device coupled to the network, access to physical facilities controlled by the target server, an executable application, and a product sold by an operator of the target server.

15. The non-transitory computer-readable medium of claim 12 wherein the authorizing client device comprises a mobile communications device coupled to the client computer over a network link, wherein the network link is at least one of: cellular link, Bluetooth link, WIFI link, and near field communication link.

16. The non-transitory computer-readable medium of claim 15 further comprising instructions to cause the processor to perform a method comprising causing, by the authentication server, a display of a device selection field on the client computer to allow the user to select a specific type and model of mobile communications device from a selection of mobile communications devices.

17. The non-transitory computer-readable medium of claim 12 wherein the response to the challenge is a universal password.

18. The non-transitory computer-readable medium of claim 12 wherein the at least one item of context information is the location of the client computer.

19. The non-transitory computer-readable medium of claim 12 wherein the at least one item of context information is the characteristics of a network to which the client computer is connected.

20. The non-transitory computer-readable medium of claim 12 wherein the at least one item of context information is the security risk data associated with the network resource to which the user requests access.

21. The non-transitory computer-readable medium of claim 12 wherein the at least one item of context information is the identification of common accounts.

22. The non-transitory computer-readable medium of claim 12 wherein the at least one item of context information is the identification of usage anomalies.

* * * * *